(12) United States Patent
Palestrant

(10) Patent No.: US 10,083,420 B2
(45) Date of Patent: Sep. 25, 2018

(54) COMMUNITY MODERATED INFORMATION

(75) Inventor: Daniel Palestrant, Cambridge, MA (US)

(73) Assignee: Sermo, Inc, Boston, MA (US)

( * ) Notice: Subject to any disclaimer, the term of this patent is extended or adjusted under 35 U.S.C. 154(b) by 1130 days.

(21) Appl. No.: 12/275,543

(22) Filed: Nov. 21, 2008

(65) Prior Publication Data

US 2009/0240516 A1 Sep. 24, 2009

Related U.S. Application Data

(60) Provisional application No. 60/989,556, filed on Nov. 21, 2007.

(51) Int. Cl.
*G06Q 10/10* (2012.01)
*G06Q 30/02* (2012.01)
*G06Q 50/00* (2012.01)

(52) U.S. Cl.
CPC ......... *G06Q 10/10* (2013.01); *G06Q 30/0281* (2013.01); *G06Q 50/01* (2013.01)

(58) Field of Classification Search
CPC ..... G06Q 50/01; G06Q 10/10; G06Q 30/0281
(Continued)

(56) References Cited

U.S. PATENT DOCUMENTS 4,451,700 A 5/1984 Kempner et al.
4,591,980 A 5/1986 Huberman
(Continued)

FOREIGN PATENT DOCUMENTS

EP 1065607 A3 5/2002
EP 1320058 A1 6/2003
(Continued)

OTHER PUBLICATIONS

Sermo. www.sermo.com. Archived Webpages from www.archive.org. Jul. 2006-Oct. 2006.*
(Continued)

*Primary Examiner* — Jonathan P Ouellette
(74) *Attorney, Agent, or Firm* — Wolf, Greenfield & Sacks, P.C.

(57) ABSTRACT

According to one aspect, an approach is provided that assists in presenting the right information within the ecosystem. The approach involves associating information sources (ads, sponsored information, research requests, debate notices, seminars, education opportunities, peer generated information, etc) with a feedback mechanism. In one embodiment, the feedback mechanism includes a scoring feature, where individual participants within the ecosystem rate the relevancy and/or importance of the information provided. In one example, a user is notified that a potentially relevant information source is available. The notification is typically displayed unobtrusively within a browser or interface window that the user is navigating. In one implementation, the user must perform some affirmative action to reach information associated with the information opportunity. In one example, requiring an affirmative action serves as a shield from pop-ups, banner-ads, and other distracting form of advertising. It is also realized that allowing the user to select the information opportunity rather than display it immediately permits the user to decide explore the opportunity. In one example, permitting the user to decide to explore the opportunity increases the user's receptivity to the information opportunity. In one embodiment, information associated with the information opportunity is displayed in response to user selection. The information associated with the information opportunity describes the information opportunity available. The user is provided with the opportunity to
(Continued)

evaluate the information opportunity without being required to visit it and/or review it in its entirety. The information associated with the information opportunity may also be displayed with user feedback.

35 Claims, 22 Drawing Sheets

(58) Field of Classification Search
USPC .................................................. 705/1.1–912
See application file for complete search history.

(56) References Cited

U.S. PATENT DOCUMENTS

| | | | |
|---|---|---|---|
| 4,835,680 A | 5/1989 | Hogg | |
| 4,835,732 A | 5/1989 | Huberman | |
| 5,608,620 A | 3/1997 | Lundgren | |
| 5,813,863 A | 9/1998 | Sloane | |
| 5,815,665 A | 9/1998 | Teper et al. | |
| 5,826,244 A | 10/1998 | Huberman | |
| 5,872,850 A | 2/1999 | Klein et al. | |
| 5,916,024 A | 6/1999 | Von Kohorn | |
| 5,924,072 A | 7/1999 | Havens | |
| 5,950,176 A | 9/1999 | Keiser | |
| 5,987,440 A | 11/1999 | O'Neil | |
| 6,015,345 A | 1/2000 | Kail | |
| 6,016,483 A | 1/2000 | Rickard | |
| 6,021,403 A | 2/2000 | Horvitz | |
| 6,026,148 A * | 2/2000 | Dworkin et al. | 379/88.18 |
| 6,027,112 A | 2/2000 | Guenther | |
| 6,064,980 A | 5/2000 | Jacobi et al. | |
| 6,078,906 A | 6/2000 | Huberman | |
| 6,085,216 A | 7/2000 | Huberman | |
| 6,102,797 A | 8/2000 | Kail | |
| 6,112,186 A | 8/2000 | Bergh et al. | |
| 6,115,718 A | 9/2000 | Huberman | |
| 6,119,052 A | 9/2000 | Guenther | |
| 6,165,069 A | 12/2000 | Sines | |
| 6,186,502 B1 | 2/2001 | Perkins | |
| 6,208,979 B1 | 3/2001 | Sinclair | |
| 6,237,786 B1 | 5/2001 | Ginter et al. | |
| 6,263,321 B1 | 7/2001 | Daughtery, III | |
| 6,270,404 B2 | 8/2001 | Sines | |
| 6,272,507 B1 | 8/2001 | Pirolli | |
| 6,309,307 B1 | 10/2001 | Krause | |
| 6,331,148 B1 | 12/2001 | Krause | |
| 6,363,333 B1 | 3/2002 | Deco et al. | |
| 6,389,372 B1 | 5/2002 | Glance | |
| 6,400,372 B1 | 6/2002 | Gossweiler | |
| 6,415,368 B1 | 7/2002 | Glance | |
| 6,441,817 B1 | 8/2002 | Gossweiler | |
| 6,466,928 B1 | 10/2002 | Blasko et al. | |
| 6,470,269 B1 | 10/2002 | Adar | |
| 6,488,281 B2 | 12/2002 | Stupak | |
| 6,505,174 B1 | 1/2003 | Keiser | |
| 6,508,706 B2 | 1/2003 | Sitrick | |
| 6,516,288 B2 | 2/2003 | Bagne | |
| 6,571,234 B1 | 5/2003 | Knight | |
| 6,581,027 B1 | 6/2003 | Sheer | |
| 6,631,184 B1 | 10/2003 | Weiner | |
| 6,631,451 B2 | 10/2003 | Glance | |
| 6,647,371 B2 | 11/2003 | Shinohara | |
| 6,651,985 B2 | 11/2003 | Sines | |
| 6,656,047 B1 | 12/2003 | Tarantino | |
| 6,658,393 B1 | 12/2003 | Basch | |
| 6,721,748 B1 * | 4/2004 | Knight et al. | |
| 6,722,974 B2 | 4/2004 | Sines | |
| 6,725,232 B2 | 4/2004 | Bradley et al. | |
| 6,751,574 B2 | 6/2004 | Shinohara | |
| 6,767,213 B2 | 7/2004 | Fleishman | |
| 6,834,811 B1 | 12/2004 | Huberman | |
| 6,839,656 B1 | 1/2005 | Ackermann | |
| 6,868,441 B2 | 3/2005 | Greene | |
| 6,895,385 B1 | 5/2005 | Zacharia | |
| 6,910,965 B2 | 6/2005 | Downes | |
| 6,912,511 B1 | 6/2005 | Eliezer | |
| 6,925,364 B1 | 8/2005 | Huberman | |
| 6,961,756 B1 | 11/2005 | Dilsaver et al. | |
| 6,963,848 B1 | 11/2005 | Brinkerhoff | |
| 6,980,962 B1 | 12/2005 | Arganbright et al. | |
| 7,181,688 B1 | 2/2007 | Umemoto et al. | |
| 7,237,189 B2 | 6/2007 | Altenhofen et al. | |
| 7,305,436 B2 * | 12/2007 | Willis | 709/204 |
| 7,353,238 B1 | 4/2008 | Gliklich | |
| 7,395,316 B2 | 7/2008 | Ostertag et al. | |
| 7,418,437 B1 * | 8/2008 | Marks | 707/1 |
| 7,523,051 B2 | 4/2009 | Kondo et al. | |
| 7,533,034 B2 | 5/2009 | Laurin et al. | |
| 7,536,310 B2 | 5/2009 | Klausnitzer | |
| 7,539,763 B2 | 5/2009 | Toyota et al. | |
| 7,596,578 B1 | 9/2009 | Marks | |
| 7,620,651 B2 | 11/2009 | Chea et al. | |
| 7,630,986 B1 | 12/2009 | Herz et al. | |
| 7,634,546 B1 | 12/2009 | Strickholm et al. | |
| 7,636,732 B1 | 12/2009 | Nielsen | |
| 7,653,568 B2 * | 1/2010 | Keller et al. | 705/10 |
| 7,672,904 B2 | 3/2010 | Powell | |
| 7,685,117 B2 | 3/2010 | Gross | |
| 7,698,270 B2 | 4/2010 | Brave et al. | |
| 7,725,472 B2 | 5/2010 | Uchiyama | |
| 7,730,030 B1 * | 6/2010 | Xu | 707/617 |
| 7,792,718 B2 | 9/2010 | Williams | |
| 7,921,028 B2 | 4/2011 | Cole | |
| 8,006,197 B1 | 8/2011 | Nevill-Manning et al. | |
| 8,019,637 B2 | 9/2011 | Palestrant et al. | |
| 8,019,639 B2 | 9/2011 | Palestrant et al. | |
| 8,160,915 B2 | 4/2012 | Palestrant et al. | |
| 8,239,240 B2 | 8/2012 | Palestrant et al. | |
| 8,626,561 B2 | 1/2014 | Palestrant et al. | |
| 2001/0020236 A1 | 9/2001 | Cannon | |
| 2001/0031451 A1 | 10/2001 | Sander | |
| 2001/0032189 A1 | 10/2001 | Powell | |
| 2001/0053991 A1 | 12/2001 | Bonabeau | |
| 2001/0056392 A1 | 12/2001 | Daughtery | |
| 2002/0016731 A1 | 2/2002 | Kupersmit | |
| 2002/0029157 A1 | 3/2002 | Marchosky | |
| 2002/0046157 A1 | 4/2002 | Solomon | |
| 2002/0049738 A1 | 4/2002 | Epstein | |
| 2002/0049792 A1 | 4/2002 | Wilcox | |
| 2002/0069079 A1 | 6/2002 | Vega | |
| 2002/0073009 A1 | 6/2002 | Hogg | |
| 2002/0073174 A1 | 6/2002 | Mengerink et al. | |
| 2002/0087496 A1 | 7/2002 | Stirpe et al. | |
| 2002/0095305 A1 | 7/2002 | Gakidis et al. | |
| 2002/0129332 A1 | 9/2002 | Svensson | |
| 2002/0138529 A1 | 9/2002 | Yang-Stephens et al. | |
| 2002/0147611 A1 | 10/2002 | Greene | |
| 2002/0147670 A1 | 10/2002 | Lange | |
| 2002/0147895 A1 | 10/2002 | Glance | |
| 2002/0165745 A1 | 11/2002 | Greene | |
| 2002/0165905 A1 | 11/2002 | Wilson | |
| 2002/0169644 A1 | 11/2002 | Greene | |
| 2002/0173984 A1 | 11/2002 | Robertson | |
| 2002/0174052 A1 | 11/2002 | Guler | |
| 2002/0174191 A1 | 11/2002 | Robertson | |
| 2002/0178026 A1 | 11/2002 | Robertson | |
| 2002/0194113 A1 | 12/2002 | Lof et al. | |
| 2002/0194226 A1 | 12/2002 | Sheth | |
| 2002/0198032 A1 | 12/2002 | Sitrick | |
| 2002/0198299 A1 | 12/2002 | Matsunaga | |
| 2002/0198734 A1 | 12/2002 | Greene | |
| 2003/0004744 A1 | 1/2003 | Greene | |
| 2003/0017439 A1 | 1/2003 | Rapoza | |
| 2003/0028467 A1 | 2/2003 | Sanbom | |
| 2003/0028469 A1 | 2/2003 | Bergman et al. | |
| 2003/0036963 A1 | 2/2003 | Jacobson | |
| 2003/0041012 A1 | 2/2003 | Grey et al. | |
| 2003/0041147 A1 | 2/2003 | van den Oord et al. | |
| 2003/0046123 A1 | 3/2003 | Chen | |
| 2003/0055773 A1 | 3/2003 | Guler | |
| 2003/0069830 A1 | 4/2003 | Morano | |
| 2003/0074166 A1 | 4/2003 | Jackson | |
| 2003/0078829 A1 | 4/2003 | Chen | |
| 2003/0115164 A1 | 6/2003 | Jeng | |

(56) References Cited

U.S. PATENT DOCUMENTS

| | | |
|---|---|---|
| 2003/0126061 A1 | 7/2003 | Brett et al. |
| 2003/0126097 A1 | 7/2003 | Zhang |
| 2003/0135441 A1 | 7/2003 | Ginsberg |
| 2003/0135445 A1 | 7/2003 | Herz et al. |
| 2003/0160817 A1* | 8/2003 | Ishida et al. ............... 345/738 |
| 2003/0167324 A1 | 9/2003 | Farnham |
| 2003/0172067 A1 | 9/2003 | Adar |
| 2003/0186243 A1 | 10/2003 | Adamic |
| 2003/0190045 A1 | 10/2003 | Huberman |
| 2003/0194690 A1 | 10/2003 | Wessner et al. |
| 2003/0208378 A1* | 11/2003 | Thangaraj ............ G06F 19/321 705/2 |
| 2003/0208407 A1 | 11/2003 | Dawson |
| 2003/0216928 A1 | 11/2003 | Shour |
| 2003/0216938 A1 | 11/2003 | Shour |
| 2003/0233274 A1 | 12/2003 | Urken et al. |
| 2003/0236738 A1 | 12/2003 | Lange |
| 2004/0002891 A1 | 1/2004 | Chen |
| 2004/0006566 A1 | 1/2004 | Taylor et al. |
| 2004/0026858 A1 | 2/2004 | Murphy |
| 2004/0030525 A1 | 2/2004 | Robinson et al. |
| 2004/0032393 A1 | 2/2004 | Brandenberg et al. |
| 2004/0049447 A1 | 3/2004 | Keiser |
| 2004/0049473 A1 | 3/2004 | Gower |
| 2004/0073443 A1 | 4/2004 | Gabrick et al. |
| 2004/0088242 A1 | 5/2004 | Ascher |
| 2004/0107180 A1 | 6/2004 | Yoshida |
| 2004/0111467 A1 | 6/2004 | Willis |
| 2004/0117203 A1 | 6/2004 | Brand |
| 2004/0122709 A1 | 6/2004 | Avinash et al. |
| 2004/0133463 A1 | 7/2004 | Benderev |
| 2004/0139031 A1 | 7/2004 | Amaitis |
| 2004/0148245 A1 | 7/2004 | Chen |
| 2004/0153375 A1 | 8/2004 | Mukunya |
| 2004/0162751 A1 | 8/2004 | Tsyganskiy et al. |
| 2004/0176994 A1 | 9/2004 | Fine |
| 2004/0181376 A1 | 9/2004 | Fables |
| 2004/0186738 A1 | 9/2004 | Reisman |
| 2004/0205065 A1 | 10/2004 | Petras et al. |
| 2004/0225577 A1 | 11/2004 | Robinson |
| 2004/0230574 A1 | 11/2004 | Kravets |
| 2004/0236625 A1 | 11/2004 | Kearon |
| 2004/0236637 A1 | 11/2004 | Tatge |
| 2004/0236661 A1 | 11/2004 | Benning |
| 2004/0236817 A1 | 11/2004 | Huberman |
| 2005/0021461 A1 | 1/2005 | Flake |
| 2005/0027612 A1 | 2/2005 | Walker et al. |
| 2005/0055337 A1 | 3/2005 | Bebo |
| 2005/0060245 A1 | 3/2005 | Hoffman |
| 2005/0060283 A1 | 3/2005 | Petras et al. |
| 2005/0066241 A1 | 3/2005 | Gross |
| 2005/0080655 A1 | 4/2005 | Sengir |
| 2005/0090231 A1 | 4/2005 | Huberman |
| 2005/0095003 A1 | 5/2005 | Huberman |
| 2005/0096922 A1 | 5/2005 | Huberman |
| 2005/0096973 A1 | 5/2005 | Heyse |
| 2005/0119963 A1 | 6/2005 | Ko |
| 2005/0131746 A1 | 6/2005 | Beausoleil |
| 2005/0131777 A1 | 6/2005 | Davidson |
| 2005/0131794 A1 | 6/2005 | Lifson |
| 2005/0131918 A1 | 6/2005 | Hillis et al. |
| 2005/0132305 A1 | 6/2005 | Guichard |
| 2005/0138070 A1 | 6/2005 | Huberman |
| 2005/0154639 A1 | 7/2005 | Zetmeir |
| 2005/0160020 A1 | 7/2005 | Asher |
| 2005/0165669 A1 | 7/2005 | Montanaro |
| 2005/0171878 A1 | 8/2005 | Pennock |
| 2005/0177387 A1 | 8/2005 | Mojsa |
| 2005/0198299 A1 | 9/2005 | Beck |
| 2005/0222989 A1* | 10/2005 | Haveliwala et al. ............ 707/3 |
| 2005/0228714 A1 | 10/2005 | Spady |
| 2005/0228983 A1* | 10/2005 | Starbuck et al. ............ 713/151 |
| 2005/0256756 A1 | 11/2005 | Lam |
| 2005/0256800 A1 | 11/2005 | Hogg |
| 2005/0267807 A1 | 12/2005 | Bentley |
| 2005/0272087 A1 | 12/2005 | Adamic |
| 2005/0278371 A1 | 12/2005 | Funk |
| 2005/0283395 A1 | 12/2005 | Lesandrini et al. |
| 2005/0289133 A1 | 12/2005 | Arrouye et al. |
| 2005/0289265 A1 | 12/2005 | Illowsky |
| 2006/0004653 A1 | 1/2006 | Strongin |
| 2006/0004703 A1* | 1/2006 | Spivack .............. G06F 17/3089 |
| 2006/0015425 A1 | 1/2006 | Brooks |
| 2006/0020628 A1 | 1/2006 | Huberman |
| 2006/0047615 A1* | 3/2006 | Ravin .................... G06N 5/022 706/50 |
| 2006/0106627 A1 | 5/2006 | Al-Nujaidi |
| 2006/0166669 A1 | 7/2006 | Claussen |
| 2006/0173838 A1 | 8/2006 | Garg et al. |
| 2006/0200556 A1 | 9/2006 | Brave et al. |
| 2006/0282304 A1 | 12/2006 | Bedard et al. |
| 2007/0055610 A1 | 3/2007 | Palestrant et al. |
| 2007/0055611 A1 | 3/2007 | Palestrant |
| 2007/0055612 A1 | 3/2007 | Palestrant |
| 2007/0061217 A1 | 3/2007 | Palestrant |
| 2007/0061218 A1 | 3/2007 | Palestrant |
| 2007/0061219 A1 | 3/2007 | Palestrant |
| 2007/0294127 A1 | 12/2007 | Zivov |
| 2009/0007924 A1* | 1/2009 | Iliff ....................... G06F 19/322 128/898 |
| 2009/0055355 A1* | 2/2009 | Brunner ................ G06Q 30/02 |
| 2009/0099853 A1* | 4/2009 | Lemelson .............. G06Q 50/01 705/319 |
| 2009/0204430 A1* | 8/2009 | Gliklich ................ G06F 19/327 705/2 |
| 2012/0150664 A1 | 6/2012 | Palestrant et al. |
| 2012/0310943 A1 | 12/2012 | Palestrant et al. |
| 2014/0249888 A1 | 9/2014 | Palestrant et al. |

FOREIGN PATENT DOCUMENTS

| | | |
|---|---|---|
| EP | 1416413 A2 | 5/2004 |
| EP | 1473654 A1 | 11/2004 |
| JP | 04355616 | 12/2004 |
| JP | 05196752 | 7/2005 |
| WO | 98/33135 A1 | 7/1998 |
| WO | WO 1999046719 A1 | 9/1999 |
| WO | WO 0052622 A1 | 9/2000 |
| WO | WO 2001003046 A1 | 1/2001 |
| WO | WO 2001076120 A3 | 2/2001 |
| WO | 2001076120 A2 | 10/2001 |
| WO | 0176120 A3 | 1/2002 |
| WO | WO 2002005123 A2 | 1/2002 |
| WO | WO 03096262 A2 | 11/2003 |
| WO | WO 2004034210 A2 | 4/2004 |
| WO | WO 2004068318 A2 | 8/2004 |
| WO | WO 04074964 A2 | 9/2004 |
| WO | WO 04112604 A2 | 12/2004 |
| WO | WO 05003928 A2 | 1/2005 |
| WO | WO 05010714 A2 | 2/2005 |
| WO | WO 05069978 A2 | 8/2005 |
| WO | WO 05098612 A1 | 10/2005 |
| WO | WO 05106731 A1 | 11/2005 |

OTHER PUBLICATIONS

Medical Doctors Seriously Talking at Sermo; Physician Community's Rapid Growth Indicates Extreme Value. Business Wire. New York: Oct. 10, 2006.*

Rowland, Christopher. Website seeks doctors' take on drugs, and firms are crying foul. The Boston Globe. Oct. 14, 2006.* www.sermo.com, Collection of web pages retrieved from Web Archive <www.archive.org>, http__web.archive.org_web_20060702231125_http__www.sermo 1.pdf, Jul. 2, 2006.* www.sermo.com, Collection of web pages retrieved from Web Archive <www.archive.org>, http__web.archive.org_web_20060702231125_http__www.sermo 2.pdf, Jul. 2, 2006.* www.sermo.com, Collection of web pages retrieved from Web Archive <www.archive.org>, http__web.archive.org_web_20060702231125_http__www.sermo 3.pdf, Jul. 2, 2006.* www.sermo.com, Collection of web pages retrieved from Web

(56) References Cited

OTHER PUBLICATIONS

Archive <www.archive.org>, http__web.archive.org_web_20060702231125_http__www.sermo 4.pdf, Jul. 2, 2006.*
Robin Hanson, Eliciting Objective Probabilities via Lottery Insurance Games, 2005.
Pan, Zuohong; Liu, Xiaodi; Mejabi, Olugbenga, Neural-Fuzzy system for forecasting, 1997.
Berg, J. E.; Rietz, T. A., Prediction markets as decision support systems, 2003.
Barabasi, A. L.; Jeong, H.; Neda, Z.; Ravasz, E.; Schubert, A.; Vicsek, T., Evolution of the social network of scientific collaborations, 2002.
Fukumoto, Takashi; Funabashi, Motohisa; Homma, Koichi; Kato, Hiromitsu; Kawakami, Ken-Ichiroh; Sasaki, Toshiro; Sato, Yoshinori; Yano, Kojin, Systems technologies for the ubiquitous society, 2005.
Marin, F. J.; Garcia-Lagos, F.; Joya, G.; Sandoval, F., Global model for short-term load forecasting using artificial neural networks, 2002.
Reynolds, R. G.; Kohler, T. A.; Kobti, Z., The effects of generalized reciprocal exchange on the resilience of social networks: an example from the prehispanic Mesa Verde region, 2003.
Yulmetyev, R.; Emelyanova, N.; Demin, S.; Gafarov, F.; Hanggi, P.; Yulmetyeva, D., Fluctuations and noise in stochastic spread of respiratory infection epidemics in social networks, 2003.
Guardiola, X.; Diaz-Guilera, A.; Perez, C. J.; Arenas, A.; Llas, M., Modeling diffusion of innovations in a social network, 2002.
Gurgen, Fikret S.; Okay, Nesrin; Yumlu, Serdar, A comparison of global, recurrent and smoothed-piecewise neural models for Istanbul stock exchange (ISE) prediction, 2005.
Huang, Chung-Yuan; Lin, Hsun-Cheng; Sun, Chuen-Tsai, Influence of local information on social simulations under the small-world model, 2004.
Pennock, David M., A dynamic pari-mutuel market for hedging, wagering, and information aggregation, 2004.
Chen, Kay-Yut; Fine, Leslie R.; Huberman, Bernardo A., Eliminating public knowledge biases in information-aggregation mechanisms, 2004.
Huiye Ma; Ho-fung Leung, An adaptive attitude bidding strategy for agents in continuous double auctions, 2005.
Gode, D. K.; Sundar, S., Double auction dynamics: structural effects of non-binding price controls, 2004.
Dooley, Mike; Dornfest, Rael; Flake, Gary W.; Hoffman, Havi; Kasturi, Tejaswi; Mangold, Bernard; Pennock, David M., The tech buzz game, 2005.
Rob Stocker, David Cornforth and T. R. J. Bossomaier, Network Structures and Agreement in Social Network Simulations, 2002.
Broihanne, Marie-Helene; Koessler, Frederic; Ziegelmeyer, Anthony, The favorite-longshot bias in sequential parimutuel betting with non-expected utility players, 2003.
Voss, M. S.; Howland, J. C., III, Financial modelling using social programming, 2003.
Carbo, J.; Molina, J. M.; Davila, J., Fuzzy referral based cooperation in social networks of agents, 2005.
Heng-Li Yang; Jih-Hsin Tang, Key user roles on web-based information systems requirements, 2005.
Robin Hanson, Combinatorial Information Market Design, 2005.
Luo Jia-Yuan; Ouyang Qi, Exploring the critical sensitivity in small-world networks, 2004.
Kim, D.-H.; Kahng, B.; Kim, D., Multi-component static model for social networks, 2004.
Janssen, M. A.; Jager, W., Simulating market dynamics: interactions between consumer psychology and social networks, 2003.
White, D. R.; Owen-Smith, J.; Moody, J.; Powell, W. W., Networks, fields and organizations: micro-dynamics, scale and cohesive embeddings, 2004.
Getoor, L.; Friedman, N.; Koller, D.; Taskar, B., Learning probabilistic models of link structure, 2003.
Newman, M. E. J., The structure and function of complex networks, 2003.

Li, K.; Thompson, S.; Wieringa, P. A.; Peng, J.; Duan, G. R., Neural networks and genetic algorithms can support human supervisory control to reduce fossil fuel power plant emissions, 2003.
Chowell, G.; Hyman, J. M.; Eubank, S.; Castillo-Chavez, C., Scaling laws for the movement of people between locations in a large city, 2003.
Nagurneya, A.; June Dong; Mokhtarian, P. L., Multicriteria network equilibrium modeling with variable weights for decision-making in the Information Age with applications to telecommuting and teleshopping, 2002.
Kempe, D.; Kleinberg, J.; Tardos, E., Influential nodes in a diffusion model for social networks, 2005.
Cebeci, Evin Dogan; Passmore, David L., Potential of idea futures markets in organizational decision-making for educational technology, 2004.
Wakolbinger, T.; Nagurney, A., Dynamic supernetworks for the integration of social networks and supply chains with electronic commerce: modeling and analysis of buyer-seller relationships with computations, 2004.
Weisbuch, G., Bounded confidence and social networks, 2004.
Diligenti, M.; Gori, M.; Maggini, M., Neural computation, social networks, and topological spectra, 2004.
Jyun-Cheng Wang; Chi-Lu Chen, An automated tool for managing interactions in virtual communities—using social network analysis approach, 2004.
Kim, J. Y.; Liao, J.; Lober, W. B., Applying social network analysis techniques to measure the efficacy of computerized medication records, 2002.
Borgatti, S. P.; Cross, R., A relational view of information seeking and learning in social networks, 2003.
Pearson, D. W.; McCartney, M., Dynamics of social networks: a deterministic approach, 2002.
Jin, E. M.; Girvan, M.; Newman, M. E. J., The Structure of growing social networks, 2001.
Elgazzar, A. S., A model for the evolution of economic systems in social networks, 2002.
Oliven, Kenneth; Rietz, Thomas A., Suckers Are Born but Markets Are Made: Individual Rationality, Arbitrage, and Market Efficiency on an Electronic Futures Market, 2004.
Garcia-Gonzalez, Javier; Gonzalez, Alicia Mateo; San Roque, Antonio Munoz, Modeling and forecasting electricity prices with input/output hidden Markov models, 2005.
Danilov, Dmitry; Magnus, Jan R., Forecast accuracy after pretesting with an application to the stock market, 2004.
Wago, H., Bayesian estimation of smooth transition GARCH model using Gibbs sampling, 2004.
Edmonds, Bruce; Moss, Scott, From KISS to KIDS—An 'anti-simplistic' modelling approach, 2005.
Calvi, Gianguglielmo; Pezzulo, Giovanni, Designing and implementing MABS in AKIRA, 2005.
Galan, Jose M.; Lopez-Paredes, Adolfo; Sauri, David, Urban water management with artificial societies of agents: The FIRMABAR simulator, 2005.
Athanasiadis, Ioannis N.; Mentes, Alexandros K.; Mitkas, Pericles A.; Mylopoulos, Yiannis A., A hybrid agent-based model for estimating residential water demand, 2005.
Anon, Wisdom of the crowd, 2005.
Chen, Yiling; Chu, Chao-Hsien; Mullen, Tracy; Pennock, David M., Information markets vs. opinion pools: An empirical comparison, 2005.
Feigenbaum, Joan; Fortnow, Lance; Pennock, David M.; Sami, Rahul, Computation in a distributed information market, 2003.
Chiu, Chih-Chou; Lee, Tian-Shyug, Neural network forecasting of an opening cash price index, 2002.
Gimpel, H.; Makio, J.; Weinhardt, C., Multi-attribute double auctions in financial trading, 2005.
Shubik, M., A double auction market: teaching, experiment, and theory, 2005.
Fortnow, Lance; Kilian, Joe; Pennock, David M.; Wellman, Michael P., Betting boolean-style: A framework for trading in securities based on logical formulas, 2003.
Chen, Kay-Yut; Fine, Leslie R.; Huberman, Bernardo A., Forecasting uncertain events with small groups, 2001.

(56) References Cited

OTHER PUBLICATIONS

Se-Hak Chun; Kyoung-Jae Kim; Kim, S. H., Chaotic analysis of predictability versus knowledge discovery techniques: case study of the Polish stock market, 2002.
Bengio, Yoshua; Ducharme, Rejean; Lauzon, Vincent-Philippe, Experiments on the application of IOHMMs to model financial returns series, 2001.
Ghoshray, S., Efficient neural network model to predict stock market by using modified conditional density estimation, 1996.
Joyce Berg, Forrest Nelson and Thomas Rietz, Accuracy and Forecast Standard Error of Prediction Markets, 2003.
Joanna Glasner, Bettors: Election Will Be Tight, 2004.
University of Iowa News Release, IEM Predicts Google Post-IPO Price, 2004.
CBS News.com, The Crowd Knows Best, 2006.
Emile Servan-Schreiber, Presidential Reality Check, An Assessment of NewsFutures' 2004 US Election Prediction Markets, 2004.
James Surrowiecki, Smarter Than the CEO, 2004.
Ajit Kambil, You Can Bet on Idea Markets, 2003.
A. Grabowski and R.A. Kosinski, The Sis Model of Epidemic Spreading in a Hierarchical Social Network, 2004.
John Dvorak, ABC News: Two Wrongs Make a Right, date printed Jan. 26, 2006.
Javier Carbo, Jesus Garcia, and Jose M. Molina, Contribution of Referrals in a Reputation Model Based on Kalman Filtering vs. Fuzzy Sets, 2006.
Robin Hanson, Idea Futures, How Making Wagers on the Future Can Make it Happen Faster, Wired Magazine 1995, printed on Feb. 6, 2007.
Kay-Yut Chen and Charles R. Plott, Information Aggregation Mechanisms: Concept, Design and Implementation for a Sales Forecasting Problem, 2002.
Robin Hanson, Mark James, Sean Morgan, The Story of the Idea Futures Web Site, 1995, printed on Feb. 6, 2007.
Daniel Akst, Wagering on the Internet, 1996.
Terry Johnson, Alberta Report, A Real Marketplace of Ideas, Calgary Researchers Are Proving That Thoughts Could be Traded like Hog Bellies, Alberta Report, 1995, printed on Feb. 6, 2007.
Robin Hanson, The Policy Analysis Market (and FutureMAP) Archive, 2006, printed on Feb. 6, 2007.
Justin Lahart, CNN Money, Future Imperfect, 2003, printed on Feb. 6, 2007.
Noah Shachtman, Wired News, The Case for Terrorism Futures, 2003, printed on Jan. 19, 2006.
Hal R. Varian, A Good Idea with Bad Press, 2003, printed on Jan. 19, 2006.
James Surowiecki, The New Yorker, The Talk of the Town, The Financial Page, Decisions, Decisions, 2003, printed on Feb. 6, 2007.
Robin Hanson, Eliciting Objective Probabilities via Lottery Insurance Games.
T. Tanaka, T. Kurihara and M. Inoue, Dynamics of a Hogg-Huberman Model with Time-Dependent Reevaluation Rate, 2004.
Robin D. Hanson, Decision Markets, 1999.
Emile Servan-Schreiber, Justin Wolfers, David M. Pennock, Brian Galebach, Prediction Markets: Does Money Matter? 2004.
Joyce Berg, Robert Forsythe, Forrest Nelson, Thomas Rietz, Results From a Dozen Years of Election Future Markets Research, 2000.
University of Iowa News Release, Iowa Electronic Markets Forecasted Bush Win in Presidential Election, 2006, printed on Jan. 19, 2006.
The Washington Stock Exchange, Welcome to the Future of Political Forecasting!, 2006.
www.simonexchange.org, The Simon Exchange, Quantifying the Current Consensus, 2006.
www.ideosphere.com, "The Foresight Exchange Prediction Market," pages from website "Home," "FAQ," "Welcome," "Rules," printed Feb. 7, 2007.
Hal R. Varian, The New York Times, A Market Approach to Politics, Economic Scene, May 8, 2003.
www.simonexchange.org, Julian L. Simon, Markets Similar to the Simon Market, 2006.
www.intrade.com, Application Programmable Interface (API), 2006.
www.intrade.com, Trade Notifications, Dec. 14, 2004, printed on Feb. 8, 2006.
www.intrade.com, New Financial Contracts, Dec. 16, 2004, printed on Feb. 8, 2006.
Barbara Kiviat, The End of Management, 2004.
www.intrade.com, About Intrade, 2006.
www.intrade.com, How does it work?, printed on Feb. 8, 2006.
www.hedgestreet.com, Market Overview, HedgeStreet: The Future of Risk, printed on Feb. 8, 2006.
www.ideosphere.com, Foresight Exchange Awards and Press, printed Feb. 6, 2007.
www.poolitics.com, Science/Technology, Feb. 7, 2006.
www.poolitics.com, About Poolitics, printed Feb. 8, 2006.
http://answers.google.com/answers/faq.html, Google Answers: Frequently Asked Questions, printed on Jan. 26, 2006.
The Buzz Game Press Release, newsfutures Prediction Markets, Mar. 15, 2006, printed on Feb. 6, 2007.
Bo Cowgill, Putting Crowd Wisdom to Work, 2005.
David M. Pennock, Mike Dooley, Tejaswi Kasturi, Hongyu Yao, Tech Buzz Game, Yahoo!Research, Mar. 14, 2006.
The Tech Buzz Game, IT Systems Perspectives, IEEE, Jul. 2005.
BusinessWeek Online, The Power of Us, Jun. 20, 2005.
www.innocentive.com/faq.html "Innocentive," pages from website printed on Feb. 6, 2007.
www.tradesports.com, "Tradesports," pages printed from website, "FAQ: Most Asked," "Trading," "Home," printed Feb. 7, 2007.
www.wsex.com, "World Sports Exchange," pages from website "Frequently Asked Questions," "Home," printed Feb. 6, 2007.
www.hsx.com, "Hollywood Stock Exchange," pages printed from website, "Home," "About," "Tell Me More," on Feb. 6, 2007.
www.cantorindex.co.uk/index.jsp "Cantor Index," pages printed from website, "Home," and "About Cantor Index" on Feb. 6, 2007.
http://ems.ubc.ca/index.php, "Election Stock Market" pages printed from website, "Home" and "About this Market" on Feb. 6, 2007.
www.imw.tuwien.ac.at/apsm, "Austrian Political Stock Markets/ Austria Electronic Markets" pages from website printed on Feb. 6, 2007.
David M. Pennock, Steve Lawrence, C. Lee Giles and Finn Arup Nielsen, The Power of Play: Efficiency and Forecast Accuracy in Web Market Games, 2001.
www.biz.uiowa.edu/iem, "Iowa Electronic Markets," pages from website "Home," "About the IEM," and "FAQ" printed on Feb. 6, 2007.
www.inklingmarkets.com, "Markets by Inkling," pages from website "Home," "What are Prediction Markets," and "How Inkling Works" printed on Feb. 6, 2007.
www.Riffs.com, "Riffs" pages from website "Home" and "Help" printed on Feb. 6, 2007.
http:/us.newsfutures.com/home/home.html/home.html, "Newsfutures Prediction Markets," pages from website "Home" and "Learn More" printed on Feb. 6, 2007.
www.motorsport.com/ "Motors Sports.com" pages from website "Home," "Compete," and "Rules" printed on Feb. 6, 2007.
David M. Pennock, Steve Lawrence, Finn Arup Nielsen, C. Lee Giles, Extracting Collective Probabilistic Forecasts from Web Games, 2001.
Robin Hanson and Ryan Oprea, Manipulators Increase Information Market Accuracy, 2004.
Hal R. Varian, Can Markets Be Used to Help People Make Nonmarket Decisions?, 2003.
Sermo, Inc., Copyright Application, Titled "Display Screens for Information Community," Form TX, Application dated May 29, 2008, date of underlying publication Jun. 2006.
Sermo, Inc., Copyright Application, Titled "Display Screens for Information Community," Form VX, Application dated May 29, 2008, date of underlying publication Jun. 2006.
Sermo, Inc., Copyright Application, Titled "Display Screens for Information Community," Form TX, Application dated May 29, 2008, date of underlying publication Sep. to Nov. 2006.

(56) References Cited

OTHER PUBLICATIONS

Sermo, Inc., Copyright Application, Titled "Display Screens for Information Community," Form VX, Application dated May 29, 2008, date of underlying publication Sep. to Nov. 2006.
Wikipedia:About, http://en.wikipedia.org/wiki/Wikipedia:About, pp. 1-21.
Wikipedia:Consensus, http://en.wikipedia.org/wiki/Wikipedia:Consensus, pp. 1-9.
Examiner's First Report on Australian Patent Application No. 2006269467, dated Oct. 13, 2010.
Supplementary European Search Report for European Patent Application No. 06786439.7, dated Aug. 18, 2010.
Dignum et al., The Knowledge Market: Agent-Mediated Knowledge Sharing. Lecture Notes in Artificial Intelligence. 2003; 2691:168-79.
Kafentzis et al., Knowledge Marketplaces: Strategic Issues and Business Models. Journal of Knowledge Management. 2004;8(1): 130-46.
[No Author Listed], Demand Ventures Announces First Online Knowledge Auction to Provide New Digital Self Publishing Forum; Demand Launches Knex.com Preview Web Site. Business Wire. Sep. 8, 1999 (accessed Dec. 11, 2010 at http://findarticles.com/p/articles/mi_m0EIN/is_1999_Sept_8/ai_55687690/).
[No Author Listed], Demand Ventures Announces Knexa.com the World's First Online Knowledge Auction. Business Wire/HighBeam Research:Online Press Releases. Aug. 13, 1999 (accessed Dec. 11, 2010 at http://www.highbeam.com/doc/1G1-55434937.html).

\* cited by examiner fibromylagia —106
102 — 🧑 Hemifacial spasm —108
Decreasing or ACE-I in hypotensive CHF patients —110
104 — Ⓢ Chronic pain, chronic misery —112
Would you Fire this Patient or Take the Higher Road? —114
Pain medicine dilemma, what are my rights/obligations? —116
chronic neuropathic pain after liposuction procedure —118

FIG. 2 akopikis  My Sermo Rank: 1502nd

| Featured Postings 408 | | ⏱ Closing Soon (67) | ⟳ Recently Closed (317) | | |
|---|---|---|---|---|---|
| Title | Status | Medical Field | Age | Rating |
| Anesthesiologists Doing Locum Tenens | Open | Anesthesiol.... | 1 Week | ☆☆☆ |
| Guess the Lesion V – CT Included | Open | Otolaryngolo... | 1 Week | ☆☆☆ |
| Case o' the day 6.2.07 | Open | Radiology | 41 hours | ☆☆☆☆☆ |
| DVT prophylaxis for late stage ALS | Open | Internal Med... | 5 days | ☆☆☆ |
| Neuroradiology case 3 5/25/07 | Closing | Radiology | 1 Week | ☆☆☆ |
| From the Founder – A strategic alliance with the AMA | Open | Surgery | 1 Week | ☆☆☆☆☆ |
| Lower dose Avastin for Lung Cancer | Open | Hematology/... | 3 days | ☆☆☆ |
| Prevalence of HPV–DNA testing in your practice | Open | Gynecology | 5 days | ☆☆☆☆☆ |
| Imaging case of the day 531 | Open | Radiology | 6 days | ☆☆☆ |
| Acute Porphyria and Anemia | Open | Hematology/... | 4 days | ☆☆☆ |
| Postings in your specialties: | New | Most Popular | Highly Rated | All (397) |
| Postings across the community: | New | Most Popular | | All (6811) |

| sermo | Home | Opportunities | Postings | My Account | Using Sermo | ▣ Refer Colleagues and get a $200 gift |

Opportunities

All | Recent | Search Postings | Go

Showing items 1 Of 6 of 6 | Show: [ ˅ ]

| Opportunity | Medical Field | Date | Partic. | Commts | Amount | Rating | Taken |
|---|---|---|---|---|---|---|---|
| Is Xigris effective if late? | Internal Medicine | 4/11 | 123 | 7 | | ☆☆☆✔ | |
| Thyroid Disease During Pregnancy | Internal Medicine | 4/02 | — | 24 | $250 | ☆☆ | |
| Does Claritin and Lexapro cause weight gain? | Family Medicine | 4/03 | 32 | 24 | $75 | ☆ | |
| Managing Insomnia—A primary care perspective | Pediatrics | 4/02 | — | 24 | | ☆☆ | |
| Right heart failure caused by pulmonary hypertension | Family Medicine | 4/01 | — | 24 | $50 | ☆☆ | |
| Colorectal Cancer Prevention and Early Detection | Pediatrics | 4/10 | 18 | 12 | | | 4/15/07 |

HotSpots Summary sermo | Home | Postings | HotSpots | My Account | Using Sermo Welcome, Alexis | Sign Out ☐ Refer Colleagues and get a $200 gift | Post to Sermo Summary | Reports Search Postings [Go]

[Pause] [Resume] [Delete] [Edit] [Add]  Find: [ ] Show: [All ▽] From: [1/1/07 ▽] To: [4/17/07 ▽]
— 620   — 622    — 624    — 626   — 618     — 604    — 606    — 608    — 610    — 612    — 614

| | HotSpot Name | Status | Impressions | Clicks | Click Rate | Uniques | CPC/CPA |
|---|---|---|---|---|---|---|---|
| ☑ | Thyroid Disease During Pregnancy — 602 | Active — 616 | 1,600 | 134 | 12% | 1300 | $6.50 |
| ☐ | Is Xigris effective if late? | Paused | 357 | 22 | 13% | 8 | $6.50 |
| ☐ | Managing Insomnia—A primary care perspective | Active | 698 | 172 | 7% | 125 | $6.50 |
| ☐ | Right heart failure caused by pulmonary hypertension | Active | 6,870 | 1,037 | 10% | 973 | $6.50 |
| ☐ | Colorectal Cancer Prevention and Early Detection | Draft | | | | | |

*1300* sermo | Home | Postings | HotSpots | My Account | Using Sermo

Summary | Reports    [Search Postings] [Go]

HotSpot: Is Xigris Effective if late? —— *1302*
View the latest performance information about your HotSpot

*1304*
ⓢ Earning Opportunity
Status:    Active until 5/12/07
Rating:    ☆☆☆ —— *1306*
Comments: 4 —— *1308*

Preview: [Pause] [Resume] [Clone] [Delete]
Thyroid Disease During Pregnancy
This is a great opportunity to learn about complications in Levothyroxing patients.
Feburary 27th, 2007 at 12:28 am Summary Performance —— *1310*

Start Earning ⇨

Impressions:           1600 —— *1312*
Clicks: (Target 500)   134 —— *1314*
Clicks rate:           12% —— *1316*
Uniques:               72 —— *1318*
CPC/CPA                $6.50 —— *1320*
Cost: (Target $500)    $125 —— *1322*

Chart [Impressions & Clicks ⌄]

*1324*
3.000 ─
— Clicks
— Impressions
0
5/10          5/14

*1326*
Discussions              View most recent
S00511 Nov 29, 2006 at 9:44 PM
I usually do a complete thyroid function test—THS,T4 T4. I will add thyroid–peroxidase antibodies and thyroglobulin depending on the history—both personal and family or my suspicion for thyroid reys110 Nov 29, 2006 at 10:37 PM
Do the TFT's first and the clinical examination with history will help to decide the further magt.

Add your comment              View Oldest

[                                    ]

[Add Comment]

Top Keywords
92% Xigris
3% Thyroid

Top Specialities
62% Internal Medicine
17% Immunology

COMMUNITY MODERATED INFORMATION

RELATED APPLICATIONS

This application claims priority under 35 U.S.C. § 119(e) to U.S. Provisional Application Ser. No. 60/989,556, entitled "COMMUNITY MODERATED INFORMATION," filed on Nov. 21, 2007, which is herein incorporated by reference in its entirety.

BACKGROUND

The phenomenon of like-minded people going online to share ideas, trade, or compete is well-accepted. In moving from the physical world to the digital one, users create virtual "communities" where they are bound together by the similarities of their interests or activities, rather than the proximity of their location. These communities can take any number of forms, the most basic being discussion groups, chat rooms, blogs, and forums, which are, in effect, offline communities reincarnated online.

Social network theory (SNT) describes how individuals within a community interact with one another and the community as a whole. Prediction markets (PM) are a newer discipline that have shown that individuals competing with one another for real or hypothetical rewards collectively can make more accurate predictions than organized bodies, who might have access to higher quality information.

Social network theory illustrates the ability of persons to influence one another. What might appear as random conversations between people in the off-line world, when viewed on-line, can show clear patterns of influence. In practice, people relate to one another in different ways. For example, certain people are more promiscuous in their interactions, speaking with several different people simultaneously, while others interact with fewer users, but perhaps more frequently. One of the reasons SNT is studied is that by understanding the mappings connecting an individual to others, one can evaluate the social and or professional "capital" of that individual. In practice, this social capital refers to the network position of the person and reflects their ability to draw on the resources available to the members of the network. Human social networks comprise individuals that interact with each other through family, work, recreation, community, social, and other activities. Common to these interactions is the establishment of relationships that rely on patterns of connection and information exchange processes.

An effective on-line system mimics these interactions. Individuals are able to re-identify each other in the system, as well as identify all the additional members that the system allows them to come in contact with. Individuals influence each other directly, through, for example, persuasion, orders, providing information and acting as role models, and they adjust or modify their behavior in consequence of their interaction with other individuals, and the environment in which they operate. Communication, and thus social comparison, depends on the individuals. New issues promote discussion and comparison as agreement patterns emerge.

Markets are considered to be a method of allocating resources among competing uses. Markets can also be used when there is an absence of an arbiter with helpful information. Prices ensure that the different agents competing for access have a common standard for comparison across different choices. The market clearing process ensures that each resource is assigned to its best use. Different market designs satisfy different purposes.

Continuous double auction markets provide goods on demand to buyers who are willing to pay the going rate, while call or options markets improve prices for buyers and sellers when time is not the most crucial factor, allowing for hedging and risk allocation. When a plurality of buyers have needs for different goods, which also are interdependent, combination markets may be necessary.

Prediction markets are a form of market in which the goods being traded are securities whose values are determined by the outcomes of future events. The securities are structured so that trading between buyers and sellers causes the price to reflect the probability of the underlying event. When a trader sees a market price (probability) that is less than her expected probability for the event, she will see a profit opportunity in buying more, thus likely driving the price up. The new price reflects a higher probability to others monitoring the market.

Prediction markets have been applied to a variety of problems and questions. Several variations on the basic idea have been described, making it possible to find answers for many different types of questions, or apply the concept in a wider set of circumstances. New variations of the original prediction market concept suggested ways to support conditional bets, which would elicit estimates about the relative chances that alternative approaches would have of achieving certain outcomes. In these variations, pari-mutuel style betting is combined with standard double-auction prediction markets to increase the liquidity of the markets at the cost of having prices that don't directly reflect probabilities.

SUMMARY

Combining the concepts of social networks and prediction markets into a viable environment (ecosystem) is not a trivial task. Even where a stable environment is achieved the system's stability may be subject to outside influence. Some environments depend on outside sources of information in order to achieve their goals. Dependence and/or use of outside sources of information may be a double edged sword. In one sense, outside information allows a community to thrive—providing useful, relevant, and provocative information to the community that is based in part on the exchange of knowledge. Conversely, outside sources of information can pollute such a community, when the information isn't relevant, focused, or simply isn't trustworthy. The proliferation of irrelevant information could jeopardize the community, an environment, the ecosystem itself.

In particular, advertising presents significant issues to a viable ecosystem. Traditional advertisement may detract from an ecosystem that is based in part on the exchange of knowledge. Traditional advertisements may annoy, distract, and impede efficient exchange of ideas and information. However, it is recognized that advertisements themselves convey information. In certain circumstances, this sponsored or commercial information is useful, relevant, and would assist in the exchange of information and ideas. One of the difficulties in introducing advertising includes how to weed out advertisements, or other sponsored information, that would detract from, while preserving information that would serve, the ecosystem.

According to one aspect, an approach is provided for introducing external information sources (ads, sponsored information, etc) while insuring the right information is presented in the right way, at the right time, in the right place, to the right audience. Various implementations of this approach perform various aspects of the right information, right way, right time, right place, and right audience model, and more importantly, it is the attempt to achieve these various aspects disclosed, either singly or in combination, and not necessarily the actual achievement of all of those factors, alone or in combination, that assist the functioning of an ecosystem. Both irrelevant and relevant information will likely be introduced, but as discussed in greater detail below various aspects and embodiments enable the ecosystem to cull the relevant and/or useful information from irrelevant and/or detrimental information.

According to one aspect, an approach is provided that assists in presenting the right information within the ecosystem. The approach involves associating information sources (ads, sponsored information, research requests, debate notices, seminars, education opportunities, peer generated information, etc) with a feedback mechanism. In one embodiment, the feedback mechanism includes a scoring feature, where individual participants within the ecosystem rate the relevancy and/or importance of the information provided. In one example, a user is notified that a potentially relevant information source is available. The notification is typically displayed unobtrusively within a browser or interface window that the user is navigating. In one implementation, the user must perform some affirmative action to reach information associated with the information opportunity. In one example, requiring an affirmative action serves as a shield from pop-ups, banner-ads, and other distracting form of advertising. It is also realized that allowing the user to select the information opportunity rather than display it immediately permits the user to decide explore the opportunity. In one example, permitting the user to decide to explore the opportunity increases the user's receptivity to the information opportunity. In one embodiment, information associated with the information opportunity is displayed in response to user selection. The information associated with the information opportunity describes the information opportunity available. The user is provided with the opportunity to evaluate the information opportunity without being required to visit it and/or review it in its entirety. The information associated with the information opportunity may also be displayed with user feedback.

According to another aspect, an approach is provided to assist in presenting information at the right time. In one embodiment, the approach includes contextually matching information opportunities to activity being performed by a user. In one, example, a user reviews ticket within the ecosystem related to a particular subject. Matching information opportunities to the activities being performed improves user receptivity. In another embodiment, providing indicators for information opportunities permits the user to control the time s/he reviews any information opportunities. One should appreciate that various aspects of right information, right way, right time, right place, right audience concepts are not necessarily mutually exclusive, and the invention should not be limited based on any categorization of an element, elements, feature, or features serving one or more functions.

According to another aspect, information opportunities may be presented within an ecosystem that performs as an information brokering service. According to example in which moderated information opportunities may be incorporated, a system and method is provided that provides an early indication of consensus of opinion among a number of users regarding an event or observation indicated by a user. Such an opinion may be interesting to a consumer of information, who may be interested in determining the outcome of the consensus relating to the event or observation. Such recognition of early events or observations may be useful in different areas, such as healthcare, finance, etc., where initial observations, if provided early, allow resulting decisions to be made much earlier. The opinion may, for instance, be used as an early indicator of problem with a product, company, new insight on a disease, awareness of a disease outbreak, etc. Such an opinion or observation may permit an investor or other information consumer to take a position or take action at a much earlier point than if s/he relied on traditional sources of information. Thus, such opinion information may be a valuable tool for monitoring events.

Similarly, such a tool may be also valuable for participants in the advancement of ideas, especially those that rely on collaboration between people (e.g., research) and consensus between observers. However, conventional social networking systems or other online communities are insufficient for determining what information is likely to be quality information versus a random or incorrect observation or prediction. That is, it is appreciated that such conventional systems are incapable of distinguishing quality data from noise. In one example, introducing external sources of information coupled with feedback mechanisms preserves the ability of the system to achieve consensus of opinion, while at the same time exposing the system to additional sources of information that may influence consensus.

According to one example of an information brokering system, a distributed system is provided for determining a consensus of opinion among users. According to one embodiment, the system may be capable of accepting original observations and opinions submitted by users. The system may adjudicate and provide incentives for users to make and vote on observations, opinions and/or predictive events. In another example of an information brokering service, users are permitted to define the issues being voted on. Because users create the issues, an online system that permits users to define the issues can function as an early warning system, whereby users having an observation can submit the observation to the system. Such users may be in a position to make the observation at an earlier point than traditional methods of monitoring issues (e.g., waiting for a journal article to come out on a particular issue, an FDA action in response to an issue, etc.), and thus the early observation may be useful. In such an example, moderated information sources may be essential to efficient dissemination of external information, while preserving the efficient operation of establishing early observations. Indeed, information opportunities in some embodiments, may serve to facilitate the identification of early observations, by facilitate community awareness and even interest in participating in a particular issue.

According to another implementation of an information brokering service, a method is provided for determining consensus of opinion relating to an observation, opinion, and/or a predictive event, used herein interchangeably as set forth by a user. A user may submit an idea to an online system, and other users may submit their opinion of the observation. In one embodiment, users of the system may be provided incentives to both create their own observations as well as provide their opinions on observations created by other users. These incentives may be in the form of money paid to users for their observations and opinions of observations. Moderated information sources may be presented in conjunction with submitted observations. In one example, indicators of moderated information sources are presented to users unobtrusively so as not to distract from users observations, but to provide material that is relevant to the particular observations being submitted and/or reviewed.

In one example information brokering service, users submit observations in the form of "tickets" to an online system, the tickets including information relating to the observation or opinion. These tickets may be, for instance, holders for an observation or opinion in the online system. These tickets may be displayed to other users of the online system, where these other user users may view and cast a "vote" expressing their opinion on the observation.

The system may permit a number of users to vote on the ticket, and, based on the voting performed by users, determine whether there is consensus forming among the users regarding the observation or opinion. In this manner, the ticket and its associated observation or opinion may be submitted for feedback to the online system. There, the observation or opinion may be corroborated, refuted, and/or explained by others.

Other users may, for example, corroborate or otherwise agree with an observation, modify the observation, or disagree with the observation. In one example system, a user may be permitted to "agree" or "disagree" with an observation or opinion. That is, the user may be permitted to submit either a positive or negative response.

According to aspect, an approach is employed that permits external information providers access to the on-line ecosystem by submitting community moderated advertisements. In one embodiment, external information providers encompass newsgroups, journal publications, seminars, peer groups, blogs, chatrooms, and advertisers. One should appreciate that the invention should not be limited to any external information provider, as information that is useful and/or relevant.

According to one aspect, information opportunities are presented to participants in the ecosystem. Information opportunities may be in the form of specific advertisements, but may also take the form of commercially generated information. In the context of medical services, information opportunities may be education material on specific drugs, protocols, or procedures. Such information opportunities may convey information regarding the efficacy of a particular drug, and/or protocol. In one example an information opportunity identifies incidents of certain epidemiology, and may also include recording/tracking of such incidents.

According to one aspect, information opportunities are contextually matched to activities performed by ecosystem participants. In one example, searches performed by a participant are contextually matched to information opportunities and an indicator is presented in conjunction with the search results. In another example, only an indicator rather than the information opportunity itself is presented. The participant in the ecosystem has to take some affirmative action in order to access the information opportunity. In one embodiment, the ecosystem participant has the opportunity to not receive information opportunities even when indicators appear with search results. In another embodiment, a user may configure his account to not receive even the indicators. According to one aspect, a visual indicator of an information opportunity may be small form icons designed to be unobtrusive. In another aspect, the visual indicator of an information opportunity are subject to display thresholds, so now matter how many contextual matches occur only a predetermined number of indicators will appear. The system will automatically determine which indicators of a number of choices will appear. According to one embodiment, queuing technology is employed to insure a fair distribution of selected indicators, whereas in other embodiments selection may be based on relevance rating, user rankings, among other options.

According to one aspect of the present invention, a method for performing advertising is provided. The method comprises acts of permitting the submission of at least one advertisement to an ecosystem comprising a plurality of users, displaying the at least one advertisement to the plurality of users of the ecosystem, providing for at least one of the plurality of users to submit feedback for the at least one advertisement, displaying the feedback with the at least one advertisement. According to one embodiment of the present invention, the method further comprises an act of displaying an indicator for the at least one advertisement. According to another embodiment of the invention, the method further comprises an act of generating the indicator the at least one advertisement. According to another embodiment of the invention, the indicator conveys a type of the advertisement available. According to another embodiment of the invention, the method further comprises an act of requiring an affirmative action by a user to display advertising information.

According to one embodiment of the present invention, the affirmative action comprises at least one of moving a pointer over the indicator, clicking the indicator, and triggering the indicator. According to another embodiment of the invention, the type of opportunity comprises at least one of an earn opportunity, a learn opportunity, and a general opportunity. According to another embodiment of the invention, the type of opportunity is an earn opportunity, wherein the earn opportunity further comprises remuneration for participating in designated activity. According to another embodiment of the invention, the designated activity comprises participation in at least one of a survey, poll, research task, professional opinion solicitation, professional practice, debate, seminar, and peer review. According to another embodiment of the invention, the designated activity comprises participation in a drug related survey, epidemiology research, medical informatics, patient research, rendering medical opinion, medical diagnosis, laboratory analysis, medical peer review, medical journal submission, and medical practice.

According to one embodiment of the present invention, the type of opportunity is a learn opportunity, wherein the learn opportunity comprises at presentation of at least one of medical practice information, continuing medical education, seminar information, medical collaboration, medical research information, and medical practice advancements. According to another embodiment of the invention, the learn opportunity comprises a presentation of professional education opportunity, professional practice issues, peer generated information, leading professional theory, and advancement in professional practice. According to another embodiment of the invention, the feedback comprises a rank associated with the at least one advertisement. According to another embodiment of the invention, the feedback comprises comments submitted by at least one user. According to another embodiment of the invention, the method further comprises an act of restricting display of the at least one advertisement based on the feedback.

According to one embodiment of the present invention, the method further comprises an act of establishing a display threshold for the indicator. According to another embodiment of the invention, the method further comprises an act of determining the display threshold has not been exceeded. According to another embodiment of the invention, the method further comprises an act of filtering the at least one advertisement based on demographic information. According to another embodiment of the invention, the act of filtering the at least one advertisement based on demographic information includes filtering based on at least one of professional qualification, professional specialty, area of interest, ethnicity, sex, age, education, residence, and geographical location. According to another embodiment of the invention, the method further comprises an act of presenting information associated with the at least one advertisement as a first tier display in response to a selection by a user of the indicator.

According to one embodiment of the present invention, the first tier display comprises at least one of a light box, a partially transparent browser window, a new browser window, and a display overlay. According to another embodiment of the invention, the first tier display further comprises a rank for the at least one advertisement. According to another embodiment of the invention, the rank is generated from user feedback. According to another embodiment of the invention, the first tier display further comprises a display indicating user review of the at least one advertisement. According to another embodiment of the invention, the indication of user review comprises comment by at least one user. According to another embodiment of the invention, the first tier display provides an indication of a reputation of the at least one user.

According to one embodiment of the present invention, the indication of reputation includes at least one of a reputational ranking for at least one user, an indication of at least one user's credentials, and an indication of requirements for displayed commentary. According to another embodiment of the invention, the method further comprises an act of directing the target user to an external source for the at least one advertisement in response to the user selection in the first tier display. According to another embodiment of the invention, the method further comprises an act of notifying the target user of the direction to an external source. According to another embodiment of the invention, the method further comprises an act of matching, contextually, the at least one advertisement to activity within an ecosystem. According to another embodiment of the invention, the act of matching, contextually, the at least one advertisement to activity within an ecosystem further comprises matching the at least one advertisement to user activity.

According to one embodiment of the present invention, the user activity comprises at least one of searching within the environment, keyword identification, navigation, communication, and historical usage. According to another embodiment of the invention, the method further comprises an act of permitting a user to opt out of receiving the at least one advertisement. According to another embodiment of the invention, the act of displaying the at least one advertisement to the plurality of users of the ecosystem occurs in response to user action. According to another embodiment of the invention, user action comprises at least one of searches for the at least one advertisement and navigation to a section of the ecosystem containing the at least one advertisement.

According to one aspect of the present invention, a method for performing advertising is provided. The method comprises providing an advertising interface for at least one client to generate at least one advertising ticket for display to an ecosystem comprising a plurality of users, providing for feedback associated with the at least one advertising ticket, and displaying the advertising ticket to the plurality of users, and managing display of the advertising ticket in response to feedback. According to one embodiment of the present invention, the method further comprises an act of providing incentives to the at least one client to provide relevant information through the at least one advertising ticket. According to another embodiment of the invention, the incentive comprises at least one of increased display position, increased relevancy rating, decreased cost of ticket generation, and improved reputation associated with advertising tickets. According to another embodiment of the invention, the method further comprises an act of providing disincentives to the at least one client based upon negative feedback for the at least one advertising ticket. According to another embodiment of the invention, the disincentives comprise at least one of increased cost associated with ticket generation, restricted display, restricted display position, decreased relevancy rating, and decreased reputation associated with advertising tickets.

According to another embodiment of the invention, the method further comprises an act of defining a user role from community participants that permits generation of advertising tickets. According to another embodiment of the invention, the method further comprises an act of suspending the user in response to negative feedback.

According to one aspect of the present invention, a method for an approach to linking external sources of information to an ecosystem comprising a plurality of users is provided. The method comprises acts of displaying to at least one user of the ecosystem at least one external information source, providing for at least one of the plurality of users to submit feedback for the at least one external information source, and displaying the feedback with information associated with the at least one external information source. According to one embodiment of the present invention, the method further comprises an act of matching, contextually, at least one external information source to activity within the ecosystem. According to another embodiment of the invention, the activity within the ecosystem comprises activity of at least one user. According to another embodiment of the invention, the activity of the at least one user comprises searching, navigation, and communication.

According to one embodiment of the present invention, displaying the feedback with information associated with the at least one external information source occurs in response to a selection by the user. According to another embodiment of the invention, the feedback comprises at least one of a ranking and user commentary. According to another embodiment of the invention, the method further comprises an act of displaying additional information associated with the at least one external information source. According to another embodiment of the invention, the detailed information associated with the external information source includes at least one of a provider associated with external information. According to another embodiment of the invention, the method further comprises an act of directing at least one user to the external information source in response to an affirmative act by the user. According to another embodiment of the invention, the method further comprises an act of notifying the user of leaving the ecosystem. According to another embodiment of the invention, the method further comprises an act of providing an incentive to link relevant information to the ecosystem. According to another embodiment of the invention, the incentive comprises an award, a monetary disbursement, a credit, a reputation related award, and ecosystem benefit.

According to one aspect of the present invention, an interface for generating advertisements is provided. The interface comprises a format engine adapted to display an advertisement template, a subject engine adapted to display requirements for topical information associated with at least one moderated advertisement, a tagging engine adapted to assign at least one tag to the topical information associated with a moderated advertisement, and a preview engine adapted to display a preview of the moderated advertisement. According to one embodiment of the present invention, the subject engine is further adapted to display optional entries for topical information associated with a moderated advertisement. According to another embodiment of the invention, the requirements for topical information comprises at least one of a type of moderated advertisement, a title, a description, target information, and a destination. According to another embodiment of the invention, the target information comprises at least one of a keyword and specialty. According to another embodiment of the invention, the destination comprises at least one of a uniform resource indicator and an internal posting. According to another embodiment of the invention, the optional entries for topical information comprises at least one of a description, target information, a destination, a time period, a background, target clicks, and budget.

According to one aspect of the present invention, a method for information distribution to an ecosystem comprising a plurality of users is provided. The method comprises acts of establishing criteria for identifying at least one target for at least one information opportunity, matching, contextually, the at least one information opportunity to activity within the ecosystem, establishing a display threshold for an indicator of the at least one information opportunity, and displaying the indicator for the at least one information opportunity to at least one of the plurality of users. According to one embodiment of the present invention, the act of displaying the indicator for the at least one information opportunity, further comprises an act of determining the display threshold has not been exceeded. According to another embodiment of the invention, the act of displaying the indicator for the at least one information opportunity, further comprises an act of determining the criteria for identifying a target has been met. According to another embodiment of the invention, the method further comprises an act of conveying the type of the at least one information opportunity using the indicator. According to another embodiment of the invention, the method further comprises an act of requiring the at least one user to take an affirmative action in order to learn information regarding the at least one information opportunity.

According to one embodiment of the present invention, the affirmative action comprises at least one of moving a pointer over the indicator, clicking the indicator, and triggering the indicator. According to another embodiment of the invention, the method further comprises an act of providing the at least one at least one user with the option of not receiving the at least one information opportunity. According to another embodiment of the invention, the at least one information opportunity comprises at least one of a learn opportunity, an earn opportunity, and a general opportunity. According to another embodiment of the invention, the method further comprises an act of filtering the at least one information opportunity based on professional criteria. According to another embodiment of the invention, the at least one information opportunity comprises at least one of medical practice information, continuing medical education, seminar, collaboration, research information, and medical practice advancements. According to another embodiment of the invention, the at least one information opportunity comprises at least one of education opportunity, practice issues, peer generated information, practice theory, and professional advancement.

According to one embodiment of the present invention, the filtered at least one information opportunity comprises at least one earn opportunity. According to another embodiment of the invention, the at least one earn opportunity comprises remuneration for participating in designated activity. According to another embodiment of the invention, the designated activity comprises participation in at least one of a survey, poll, research task, professional opinion solicitation, professional practice, debate, seminar, and peer review. According to another embodiment of the invention, the designated activity comprises participation in a drug related survey, epidemiology research, medical informatics, patient research, rendering medical opinion, medical diagnosis, laboratory analysis, medical peer review, medical journal submission, and medical practice. According to another embodiment of the invention, the act of displaying the indicator for the at least one information opportunity, further comprises an act of identifying interest in the at least one information opportunity. According to another embodiment of the invention, the method further comprises an act of presenting the at least one information opportunity as a first tier display in response to an affirmative action by the at least one user.

According to one embodiment of the present invention, the first tier display comprises a light box, transparent browser window, partially transparent browser window, new browser window, and a display overlay. According to another embodiment of the invention, the first tier display describes a type of information opportunity available. According to another embodiment of the invention, the first tier display minimizes detail associated with the at least one information opportunity. According to another embodiment of the invention, the first tier display further comprises a rank for the at least one information opportunity. According to another embodiment of the invention, the rank is generated from at least one user's feedback. According to another embodiment of the invention, the first tier display further comprises a display indicating peer review of the at least one information opportunity. According to another embodiment of the invention, the indication of peer review comprises comments by peer users. According to another embodiment of the invention, the first tier display provides an indication of reputational strength of at least one peer user. According to another embodiment of the invention, the indication of reputational strength includes at least one of a reputational ranking for at least one peer user, an indication of at least one peer user's credentials, and an indication of requirements for displayed commentary.

According to one embodiment of the present invention, the method further comprises an act of displaying an intermediate display in response to the at least one user's selection, wherein the intermediate display displays additional information associated with the information opportunity. According to another embodiment of the invention, the intermediate display further comprises a rank for the at least one information opportunity. According to another embodiment of the invention, the rank is generated from at least one at least one user feedback. According to another embodiment of the invention, the intermediate display further comprises a display indicating peer review of the at least one information opportunity. According to another embodiment of the invention, the indication of peer review comprises comments by peer users. According to another embodiment of the invention, the intermediate display provides an indication of reputational strength of at least one peer user. According to another embodiment of the invention, the method further comprises an act of presenting topical information associated with the at least one information opportunity in response to a user selection.

According to one embodiment of the present invention, the topical information comprises summary information associated with the at least one information opportunity. According to another embodiment of the invention, the additional information comprises at least one of a client offering the at least one information opportunity, a good or service associated with the at least one information opportunity, a solicitation for professional services from at least one user of the trusted environment, and an educational opportunity associated with professional services. According to another embodiment of the invention, the method further comprises an act of directing the at least one user to an external source for completing the at least one information opportunity in response to the at least one user's selection. According to another embodiment of the invention, the method further comprises an act of directing the at least one user to an external source for completing the at least one information opportunity in response to the at least one user's selection. According to another embodiment of the invention, the method further comprises an act of notifying the at least one user of the direction to an external source.

According to one embodiment of the present invention, the method further comprises and act of notifying the at least one user of the direction to an external source. According to another embodiment of the invention, the act of matching, contextually, the at least one information opportunity with user activity, further comprises matching based on user activity. According to another embodiment of the invention, the user activity comprises at least one of searching executed within the environment, keyword identification of reviewed material, navigation with the environment, communication among participants, and historical usage. According to another embodiment of the invention, the act of matching, contextually, the at least one information opportunity, further comprises matching based on demographics associated with the at least one user. According to another embodiment of the invention, the demographics associated with the at least one user comprise at least one of specialty, area of interest, ethnicity, sex, age, education, residence, and geographical location.

According to one aspect of the present invention, computer-readable media having computer-readable signals stored thereon that define instructions that, as a result of being executed by a computer, instruct the computer to perform a method for introducing information sources to an ecosystem, are provided. The computer-readable media include separate computer-readable media with signals stored thereon for performing each individual element of the methods described above, and computer-readable media for performing the method elements described above in combination.

According to one aspect of the present invention, a computer implemented method for introducing information sources into an ecosystem is provided. The method comprises the acts of permitting the submission of at least one information source to an ecosystem comprising a plurality of users, displaying an indicator for the at least one information source to the plurality of users of the ecosystem, providing for at least one of the plurality of users to submit feedback for the at least one information source, displaying a summary view of the information source in response to selection of the indicator, and displaying the feedback in the summary view of the information source. According to one embodiment of the present invention, the method further comprises an act of matching contextually activity within the ecosystem to the at least one information source. According to another embodiment of the invention, the method further comprises an act of selecting the information source in response to the act of matching contextually. According to another embodiment of the invention, the indicator conveys a type of the information source available. According to another embodiment of the invention, the method further comprises an act of requiring an affirmative action by a user to display the information source.

According to one embodiment of the present invention, the affirmative action comprises at least one of moving a pointer over the indicator, clicking the indicator, and triggering the indicator. According to another embodiment of the invention, the type of opportunity comprises at least one of an earn opportunity, a learn opportunity, and a general opportunity. According to another embodiment of the invention, the type of opportunity is an earn opportunity, wherein the earn opportunity further comprises remuneration for participating in designated activity. According to another embodiment of the invention, the designated activity comprises participation in at least one of a survey, poll, research task, professional opinion solicitation, professional practice, debate, seminar, and peer review. According to another embodiment of the invention, the designated activity comprises participation in a drug related survey, epidemiology research, medical informatics, patient research, rendering medical opinion, medical diagnosis, laboratory analysis, medical peer review, medical journal submission, and medical practice. According to another embodiment of the invention, the type of opportunity is a learn opportunity, wherein the learn opportunity comprises at presentation of at least one of medical practice information, continuing medical education, seminar information, medical collaboration, medical research information, and medical practice advancements.

According to one embodiment of the present invention, the learn opportunity comprises a presentation of professional education opportunity, professional practice issues, peer generated information, leading professional theory, and advancement in professional practice. According to another embodiment of the invention, the feedback comprises a rank associated with the at least one information source. According to another embodiment of the invention, the feedback comprises comments submitted by at least one user. According to another embodiment of the invention, the method further comprises an act of restricting display of the at least one indicator of an information source based on the feedback. According to another embodiment of the invention, the method further comprises an act of establishing a display threshold for the indicator. According to another embodiment of the invention, the method further comprises an act of determining the display threshold has not been exceeded. According to another embodiment of the invention, the method further comprises an act of filtering the at least one information source based on demographic information. According to another embodiment of the invention, the act of filtering the at least one information source based on demographic information includes filtering based on at least one of professional qualification, professional specialty, area of interest, ethnicity, sex, age, education, residence, and geographical location.

According to one embodiment of the present invention, the summary view comprises at least one of a light box, a partially transparent browser window, a new browser window, and a display overlay. According to another embodiment of the invention, the summary view further comprises a rank for the at least one information source. According to another embodiment of the invention, the rank is generated from user feedback. According to another embodiment of the invention, the summary view further comprises a display indicating user review of the at least one information source. According to another embodiment of the invention, the indication of user review comprises comment by at least one user. According to another embodiment of the invention, the summary view provides an indication of a reputation of the at least one user. According to another embodiment of the invention, the indication of reputation includes at least one of a reputational ranking for at least one user, an indication of at least one user's credentials, and an indication of requirements for displayed commentary. According to another embodiment of the invention, the method further comprises an act of directing at least one user to an external source for the at least one information source in response to user selection in the summary view. According to another embodiment of the invention, the method further comprises an act of notifying the at least one user of the direction to an external source. According to another embodiment of the invention, the act of matching, contextually, the at least one information source to activity within an ecosystem further comprises matching the at least one information source to user activity.

According to one embodiment of the present invention, the user activity comprises at least one of searching within the environment, keyword identification, navigation, communication, and historical usage. According to another embodiment of the invention, the method further comprises an act of permitting a user to opt out of receiving the at least one indicator of an information source. According to another embodiment of the invention, the act of displaying the at least one indicator of an information source to the plurality of users of the ecosystem occurs in response to user action. According to another embodiment of the invention, user action comprises at least one of searches in the ecosystem and navigation to a section of the ecosystem organizing information sources.

According to one aspect of the present invention, a computer-readable medium having computer-readable signals stored thereon that define instructions that, as a result of being executed by a computer, instruct the computer to perform a method for introducing information sources to an ecosystem is provided. The method comprises the acts of permitting the submission of at least one information source to an ecosystem comprising a plurality of users, displaying an indicator for the at least one information source to the plurality of users of the ecosystem, providing for at least one of the plurality of users to submit feedback for the at least one information source, displaying a summary view of the information source in response to selection of the indicator, and displaying the feedback in the summary view of the information source. According to one embodiment, the method further comprises an act of matching contextually activity within the ecosystem to the at least one information source. According to another embodiment of the invention, the method further comprises an act of selecting the information source in response to the act of matching contextually. According to another embodiment of the invention, the indicator conveys a type of the information source available. According to another embodiment of the invention, the method further comprises an act of requiring an affirmative action by a user to display the information source. According to another embodiment of the invention, the affirmative action comprises at least one of moving a pointer over the indicator, clicking the indicator, and triggering the indicator.

According to one embodiment of the present invention, the type of opportunity comprises at least one of an earn opportunity, a learn opportunity, and a general opportunity. According to another embodiment of the invention, the type of opportunity is an earn opportunity, wherein the earn opportunity further comprises remuneration for participating in designated activity. According to another embodiment of the invention, the designated activity comprises participation in at least one of a survey, poll, research task, professional opinion solicitation, professional practice, debate, seminar, and peer review. According to another embodiment of the invention, the designated activity comprises participation in a drug related survey, epidemiology research, medical informatics, patient research, rendering medical opinion, medical diagnosis, laboratory analysis, medical peer review, medical journal submission, and medical practice. According to another embodiment of the invention, the type of opportunity is a learn opportunity, wherein the learn opportunity comprises at presentation of at least one of medical practice information, continuing medical education, seminar information, medical collaboration, medical research information, and medical practice advancements.

According to one embodiment of the present invention, the learn opportunity comprises a presentation of professional education opportunity, professional practice issues, peer generated information, leading professional theory, and advancement in professional practice. According to another embodiment of the invention, the feedback comprises a rank associated with the at least one information source. According to another embodiment of the invention, the feedback comprises comments submitted by at least one user. According to another embodiment of the invention, the method further comprises an act of restricting display of the at least one indicator of an information source based on the feedback. According to another embodiment of the invention, the method further comprises an act of establishing a display threshold for the indicator. According to another embodiment of the invention, the method further comprises an act of determining the display threshold has not been exceeded. According to another embodiment of the invention, the method further comprises an act of filtering the at least one information source based on demographic information. According to another embodiment of the invention, the act of filtering the at least one information source based on demographic information includes filtering based on at least one of professional qualification, professional specialty, area of interest, ethnicity, sex, age, education, residence, and geographical location. According to another embodiment of the invention, the summary view comprises at least one of a light box, a partially transparent browser window, a new browser window, and a display overlay.

According to one embodiment of the present invention, the summary view further comprises a rank for the at least one information source. According to another embodiment of the invention, the rank is generated from user feedback. According to another embodiment of the invention, the summary view further comprises a display indicating user review of the at least one information source. According to another embodiment of the invention, the indication of user review comprises comment by at least one user. According to another embodiment of the invention, the summary view provides an indication of a reputation of the at least one user. According to another embodiment of the invention, the indication of reputation includes at least one of a reputational ranking for at least one user, an indication of at least one user's credentials, and an indication of requirements for displayed commentary. According to another embodiment of the invention, the method further comprises an act of directing at least one user to an external source for the at least one information source in response to user selection in the summary view.

According to one embodiment of the present invention, the method further comprises an act of notifying the at least one user of the direction to an external source. According to another embodiment of the invention, the act of matching, contextually, the at least one information source to activity within an ecosystem further comprises matching the at least one information source to user activity. According to another embodiment of the invention, the user activity comprises at least one of searching within the environment, keyword identification, navigation, communication, and historical usage. According to another embodiment of the invention, the method further comprises an act of permitting a user to opt out of receiving the at least one indicator of an information source. According to another embodiment of the invention, the act of displaying the at least one indicator of an information source to the plurality of users of the ecosystem occurs in response to user action. According to another embodiment of the invention, user action comprises at least one of searches in the ecosystem and navigation to a section of the ecosystem organizing information sources.

According to one aspect of the present invention, a system for displaying indicators of information sources to an ecosystem comprising a plurality of users is provided. The system comprises a submission component adapted to receive information associated with an information source, a display component adapted to display at least one indicator of an information source within a display for the ecosystem, wherein the display component is further adapted to display a summary view of the information source in response to selection of the indicator, and wherein the display component is further adapted to display feedback on the information source within the summary view, and a feedback interface adapted to accept feedback from at least one user of the ecosystem on the information source. According to one embodiment of the present invention, the system further comprises an analysis component adapted to match contextually activity within the ecosystem to the information opportunity. According to another embodiment of the invention, the system further comprises an analysis component adapted to filter information opportunities according to feedback.

BRIEF DESCRIPTION OF THE DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 2 is an example of an interface for displaying a summary view of an information source according to one embodiment of the present invention;

FIG. 4 is an example of an interface for displaying indicators of information sources indicative of type of information source according to one embodiment of the present invention;

FIG. 5 is an example of an interface within an ecosystem for grouping information sources/opportunities;

FIG. 6 is an example of an interface for managing information sources according to one embodiment of the present invention;

FIG. 12 is an example interface for introducing an information source into an ecosystem according to one embodiment of the present invention;

FIG. 13 is an example interface for managing information sources according to one embodiment of the present invention;

FIG. 16 shows an example interface for managing information sources according to one embodiment of the present invention;

FIG. 17 shows an example of an interface for adding an information source according to one embodiment of the present invention;

FIG. 18 shows an example of an interface for displaying a summary view of information sources according to one embodiment of the present invention;

FIG. 19 shows an example of a report interface according to one embodiment of the present invention;

DETAILED DESCRIPTION

Figures 1, 3:
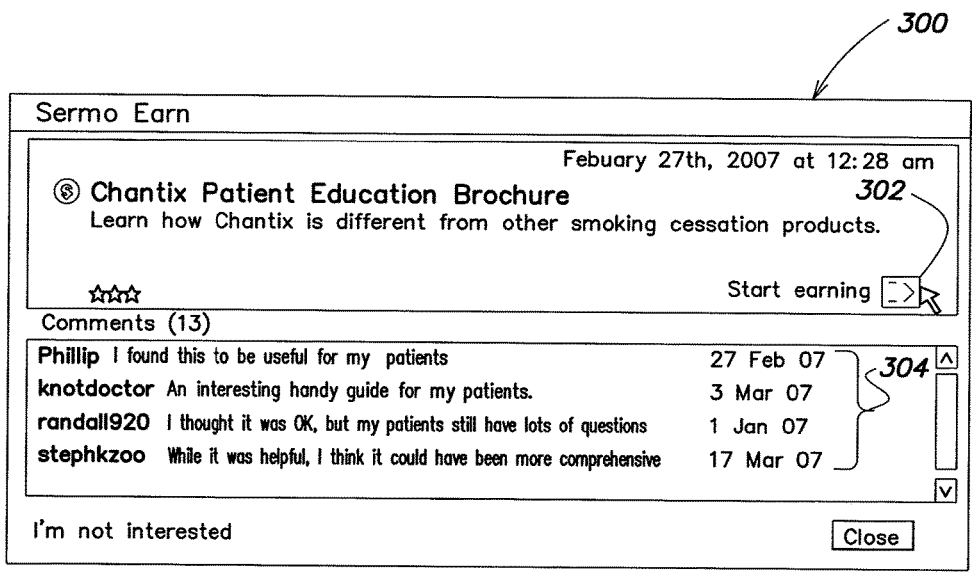
FIG. 1 is an example interface for displaying indicators of information sources according to one embodiment of the present invention.
FIG. 3 is an example of an interface for displaying a summary view of an information source according to one embodiment of the present invention.

In one example, within the ecosystem a score is displayed with any information associated with the external information source, thus each participant is able to readily identify the relevance of the information source/opportunity being presented based on other users' perceptions. In another embodiment, the information associated with the external information source is presented within the boundaries of the ecosystem. Providing an opportunity to further understand the external information source while within the ecosystem provides a user assurance that the external information source is worthwhile, and in the alternative, identifying information sources that aren't worth their time or energy without subjecting them to banner ads, pop up windows, pop under windows, redirection, and the various other traditional advertising techniques employed.

Information sources/opportunities may be more than just information or advertisements. In particular, information sources/opportunities may take the form of learn and earn opportunities. Learn opportunities can be used to convey educational or informative information, and may include participation in debate, peer review, discussion, learning sessions, and continuing education. Earn opportunities typically include compensation for participating in a desired activity. The desired activity can take almost any form of action, and may include research tasks, completing surveys, participating in debates, peer review, rendering professional opinion, evaluating products, evaluating theories, professional practice, diagnosis, journal review, journal submission, experimentation, among other activities.

According to one embodiment, by associating the information opportunities with a feedback mechanism, the ecosystem promotes distribution of relevant and/or useful information. The feedback mechanism also permits the ecosystem to filter out the irrelevant and/or useless information. In another example, the feedback mechanism permits participant commentary to be associated with information opportunities. Participant commentary provides additional assurance to other participants in the ecosystem that the information is of value. The ecosystem may also provide incentives for participants to rate information opportunities, in the form of monetary compensation, reputational rating, etc. The feedback mechanism may also convey the reputational ranking of the submitted feedback, and in particular the reputational rating of the participants who submitted comments, and/or rated the information opportunity.

According to another aspect, an approach is provided that assists in presenting information in the right way. In one embodiment, the approach includes providing indicators that an information opportunity is available rather than providing the information opportunity itself. The indicators typically take the form of unobtrusive displays that are contextually matched with activities that the ecosystem participant is engaging in. For example, searching performed within the ecosystem will return results, and indicators of information opportunities may be contextually matched with the results, within the results, or matched to the search terms themselves. In one embodiment, an indicator conveys no more than is necessary to identify that an opportunity is available. In another embodiment, the indicator may convey the type of opportunity. Indicators of information opportunities are typically displayed unobtrusively to minimize impact on individual participants of the ecosystem. Displaying small form factor indicators allows user to focus on that activity that they are engaged in, while providing the opportunity to take advantage of information opportunities at their discretion.

Typically, affirmative action is required on the part of an ecosystem participant in order to reach the information opportunity itself, and affirmative action may also be required in order to display additional information associated with the information opportunity. In one example, a participant must move a pointer over the indicator for the information opportunity in order to display the topic/subject for that opportunity. In another example, clicking on the indicator takes a participant/user to a display that provides additional information associated with the information opportunity within the ecosystem. The additional information may include a rank associated with the information opportunity. In one embodiment, additional information includes user commentary on the information opportunity. In another embodiment, the display includes a feature that permits a user to indicate that the particular information opportunity is of not interest and should not be displayed again. The ecosystem may also record the number of users indicating no interest, and the number of users reporting no interest may be used as part of the feedback mechanism. A rank associated with the information opportunity may incorporate the number of users reporting no interest.

In one embodiment, the display includes a link to an external information source. In response to a user clicking on the link, the user is directed to an external source of information. The user may be presented with a warning that the user is leaving the ecosystem. In one embodiment, the external information source presents the user with desire activity to complete an earn opportunity, alternatively the external information source presents a learn opportunity.

In another embodiment, the display includes a link to information within the ecosystem. In one example, the link directs a user to a ticket within the ecosystem.

According to another aspect, an approach is provided to assist in presenting information at the right time. In one embodiment, the approach includes contextually matching information opportunities to activity being performed by a user. In one, example, a user reviews ticket within the ecosystem related to a particular subject. Matching information opportunities to the activities being performed improves user receptivity. In another embodiment, providing indicators for information opportunities permits the user to control the time s/he reviews any information opportunities. One should appreciate that various aspects of right information, right way, right time, right place, right audience concepts are not necessarily mutually exclusive, and the invention should not be limited based on any categorization of an element, elements, feature, or features serving one or more functions.

According to another aspect, an approach is provided to assist in presenting information in the right place. In one embodiment, the approach includes the use of indicators of information opportunities. The indicators are typically displayed unobtrusively in conjunction with activities performed by users within the ecosystem. Additionally, information opportunities may be presented within the ecosystem in an area designated for information opportunities. Segregating information opportunities within the ecosystem permits users to access multiple information opportunities as desired.

According to another aspect, an approach is provided to assist in presenting information to the right audience. In one embodiment, the approach includes filtering information opportunities by demographic information associated with users. Demographic information includes professional qualification, professional specialty, area of interest, ethnicity, sex, age, education, residence, and geographical location organized for display. In a medically related ecosystem, demographic information may additionally medical specialty, medical qualification, areas of interest, among others. In one embodiment, information opportunities submitted to the ecosystem require topical information be input in conjunction with the information opportunity. In one example, such topical information includes target information. Target information can take the form of demographic information that must match with a user in order to display the information opportunity. In one alternative, topical information includes optional information that is not required to match in order to display the information opportunity. In one example, the optional information must also math in order to display the information opportunity.

"HotSpot" advertising provides one example of linking on-line ecosystems to external sources of information—whether the information is an advertisement or just sponsored information—while at the same time providing assurance to the ecosystem that the information will be relevant. Such assurance(s) mitigates the impact of the introduction of irrelevant information by permitting sorting of relevant from irrelevant, and may additionally provide a vehicle for removing such information from the ecosystem efficiently. Mitigation prevents the pollution of ecosystem and prevents the dilution of community generated ideas and/or information. The various embodiments of HotSpot advertising incorporate at least some of the various aspects and features discussed above with respect to communicating the right information, in the right way, at the right time, in the right place, and to the right audience.

Screen captures that illustrate particular embodiments are included in the description, however, one should appreciate that the invention is not limited to the embodiments illustrated by the screens shots included, and that they are presented by way of illustration and not limitation.

In FIG. 1, shown are search results generated from a user query within the ecosystem. Next to the topic headings 106-118 appear "HotSpots," at 102 and 104 In this example, a learn opportunity is indicated next to the topic Hermifacial Spasm at 102 This example demonstrates how unobtrusively presenting the user with an indicator that an information opportunity exists (in this case a learn opportunity (102)) serves the ecosystem. An avenue for disseminating information is provided without interfering with what the user is presently doing. In this example, the user is given the choice of participating in a learn opportunity that is related Hermifacial Spasm, a topic returned by the users own activity.

The learn opportunity (102) can be presented by a client. A client can be an advertiser or a commercial entity that provides goods and services that the on-line ecosystem may be interested in. Additionally, a client may also be a participant of the ecosystem. A client is not limited to providing goods and services. In one embodiment, a client is able to introduce external information sources that the client maintains. Where a client is a commercial entity, information provided by that client is typically associated with audience skepticism. Commercial entities have a financial/self interest in presenting their information in a light most favorable to their products and their companies. Hence, a lack of trust and/or disinterest typically accompanies traditional attempts to distribute information. Associating such external information sources with a feedback mechanism may alleviate this problem. In one example the feedback is displayed with information describing the external information source. As the feedback is generated by other members of a user community, a particular user trying to determine whether to investigate a particular information source is assured by positive feedback that the external information source is worth investigating. Additionally, where feedback includes user commentary, the commentary can further identify an audience who may be interested in the particular external information source.

Additionally in FIG. 1, the user is provided an indicator of an earn opportunity at 104 that is related to Chronic Pain, Chronic Misery. Typically earn opportunities are presented when there is an opportunity for a user to earn money by participating in an activity desired by a client. In one embodiment, an earn opportunity is generated by a client who desires participants in an ecosystem to take some form of action. The actions can include visiting a webpage, reviewing sponsored information, participating in an on-line survey, research, review of articles or journals, listening or viewing education material, or assisting in evaluating products or services being provided, among other example. The flexibility of earn opportunities permits them to be associated with any activity desired by a client. Within an embodiment where the ecosystem comprises a plurality of physicians, an earn opportunity may comprise rendering medical opinion, reviewing effectiveness of a particular drug(s), participating in drug research, reviewing laboratory results, providing a consensus generated second opinion, providing medical opinion, and each of these activities are associated with a particular level of compensation.

For example, in an information brokering system compensation for earn opportunities may be tied to reaching a consensus of opinion for the particular earn opportunity as is described in co-pending application Ser. No. 11/482,523, titled "METHOD AND APPARATUS FOR CONDUCTING AN INFORMATION BROKERING SERVICE," filed Jul. 7, 2006, incorporated by reference in its entirety. The application discusses online information systems, and more specifically, online systems having communities of users that share ideas. In one example, the earn opportunity is associated with a predetermined value for performing a particular action. In another example, the value may be determined dynamically. In one embodiment, the value for performing a particular action may be increased over a base amount, for early participant, to encourage early participation and decreased over time. In addition, another example may include a time frame associated with an earn opportunity, over portions of the time frame the value may be reduced. In one alternative, the value may be increased over time. The value associated with an activity may be tied to a threshold for measuring response. In one example the number of responses impacts the value. Up to a certain number of responses, one value to compensate the activity is used, and over that number of responses another value to compensate the activity is used.

Figure 2:
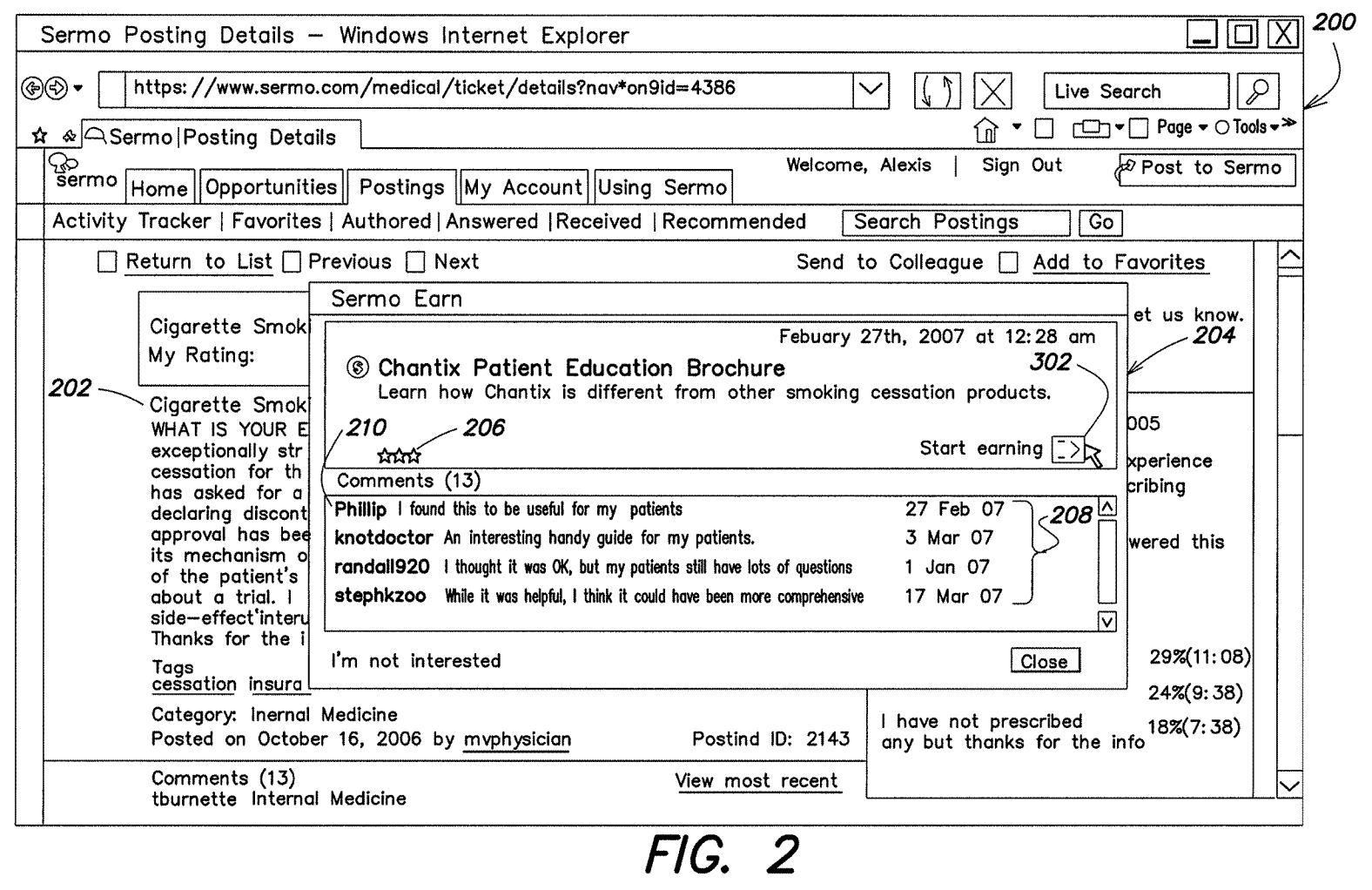

Shown in FIG. 2, is one embodiment where advertising is presented to an ecosystem comprising a plurality of physicians, shown as interface 200. In this embodiment, the system contextually matched activity being performed by the user, review of cigarette smoking cessation topics 202, to opportunities that related to cigarette smoking. The user selected an earn opportunity indicator, to bring the user to a display of information associated with the earn opportunity at 204. FIG. 2 includes a star ranking of the opportunity at 206. The ranking displayed is the result of feedback submitted by users within the ecosystem. Other ranking systems may be used, for example, a number indicating a score from 1-10 or 1-100 or other range. Other options may be used including bar graphs, pie charts, or similar methods of display. In one embodiment, the star ranking may be accompanied by user commentary at 208. The ranking system shown is based on a five star scale, however, one should appreciate that other forms of ranking can be used and the invention should not be limited to any particular form of ranking. A user name may be associated with the comment for a particular opportunity, for example, at 210. The user name may be selectable within the opportunity display. In selecting the user name, an operator may be directed to information about that particular user's qualifications. Providing information about other users, and in particular users who left comments, gives an observer additional information on which to evaluate an information opportunity, and may provide a basis to accept or reject commentary and ultimately aid in the determination of whether to participate in the opportunity.

The ranking display assists a user in determining whether or not to invest time in a particular opportunity before the user actually visits the opportunity. Enabling a user to determine whether or not to invest their time in a particular opportunity before actually visiting the opportunity improves time efficiency for the user. A particular user also receives assurance that the opportunity is worth while as other members of the user community have found it to be.

Learn and earn opportunities provide users with an opportunity to improve skills, increase their knowledge, and/or provide an opportunity to share knowledge and skills, while at the same time providing assurance that the time spent engaging in the opportunities will not be wasted.

Broader implications for the invention can be derived from specific examples of various implementations, both with respect to specific ecosystems and the concerns that are presented with introducing external sources of information and with respect to specific implementations of links to external sources of information. In particular, one ecosystem comprises a plurality of physicians. The ecosystem is the system in which the physicians communicate, collaborate, and discuss ideas in general. The physician community is able to pool knowledge of disparate physician's in an efficient and effective manner. Some users may find themselves educated on particular subjects, given new practice tips, and can take away advice on performing their own work, while others may contribute those very ideas. Through interaction, a number of physicians may generate collaborative ideas, consensus opinions, various other group thought conclusions or insights.

Online Ecosystem

In one embodiment, an online "ecosystem" is created, the ecosystem including a community of users that together, function to exchange information. Such an ecosystem may be novel in its integration of prediction markets, social networking, decision making, and group consensus. In such an ecosystem, a community is created by one or more rules influencing the behavior of a plurality of users. According to one embodiment, the rules adhere to the basic drives and ambitions of the users and channel the interested users back into the ecosystem community. In particular, rules may be designed that provide incentives (and disincentives) for certain types of behavior. Optimally, the rules encourage users to submit original ideas and encourage others to review these ideas to foster consensus. In one embodiment, the rules function without external (other than users) or moderator intervention.

The overall ecosystem may be driven by several processes. One process permits users to take independent actions, and the user's independent actions affect the ecosystem. Therefore, the ecosystem can be self-perpetuating. Further, the ecosystem can create its own content, as users define and vote on the observations and opinions of others. The ecosystem may be self-regulating, for instance, as users determine the value of the collected observations and opinions. One method of the driving of the ecosystem involves recruiting new users as individuals within the ecosystem pursue their own interests.

The ecosystem can be manipulated to fit the interests of those that run the ecosystem (e.g., a system operator) is by generating valuable data for third parties that consume information generated by the ecosystem. One method for ensuring that valuable data is generated includes creating rules that promote the creation of valuable data, and by integrating adjustable variables into the rules.

Such an ecosystem may be applied to different problems, markets, and subject areas. One such application is healthcare, and the medicine in general. The healthcare industry is a good application of such a system, as there are a number of readily available customers for the information generated by the ecosystem. For instance, there is a need to capture original observations to further the advancement of understanding of medical treatment, drugs, and related research, and to ensure patient safety. Such observations may also be valuable to the financial community when making investment decisions, and thus a system that makes such observations aware to the community would be beneficial. Another application includes the observation of the spread of disease, and monitoring for outbreaks of such diseases. Further, the ecosystem may permit physicians to further the advancement ideas by allowing them to submit observations and to comment on observations of their physician colleagues.

The ecosystem may align the interests of clinicians, industry, and researchers to more effectively capture physician observations and insight, potentially improving surveillance and allowing more rapid insight into physician consensus on a given topic. Organizations that benefit from early insight into healthcare information create a financial incentive used to generate, sustain, and regulate participation in the online community or ecosystem.

One version of the ecosystem can leverage a high value of healthcare-related subject-specific information that can be shared among interested users. Further, the ecosystem can successfully exploit multiple behaviors of various users, such as greed, drive for collaboration, and humanitarianism. Because there is a continuous need for information, the information of the ecosystem is self-renewing and replenishes itself continuously. Although healthcare is one application of such an ecosystem, it should be appreciated that the invention is not limited to any specific field, and may be applied to other information-sharing situations where collaboration facilitates information that has value.

Online Ecosystem

In one embodiment, an online "ecosystem" is created, the ecosystem including a community of users that together, function to exchange information. Such an ecosystem may be novel in its integration of prediction markets, social networking, decision making, and group consensus. In such an ecosystem, a community is created by one or more rules influencing the behavior of a plurality of users. According to one embodiment, the rules adhere to the basic drives and ambitions of the users and channel the interested users back into the ecosystem community. In particular, rules may be designed that provide incentives (and disincentives) for certain types of behavior. Optimally, the rules encourage users to submit original ideas and encourage others to review these ideas to foster consensus. In one embodiment, the rules function without external (other than users) or moderator intervention.

The overall ecosystem may be driven by several processes. One process permits users to take independent actions, and the user's independent actions affect the ecosystem. Therefore, the ecosystem can be self-perpetuating. Further, the ecosystem can create its own content, as users define and vote on the observations and opinions of others. The ecosystem may be self-regulating, for instance, as users determine the value of the collected observations and opinions. One method of the driving of the ecosystem involves recruiting new users as individuals within the ecosystem pursue their own interests.

The ecosystem can be manipulated to fit the interests of those that run the ecosystem (e.g., a system operator) is by generating valuable data for third parties that consume information generated by the ecosystem. One method for ensuring that valuable data is generated includes creating rules that promote the creation of valuable data, and by integrating adjustable variables into the rules.

Such an ecosystem may be applied to different problems, markets, and subject areas. One such application is healthcare, and the medicine in general. The healthcare industry is a good application of such a system, as there are a number of readily available customers for the information generated by the ecosystem. For instance, there is a need to capture original observations to further the advancement of understanding of medical treatment, drugs, and related research, and to ensure patient safety. Such observations may also be valuable to the financial community when making investment decisions, and thus a system that makes such observations aware to the community would be beneficial. Another application includes the observation of the spread of disease, and monitoring for outbreaks of such diseases. Further, the ecosystem may permit physicians to further the advancement ideas by allowing them to submit observations and to comment on observations of their physician colleagues.

The ecosystem may align the interests of clinicians, industry, and researchers to more effectively capture physician observations and insight, potentially improving surveillance and allowing more rapid insight into physician consensus on a given topic. Organizations that benefit from early insight into healthcare information create a financial incentive used to generate, sustain, and regulate participation in the online community or ecosystem.

One version of the ecosystem can leverage a high value of healthcare-related subject-specific information that can be shared among interested users. Further, the ecosystem can successfully exploit multiple behaviors of various users, such as greed, drive for collaboration, and humanitarianism. Because there is a continuous need for information, the information of the ecosystem is self-renewing and replenishes itself continuously. Although healthcare is one application of such an ecosystem, it should be appreciated that the invention is not limited to any specific field, and may be applied to other information-sharing situations where collaboration facilitates information that has value.

In one example application of such a system, a value of a physician's observation (modeled in the system in the form of a "ticket") in the system is determined by how many people agree or disagree with the observation at any given moment. Physicians from diverse backgrounds are incentivized to submit observations and to corroborate or dispute those observations to the system, providing a resultant method by which clinical data may be gathered. Further, a ranking of users may be determined, used to determine a value of observations, and to incentivize desired ticket creation and/or voting behavior.

Example Ecosystem

In one example implementation, a system is provided that permits a user to perform a number of actions relating to observations or opinions submitted by users. In one particular embodiment, the user may submit observations or vote on existing observations. In one example implementation, the observation may be represented in the system in the form of a "ticket." In the example, the ticket is a construct that permits an idea to be shared and viewed by other users as well as allowing the system to track the idea as it progresses through the ecosystem.

A user may create an observation by creating a ticket that describes the observation. In one example, the ticket includes a number of parameters including a description of the observation as entered by a user (e.g., in the form of text and/or phrases describing the observation). In one example, the length of description of the observation associated with the ticket may be any length (e.g., no minimum or maximum length). In other words, the observation description can be as long as a user wants, or as short as he/she wants.

Also, the user may be permitted to express an opinion on an existing observation by voting on an existing ticket. In another embodiment, the user may be permitted to submit an answer or opinion to the observation. The answer may be in the form of a yes/no response, or the user may be permitted to submit an alternative answer. Here, the user is permitted to provide an additional statement that allows the user to qualify their response.

In another example, the user is permitted to provide an additional statement which allows the user to provide an alternative response that may be viewed and selected by other users. Each of these possible responses may be viewed by other users in the ecosystem (e.g., as a multiple choice selection), from which they may choose to provide (or may not) a different response.

The user may also be "charged" a currency for voting on a ticket. For instance, the user may be provided a particular number of points or other credit, and decremented each time the user votes on a ticket. The user's credit may be increased in response to a positive behavior exhibited by the user in the ecosystem (e.g., the user creates tickets, provides early votes, becomes an expert in a particular field, etc.). In this manner, the system rewards positive behavior and encourages participation in the ecosystem.

In one embodiment, when a user writes a ticket, the user classifies the ticket. The classifications may include but are not limited to classifying the ticket as a particular type of observation. There may be more or less classification types, depending on the application, but are generally referred to herein as an observation. The tickets may also be classified by the user and/or system. For instance, tags or other classification information may be associated with a ticket.

According to another embodiment, the ticket may also include classification information, either part of or separate from the ticket, the classification information indicating an organization of the ticket such that the ticket may be easily located. In one embodiment, it is appreciated that metadata in the form of "tags" or keywords may be associated with information such as tickets, and tags may be used to classify tickets. Because tickets have associated tags, tickets with similar or the same tags may be located more easily by a system or an associated user. Further, actions may be performed in response to tag information, such as alerting a user when a ticket having a particular tag is created, locating similar tickets using tag information, and other actions relating to the organization and control of tickets.

According to another embodiment, the system may present to the user an interface that provide real-time feedback of classification information as the user enters information associated with the ticket. For instance, a list of related tags may be presented to the user, and while the user enters description information of the ticket, the list of the most relevant tags may be changed in response to the entry of the user. In this way, the feedback permits users to create better tickets (by seeing how the system would classify the ticket) and also permits the user to easily locate similar tickets (e.g., by selecting tag information presented in real-time to the user in the interface).

According to one embodiment, an observation may be classified as a "Case" observation. Using such an observation, it may be useful to permit users to submit observations by users in a position to view a particular event or condition. Generally, any user regardless of rank or stature may be suitable for making such an observation.

In another example, an observation may be classified as a "Consult" observation. In such an observation, it may be useful for a user to submit an observation, upon which other users can provide their opinions or consultation on the observation. Generally, observations made by users having a higher rank, voting history, or other status may be valued by the system more than observations made by lower-ranked users. There may be other observation types and combination types thereof by which a particular observation may be classified.

In one embodiment, the online system may assign each ticket a "value." Depending on the subject matter of the observation, the ticket may be assigned an initial value, which may be adjusted depending on the market value of the ticket (e.g., the value of the ticket as determined by a bid process involving interested information consumers) and/or the opinions (e.g., in the form of votes) set forth by other users relating to the ticket.

The values may be assigned in real-time, when the ticket is created, however, the initial value can be revisited with the value on any given ticket increased or decreased as needed to promote the health of the ecosystem. Health of the ecosystem may be monitored, for example, by measuring a number of votes received in a particular area, ticket, or issue. Once submitted, any other users can vote on a ticket or submit an alternative answer with a ticket as well as forward the ticket to any other users inside or outside the ecosystem.

The ecosystem may have a number of different types of consumers and providers of information. Users that provide observations may or may not be charged a fee for accessing the ecosystem, but in one embodiment of the ecosystem, information consumers are charged for their use and access to the observations and opinions provided by and ability of the system to establish communication between others. In one example system, consumers may be charged a subscription fee to observe overall activity within the ecosystem. Such fees may be used, for example, to maintain the ecosystem. Further, other fees may be charged to consumers for cultivating tickets submitted by others. In such a system, for example, customers may observe a ticket that the consumer wishes to draw attention to, or cultivate. Once the consumer becomes the owner of the ticket (e.g., through a bid process or other process), the results of the ticket may be the exclusive property of that consumer. In another example system, the results may not be shown to the public. In yet another example, the results of the ticket may be the exclusive property of the consumer for a fixed period of time (e.g., 60 days) after which, the results are published to the ecosystem.

In such an ecosystem, it is appreciated that there may be trade-off between consensus and early warning, but according to one embodiment, such a model according to various embodiments may perform more quickly and accurately than conventional survey models. In one such system, a customer/information consumer may be permitted to set predefined "triggers" that alert the consumer if/when a user (e.g., a physician) makes an observation of interest. The consumer may then be able to identify to the ecosystem how many users would need to vote on that observation for the observation results to be valuable to them. The system may determine the current voting rates for the desired population of users, the amount of incentives (e.g., money) that needs to be applied, and when the consumer agrees, that consumer may be granted exclusive access to the result information. Optionally, users that vote on the observation may be made available to the consumer for direct contact, permitting the consumer to more quickly and effectively reach a targeted group that has the necessary insight and/or experience in a given area.

Example Ecosystem Rules

The success of the ecosystem depends on the dynamic content created by its users. But the freedom necessary for this creates a problem: How can users be encouraged to act in a manner that is productive to the community without administrative oversight? According to one embodiment, users are provided incentives that match their personalities and interests that will encourage them to share their knowledge with the ecosystem. Further, it is appreciated that users should be discouraged from "gaming" the system to their benefit. For example, if a physician will gain a reward for creating a new ticket, what will prevent them from creating fifty meaningless ones?

Further, if there is a financial reward for submitting a correct vote, it is appreciated that there may be a mechanism that prohibits a user (e.g., a physician) from voting on every issue (i.e., guessing). Similarly, the ecosystem may be modulated to provide the types of information that might be of interest to customers at a particular point in time. According to one aspect of the present invention, the ecosystem employs a set of rules that provide incentives for certain actions and provide disincentives for other actions.

For the ecosystem to remain viable, the system may include a mechanism to achieve certain things, for example:
  Maintain a high throughput of fresh tickets.
  Maintain sufficient volume of votes so that opinions are rendered and "signals" can be detected.
  Create incentive and disincentive that keeps users' interests aligned with the overall goals of the ecosystem, preventing gaming of the system.

According to one embodiment, one method for balancing the interests of the users with that of the ecosystem is a basic set of rules. In one embodiment, these rules should to be sufficiently transparent so that users can understand the rules that are dictating their compensation, but retain a degree of opacity so that the system operator can manipulate them to achieve commercial success. According to one embodiment, four basic laws may be used to govern an online ecosystem:

Rank:

It may be beneficial to disincentivize random voting and/or random ticket creation. This rule not only prevents users from blanketing the ecosystem with as many votes as possible (in the hopes that one of those tickets will reflect a large financial reward), but the rule also forces users to write tickets and/or vote on those topics for which they think they might have a unique insight or "edge."

According to one embodiment, a user's rank is calculated dynamically and is applied to a ticket at the time of writing or voting, and remains constant for the income related to that ticket. Therefore, at any given moment, a user's reputation (as represented by a user's rank), is based on how accurately they have predicted the future consensus of the ecosystem on any given ticket. Stated differently, rank is a reflection how often those who rendered an opinion after another user who rendered an opinion, agreed with the voter.

According to one embodiment, rank may be determined using the following equation:

$$Rank = \frac{\left[\begin{array}{l}(\text{\# of opinions voted in agreement after you}) - \\ (\text{\# of opinions voted in disagreement after you})\end{array}\right]}{[\text{\# of outstanding tickets or opinions}]} \quad \text{Equation I}$$

Income:

Income for a ticket should be directly proportional to a user's rank, (i.e., the highest rank will result in the highest income). According to one embodiment, user rank may be combined with other factors to modify income on a ticket, such as, for example, the following factors:

Ticket Weight—The ecosystem may include a mechanism for determining which issues are valuable and which are not. For example, a potentially fatal adverse effect of a major prescription drug should be weighted much more highly than an observation about a minor allergy. In one embodiment, ticket weight may be equated with a value of the ticket (e.g., a dollar value as determined through a bid process).

Consensus Quality—The ecosystem may be configured to reward consensus differently. For instance, in one example, a 50/50 voting pattern presents a different quality of information than 90/10.

Temporal Weight—Earlier voters are taking greater risks, and provide greater insight.

According to one embodiment, ticket income may be determined by the following equation:

$$Income = \frac{Rank \times (\text{\# of agreements after you}) \times (\text{ticket weight}) \times (\text{consensus quality})}{[\text{\# of outstanding tickets}]} \quad \text{Equation II}$$

Ticket weight or value may have an associated value that is designated by the system at the time of ticket creation, and reflects the commercial value of the ticket to the client (information consumer). One implementation using weight includes using the weight value as a multiplier that raises or lowers the value that the ticket generates. Alternatively, weight can be defined as a dollar value that is assigned to the ticket, and then is gradually drawn down as each successive voter is paid out.

Consensus quality may be measured, for example, by a variable that the client describes to end users. A temporal weight may be defined within the income equation that rewards early voters and ticket writers, and then exponentially decreases payout to later voters and ticket authors.

Balance:

A rule may be used that brings into balance voting and ticket writing. In some applications, user income for writing highly successful tickets may be considerable. As such, it is expected that users will be inclined to write as many tickets as possible. This creates two challenges to the health of the ecosystem. First, the ecosystem's ability to render a consensus on any given ticket is based upon the number of votes that the ticket attracts. An ecosystem where a relatively small number of votes are spread out among a large number of tickets is not a healthy one, as it becomes difficult to determine consensus on any particular ticket due to the spread out. Second, according to one embodiment, users should be incentivized to only write tickets on topics for which they believe that they have an insight.

These opposing forces can be brought into balance by tying the number of tickets that a user can write to the number of votes they have rendered. In one example, one ticket can be written by a user for every five (5) votes rendered by a user. In another example, the number of tickets can be determined by a dynamically adjusted variable, based on the current health of the ecosystem.

According to one embodiment, balance may be ensured using the following equation:

$$\text{\# of tickets that can be written} = \frac{\text{\# of opinions}}{5} \quad \text{Equation III}$$

which ties the number of tickets to be written to the number of votes that can be cast. Alternatively, a "points" system may be used that relates the number of votes that could be cast by a particular user to the number of opinions (or tickets) authored (e.g., by awarding points when a user creates a ticket and decrementing points when a user votes on an opinion, or vice versa). Such a relation may encourage users to both author opinions and vote on the opinions of others.

Self-Policing:

Through its users, the ecosystem has the capability to generate large amounts of information. However, this abundance of information creates a problem in information management. The freedom to create new tickets can lead to insightful new observations, but it can also lead to self-evident or clinically irrelevant ones.

Additionally, multiple users can make the same observation, worded differently, causing confusion and decreasing the total votes made on the observation. It would be impossible for the ecosystem itself to manage the dynamic, user-created information. Therefore, the ecosystem has created a mechanism for users to be incentivized to manage the system themselves. Before the generation of any new ticket in the ecosystem, a user may be informed of basic guidelines. These guidelines may include the prohibition of self-evident or duplicate posts, or any posts that might be explained by information existing in the public domain (e.g., journals, textbooks, databases, and other medical references, etc.).

When any user in the ecosystem views a ticket, s/he can "report" it as not conforming to these guidelines. This reporting will require some form of risk to that user in order to prevent frivolous reports. In his report, he will cite the ticket and explain his reasoning. Then, the ecosystem will distribute his report to a random selection of the highest-ranked users (e.g., the top 10 highest-ranked users) that the ecosystem has determined have expertise on the ticket's subject. These users will serve to arbitrate the report validity and will be rewarded for doing so. These users will then vote if they agree with the original author or the individual who cited the self-policing policy.

If the post is found to not meet the ecosystem's basic criteria or to violate the self-policing policy it will be removed from the system, the creating user will be penalized, and the reporting user will be rewarded. If the post is valid, it will remain, and the reporting user will be penalized. Through this system, all users who voted in agreement with a removed ticket will lose the rank points they gained, and those rank points will be awarded to the user that successfully cited the law. In this way, the ecosystem simultaneously disincentivizes users from posting or voting on tickets that might be self-evident or unoriginal, while recruiting a population of users to self-police the system. Indeed, users will become increasingly inclined to examine tickets for violations of the Self-Policing rule as the tickets grow in their number of votes because the potential payout becomes higher and higher.

Information Brokering General Purpose Computer System

Various embodiments of information brokering systems may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type computer system may be used to facilitate an online ecosystem according to various embodiments of the invention. Further, the system may be located on a single computer or may be distributed among a plurality of computers attached by a communications network.

A general-purpose computer system according to one embodiment of the invention is configured to perform any of the described functions, including but not limited to, creating, storing, and receiving votes on tickets by/from users and bidding on tickets by information consumers. It should be appreciated that the system may perform other functions, including paying users, receiving payments from information consumers, providing indications to users and consumers, etc., and the invention is not limited to having any particular function or set of functions.

Figure 7:
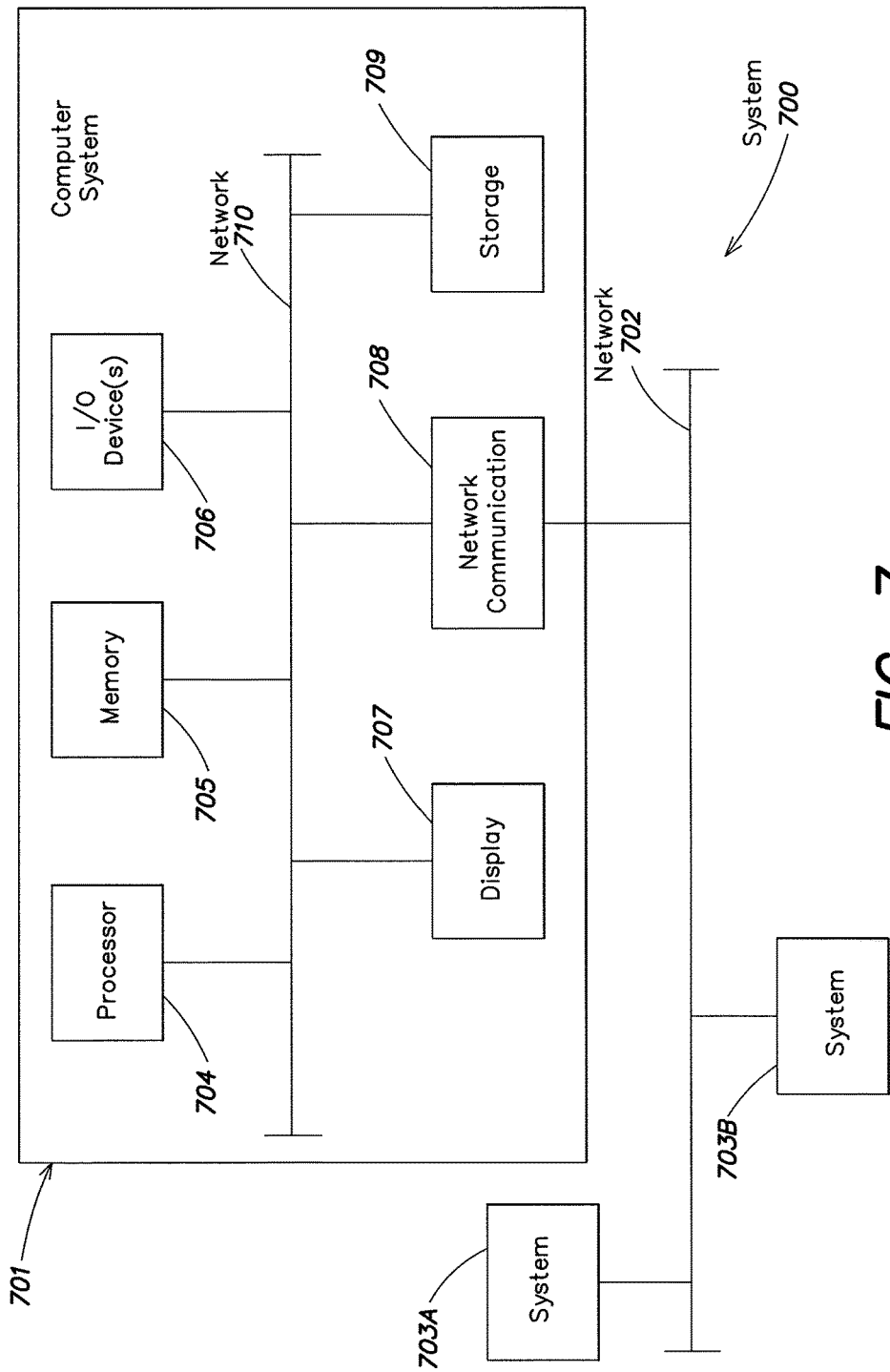
FIG. 7 is a block diagram of a general-purpose computer system upon which various embodiments of an ecosystem may be implemented.

FIG. 7 shows a block diagram of a general purpose computer and network system 700 in which various aspects of the present invention may be practiced. For example, various aspects of an information brokerage service may be implemented as specialized software executing in one or more computer systems including general-purpose computer system 701 shown in FIG. 7. Computer system 701 may include a processor 704 connected to one or more memory devices 705, such as a disk drive, memory, or other device for storing data. Memory 705 is typically used for storing programs and data during operation of the computer system 701. Components of computer system 701 may be coupled by an interconnection mechanism such as network 710, which may include one or more busses (e.g., between components that are integrated within a same machine) and/or a network (e.g., between components that reside on separate discrete machines). The interconnection mechanism enables communications (e.g., data, instructions) to be exchanged between system components of system 701.

Computer system 701 also includes one or more input/output (I/O) devices 706, for example, a keyboard, mouse, trackball, microphone, touch screen, a printing device, display screen, speaker, etc. In addition, computer system 701 may contain one or more interfaces (e.g., network communication device 708) that connect computer system 701 to a communication network (in addition or as an alternative to the network 710.

The storage system 709, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 709, as shown, or in memory system 705. The processor 704 generally manipulates the data within the memory 705, and then copies the data to the medium associated with storage 709 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of an information brokerage service may be implemented in software, hardware or firmware, or any combination thereof. Further, such methods, acts, systems, system elements and components thereof may be implemented as part of the computer system described above or as an independent component.

Although computer system 701 is shown by way of example as one type of computer system upon which various aspects may be practiced, it should be appreciated that information brokerage services are not limited to being implemented on the computer system as shown in FIG. 7. Various aspects may be practiced on one or more computers having a different architectures or components that that shown in FIG. 7.

Computer system 701 may be a general-purpose computer system that is programmable using a high-level computer programming language. Computer system 701 may be also implemented using specially programmed, special purpose hardware. In computer system 701, processor 704 is typically a commercially available processor such as the well-known Pentium class processor available from the Intel Corporation. Many other processors are available. Such a processor usually executes an operating system which may be, for example, the Windows-based operating systems (e.g., Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects may be distributed among one or more computer systems (e.g., servers) configured to provide a service to one or more client computers, or to perform an overall task as part of a distributed system. For example, various aspects may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the information brokerage service is not limited to executing on any particular system or group of systems. Also, it should be appreciated that the invention is not limited to any particular distributed architecture, network, or communication protocol.

Various embodiments may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within system 700. For instance, the system may be a distributed system (e.g., client server, multi-tier system). In one example, the system includes software processes executing on a system associated with a user (e.g., a client system). These systems may permit the user to create, submit, view, search, and vote on tickets within an online ecosystem.

Example System Architecture

Figure 8:
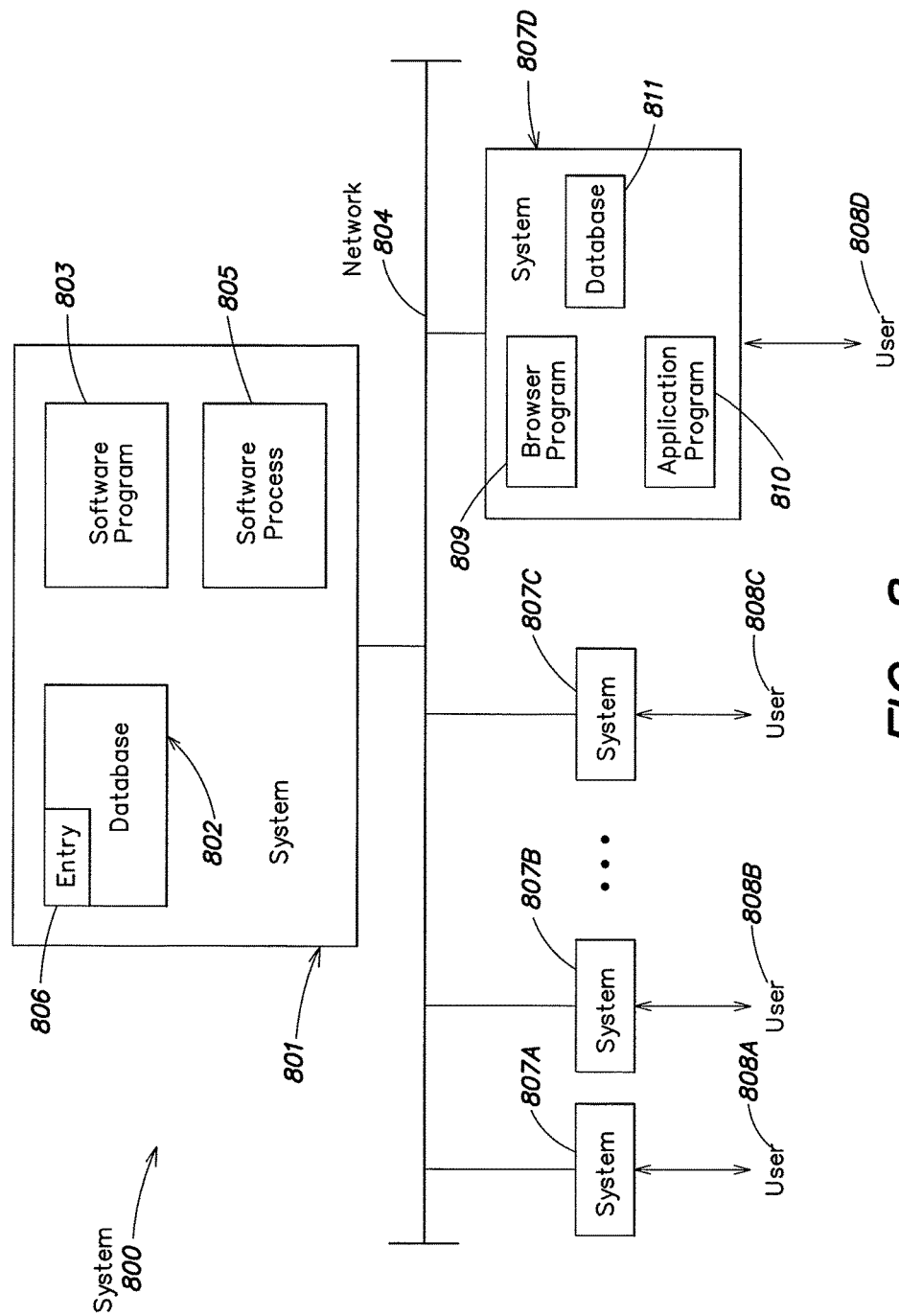
FIG. 8 is a block diagram of a computer system with which various embodiments of an ecosystem may be practiced.

FIG. 8 shows an architecture diagram of an example system according to one embodiment of the invention. It should be appreciated that FIG. 8 is used for illustration purposes only, and that other architectures may be used to facilitate one or more aspects of the present invention.

As shown in FIG. 8, a distributed system 800 may be used to conduct functions of the ecosystem, including, but limited to, the creation of tickets, storing ticket information, determining and storing tag information associated with tickets, performing voting actions, conducting client bidding, and storing user information. System 800 may include one or more computer systems (e.g., systems 801, 808A-D) coupled by a communication network 804. Such computer systems may be, for example, general-purpose computer systems as discussed above with reference to FIG. 7.

In one embodiment of the present invention, system 801 stores observation information in the form of a ticket in one or more databases (e.g., database 802). Further, system 801 performs associated functions with the observation information and its associated ticket.

System 801 may include a server process (e.g., process 805) that responds to requests from one or more client programs. Process 805 may include, for example, an HTTP server or other server-based process (e.g., a database server process, XML server, peer-to-peer process) that interfaces to one or more client programs distributed among one or more client systems (e.g., systems 807A-807D).

According to one embodiment, client programs may be capable of permitting a user to create, submit, view, search, and vote on tickets within an online ecosystem. Such client programs may include, for example, any type of operating system and/or application program capable of communicating with system 801 through network 804. In one particular instance, a client may include a browser program (e.g., browser program 809) that communicates with server process 805 using one or more communication protocols (e.g., HTTP over a TCP/IP-based network, XML requests using HTTP through an Ajax client process, distributed objects, etc.).

Although it is shown by way of example that a browser program may be used to access the ecosystem by users to perform ecosystem functions, it should be appreciated that other program types may be used to interface a user to server process 805. For instance, an application program that is specially-developed to manage ticket data may be provided to permit a user to perform ecosystem functions according to various embodiments of the present invention. The client program may be, for example, a thin client including an interface for managing ticket data. Alternatively, the client may be a scripted program, or any other type of program having the capability of transferring ticket data. According to one embodiment, such client programs may, for example, be downloaded and installed over the network. Further, these client programs may be stored and distributed by system 801 in the form of one or more software programs 803.

In one specific example, the client program may include an application program 810 that permits the user to create, submit, view, search, and vote on tickets within an online ecosystem. This program 810, in one embodiment, may be integrated with browser program 809 executing on system 807D. For instance, the application program 810 may include one or more controls that, when selected by the user, perform functions for manipulating ticket information. These controls may be written in a variety of programming languages, and the invention is not limited to any particular language. In one specific example, the control may be a link that, when selected, performs one or more programmed functions. Such functions may permit the user to create, submit, view, search, and vote on tickets within an online ecosystem.

Information stored in the database 802 may include, for example, ticket information including, but not limited to, a unique ticket identifier, a description of the observation associated with the ticket, user information such as personal information, user names, ranking, voting history, classification information associated with the ticket (e.g., tag information) and other information that can be used to facilitate the online ecosystem.

This information may be collected from the user in an interface (e.g., as presented by program 810) and stored in the database (e.g., database 802). Additionally, client systems may store a local copy of a user's ticket information within a local database associated with the client system (e.g., database 811 located on client system 807D). However, it should be appreciated that the invention is not limited to storing ticket and/or user information in any particular location. A client system (e.g., clients 807A-807D) may include one or more interfaces through which ticket information may be presented to the user. In one example, ticket information and status may be presented in an interface of a browser program (e.g., browser program 809) executing on a client computer system (e.g., system 807D).

Example Implementations

Figure 9B:
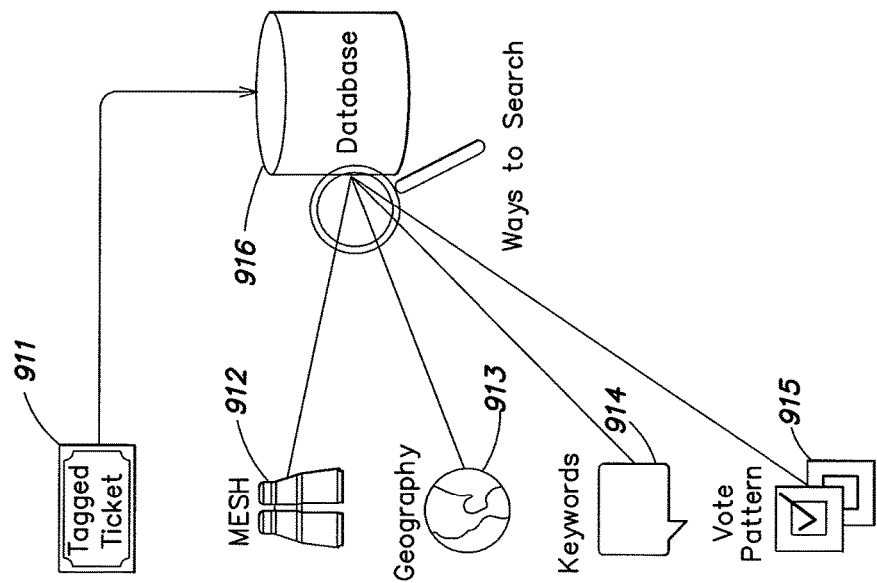
FIG. 9B is a block diagram showing example database elements according to one embodiment of an ecosystem that may be used in a ticket access and triggering process.
Figure 9A:
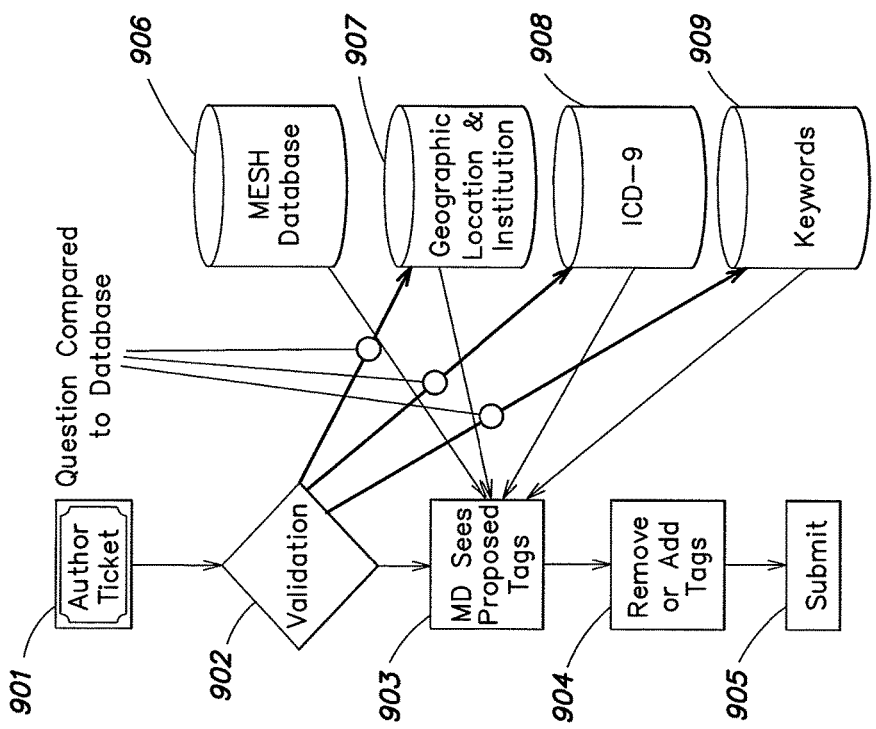
FIG. 9A is a block diagram showing an example creation of a ticket and tagging process according to one embodiment of an ecosystem.

FIG. 9A is a block diagram showing an example creation of a ticket creation and tagging process according to one embodiment. At block 901, a user (e.g., a physician or other person that has an observation or prediction) authors a ticket (e.g., on a client system 807A-807D of FIG. 8) for submission to the ecosystem (e.g., in the form of a distributed computer system 800). At block 902, the ticket is validated where it can be verified that the ticket is an original concept, is not similar to other tickets, etc. Further, the ticket may be analyzed in order to provide one or more classifications (e.g., tags) for the observations that may be associated with the ticket. Such tag information may be used to determine an initial value of the ticket, based on the related subject matter (e.g., an event related to a pacemaker vs. a general health event).

In one embodiment, tags may initially be provided by the author of the ticket. Further, in another example system, the system may generate and/or suggest other tags that could be associated with the ticket. Such tags may be generated, for example, based on associations (or groups) of related tags defined for similar tickets. Such tickets may include, for example, tickets having similar tags and which feedback for such tickets has been provided. Tags may also be suggested based on comparison with industry databases, similar keywords, synonym databases, or any other source of tag information.

In one example, the question or observation posed by the ticket may be compared to one or more databases (e.g., a keyword database 909 having keywords of other ticket entries) to determine whether the ticket is an original ticket, and to create tags for the ticket. Further, the ecosystem may have the ability to access other common databases such as, for example, disease and injury databases associated with the International Statistical Classification of Diseases and Related Health Problems (commonly known by the abbreviation ICD) (e.g., ICD-9 database 908), MEDLINE database (e.g., MeSH database 906), geographic and institution databases (block 907) or any other type of database resource to determine if the observation is original and/or determine the classification(s) of the ticket. Such classifications may occur automatically, or may be posed to the author of the ticket as suggested classifications.

Once validated, the physician or other user may be presented a list of tags to which the ticket may be associated (block 903). The physician may then review the tags and add to them or modify the tags, as appropriate (block 904). Once the ticket is complete, the physician or other user submits the ticket to the ecosystem at block 905.

FIG. 9B is a block diagram showing example database elements according to one embodiment that may be used in a ticket access and triggering process. For example, a user may search for and/or set triggers for particular tickets based on their tag information. For instance, a tagged ticket 911 in database 916 may be located in a user interface (e.g., a browser program interface) by entering in one or more tags (or classifications). For instance, tags may be located based on defined classifications in the database (e.g., medical terms in a MeSH database 912, keywords 914 in a keyword database 909, etc.). Further, the ticket may be searched according to other information, such as, for example, a location of or distance to the originator of the ticket (e.g., by accessing a geography database 913), a particular vote pattern of the originating user 915 or any other type of information relating to the ticket and/or its user. In this way, users can both classify tickets and locate tickets of interest once submitted.

Figure 10:
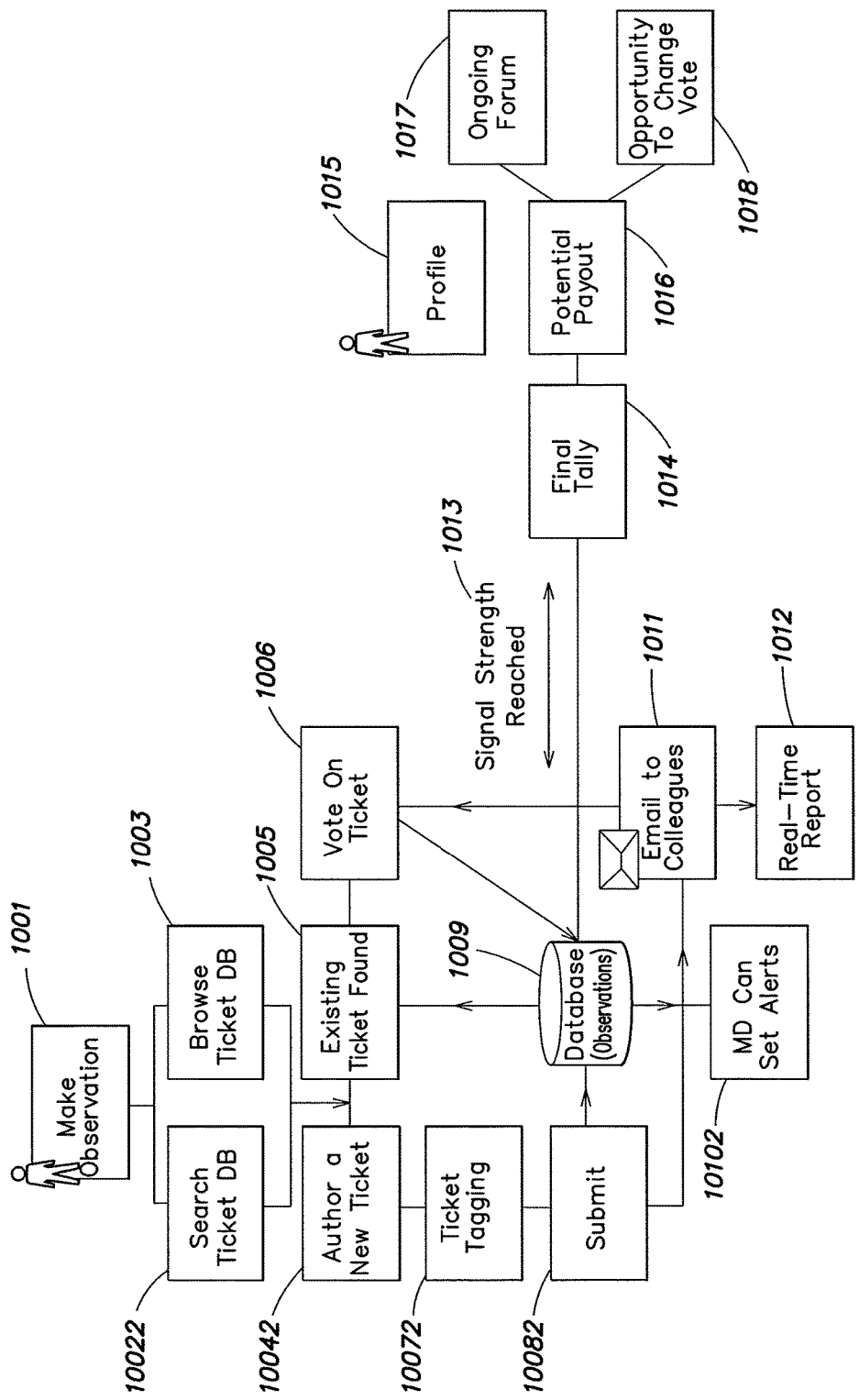
FIG. 10 is a flow chart showing an overall logic flow of ticket creation and lifetime in an online ecosystem.

FIG. 10 is a flow chart showing an overall logic flow of ticket creation and lifetime in an online system according to one embodiment of the present invention. As discussed above, a user may make an observation and possibly submit the observation to an online ecosystem in the form of a ticket, or corroborate or refute a similar observation associated with an existing ticket. At block 1001, the user makes an observation. As discussed above, the user may search an online ticket database (block 1002) to determine whether a similar ticket exists, or may browse the ticket database (block 1003) by viewing, for example, a list of recent tickets authored in a ticket database, highest ranked tickets, or other criteria or listing. In one embodiment, a user may locate tickets based on classification information associated with a ticket. Such classification information may be in the form of one or more tags created by the ticket creator, the ecosystem, or other entity.

At block 1004, the user may author a new ticket if the observation is original, or may alternatively find (block 1005) and vote on (block 1006) an existing ticket. According to one aspect, as discussed above, tickets created in the ecosystem may have tags or other classification information associated with the ticket (block 1007) so that the ticket may be located easily by users, the ecosystem, or other entity. According to one embodiment, tickets that are validated and classified may then be submitted to the ecosystem (block 1008) where they can be viewed and voted on by users. Also as discussed, the observations may be stored in the form of a ticket in a database (block 1009).

Users may set alerts or triggers (block 1010) that, when activated, notify the other user that a ticket having particular criteria has been submitted to the ecosystem. For instance, such triggers may be activated based on classification information (e.g., tag information) associated with a particular ticket. Also, once submitted, a ticket may be forwarded to colleagues (block 1011) or other types of users targeted by the ticket. Ticket status may also be viewed by the originator in real time, as votes are received along with any opinion data (block 1012).

Users continue to vote and submit opinions on the created ticket until a signal strength is reached (e.g., a consensus is formed and determined by the ecosystem) at block 1013. Determination of signal strength (or consensus) may be determined by any criteria, including, but not limited to determining a minimum number of votes received on a particular ticket, ratio of agreeing to disagreeing votes, or other criteria and/or combination thereof. At block 1014, a final tally of the votes is determined, after which is determined a potential payout at block 1016. At block 1015, the user's profile (an originator, a voter) may be updated to reflect the final status of the ticket, and any adjustment in the user's rank or other profile information (e.g., ability to predict outcomes).

After a closing of the vote, there may be continued activity relating the ticket including, but not limited to, a user being able to change their vote (block 1018), participation in an ongoing forum (block 1017), or other activity relating to the ticket.

Figure 11:
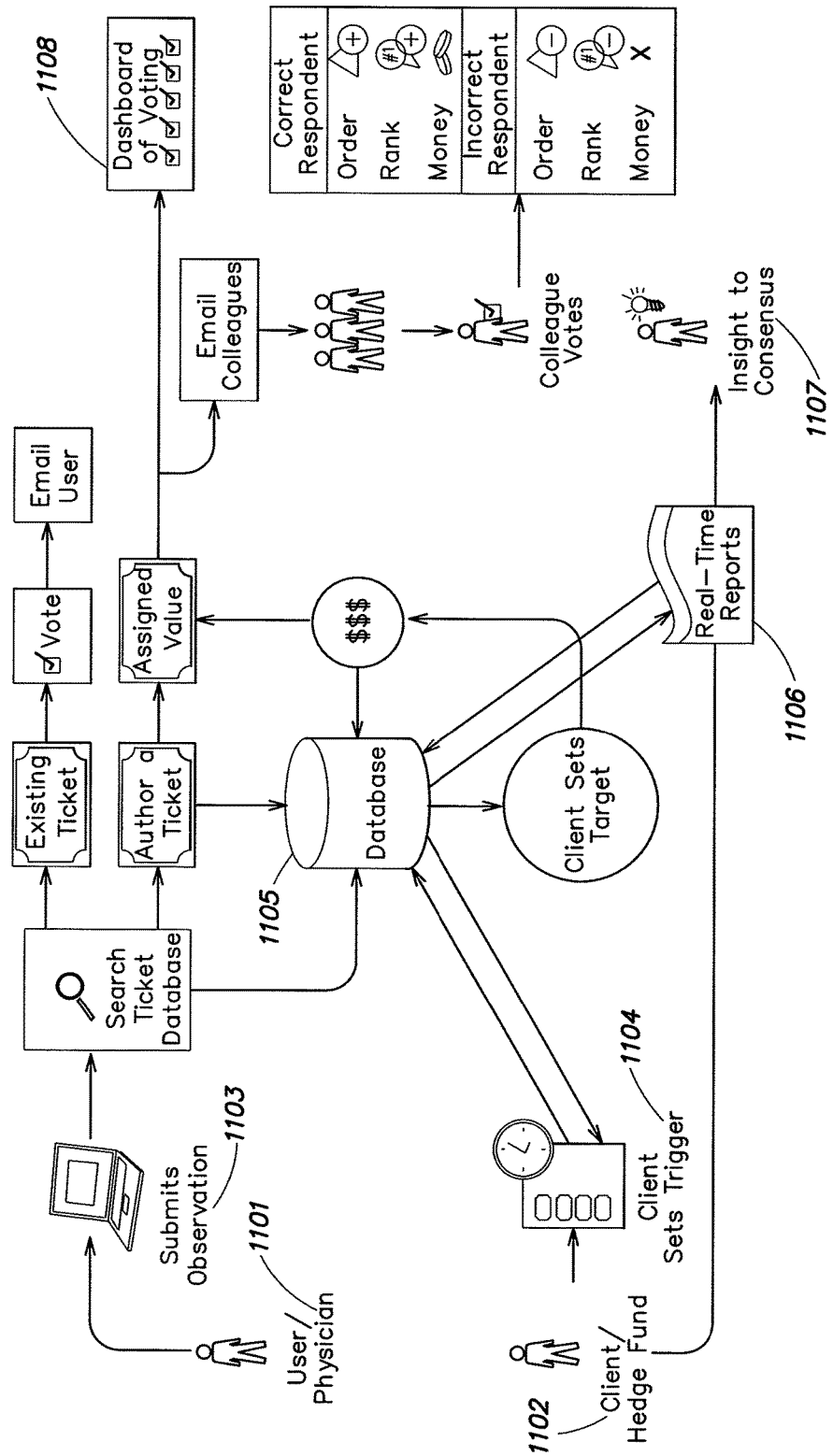
FIG. 11 is a flow chart showing a thematic logic flow of ticket creation and lifetime in an application to the healthcare industry according to one embodiment of an ecosystem.

FIG. 11 is a flow chart showing a thematic logic flow of ticket creation and lifetime in an application to the healthcare industry according to one embodiment of the present invention. As discussed above, a user/physician 1101 may make an observation 1103 that may relate to one or more triggers set by a client 1102. The user may either author an original ticket or vote on an existing ticket as discussed above.

In one example, client 1102 may be an investor that would like to observe a particular company and/or its products. To this end, the client 1102 sets a trigger 1104 that is stored in a database 1105 of the ecosystem. If the user/physician makes an observation that activates the trigger, client 1102 is notified. Similarly, client 1102 may make his/her own observation and propose the same to the ecosystem for action by one or more users.

In any case, both the client 1102 and user/physician 1101 may view a status of the ticket. In one example, the user/physician may be presented a "dashboard" view 1108 of the tickets created by the particular user, and their statuses. Client 1102 may be presented real-time reports 1106 relating to the tickets owned by the client (e.g., through bidding or sponsorship) and may therefore view any insights related to consensus 1107.

In one example application of such a system, a value of a physician's observation (modeled in the system in the form of a "ticket") in the system is determined by how many people agree or disagree with the observation at any given moment. Physicians from diverse backgrounds are incentivized to submit observations and to corroborate or dispute those observations to the system, providing a resultant method by which clinical data may be gathered. Further, a ranking of users may be determined, used to determine a value of observations, and to incentivize desired ticket creation and/or voting behavior.

According to one aspect, one concern relates to introducing external sources of information into such an ecosystem. One danger in introducing external sources includes disrupting the ability of the users to collaborate by introducing distracting, irrelevant, or unrelated material. Conversely, such an ecosystem typically wants and demands access to external sources of information. An example of such a source would be a pharmaceutical company. The pharmaceutical company typically has monetary or reputational interests in presenting their drug, procedure, or information in a light that is most favorable to them. Thus, such sources of information are typically viewed with reservation by any particular physician. However, such sources of information represent time, energy, money, research, and expertise that may not be typically be accessible to a physician.

By providing feedback generated by the user community and associating it with the external information source, individual users within the ecosystem can be assured that the information source is trustworthy, worthy of review, or the feedback can indicate that the information source is a waste of time, for example. Linking these information sources to the ecosystem can improve the underlying knowledge base, stimulate communication and/or learning, and generate new ideas or concepts that the community of physicians can continue to explore. In particular, a user can have access to the expertise of the pharmaceutical company, by having links to their literature, educational material, even the experts that work for the pharmaceutical company.

In FIG. 3, shown is an earn opportunity associated with an external information source in interface 300. In this example physicians are provided and earn opportunity for reviewing literature regarding cessesation of smoking, and in particular a Chantix brochure designed to be distributed or reviewed by patients, reached after clicking on 302. Physician are paid to review the material and in the feedback section are given the opportunity to rate the information source. In this example, users (physicians) may also provide commentary regarding the Chantix brochure at 304. The rank associated with the earn opportunity is an average form the individual scores submitted. In other embodiments an indication of how many users have responded may be displayed, and may include as an indication of the makeup of the respondents. In addition other embodiments may include reputational information associated with the commentators or the user who submitted feedback, and yet other embodiments may include an indication of criteria associated with the physicians who can submit commentary. In one example, a user name is selectable in the feedback section, and by selecting the user name a user may view information associated with the user name. In one example the information includes credentialing information, a reader may understand the experience of the user providing commentary. Understanding the experience of a particular commentator may increase the receptiveness of an audience to the conveyed information, in this case the user's commentary. In one example, the credentialing information maintains the anonymity of the user submitting feedback, while at the same time providing a basis to evaluated that submitted comment.

Figure 23:
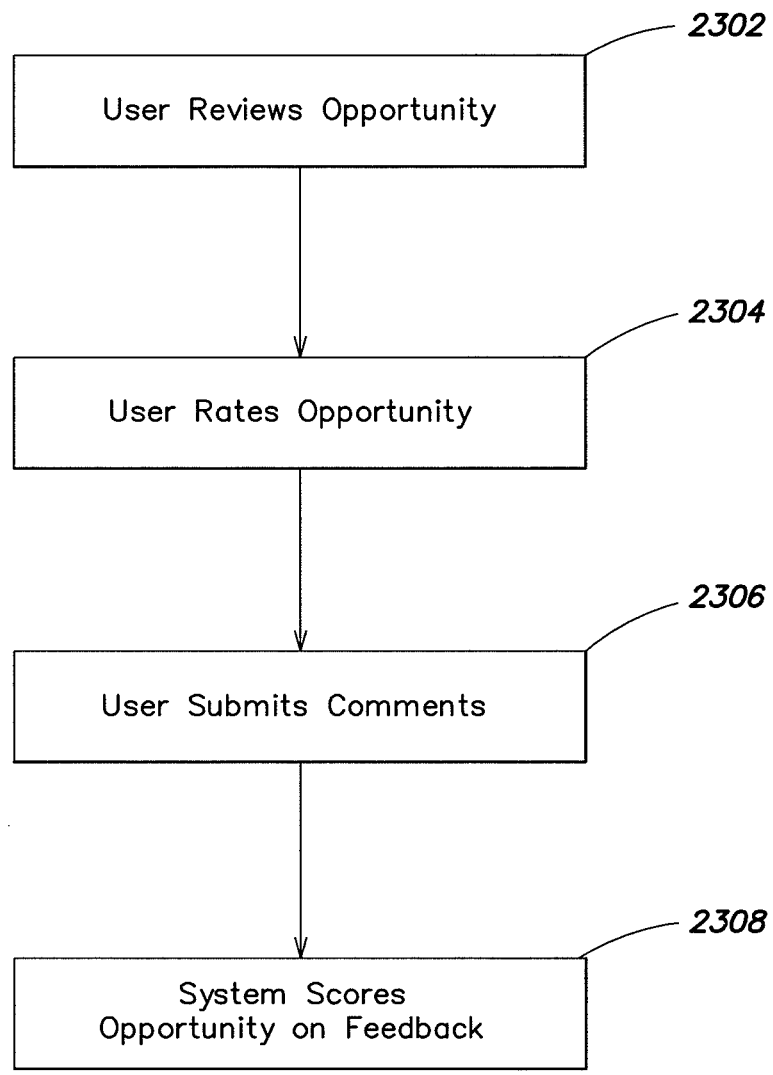
FIG. 23 shows an example of a process for scoring an information source according to one embodiment of the present invention.

FIG. 23, shows one example of a process 2300 for scoring an information opportunity based on user feedback. At 2302 a user reviews an information opportunity, whether it be a learn opportunity, earn opportunity or other opportunity. At 2304, the user rates the opportunity. The rating may be based on relevancy to the user's activity, usefulness to the user's practice, trustworthiness, reliability, feasibility, among other option. In addition, to the ability to rate the opportunity a user may be optionally given the opportunity to submit commentary on the opportunity at 2306. User comments may provide insight into the opportunity not reflected in the scoring of the opportunity generated at 2308. The scoring of the opportunity may be determined by the system on a simple aggregation of scores submitted. In one example, each user scores the opportunity based on a five star rating system. The system may average the number of stars and display an aggregate score for the opportunity. In some embodiments, a user's score is weighted with the user reputational value, so that a score form a user with greater qualifications will factor more heavily into the average. Additional weightings may be employed in other embodiments, including the use of practice information for the user, experience, etc., that make the user more qualified to comment on a particular opportunity, for example.

The preceding example of a pharmaceutical company is just one example of an instance where the interests of the source of the information impact its distribution, trustworthiness, and/or the audience's perception of that information. Other sources/providers of information may have other interests that may bias the presentation of that information. Within an ecosystem that functions at least in part on trust in the information being distributed, and/or at least in part on trust in other users, any bias in information plays a role in its use by the ecosystem.

Preventing external information sources, and in particular advertisements, from impacting the efficient operation of the ecosystem can be performed by unobtrusively presenting such information sources to the users of the ecosystem. In the example of the ecosystem comprising a plurality of physicians, information opportunities, which in some embodiments may also comprise external information sources, are presented unobtrusively in the form of indicators. In one example, seen in FIG. 4, these indicators 402-406 indicate a type of opportunity that is available to the users in the ecosystem and in particular, learn (404-406) and earn (402) opportunities. In this example, these indicators of information opportunities are further matched against the activity being performed by the user within the ecosystem. For example, when a user reviews "Featured Postings" (408) a user is presented with opportunities that relate to those postings. In another embodiment, featured opportunities may also be displayed in an interface 400. Such featured opportunities may be selected based on user interest determined by a number of users visiting the particular opportunity, reviewing the opportunity, and/or commenting on the opportunity. The system may use other metrics to determine a ranking associated with any particular topic, with the topics with the highest scores being displayed first, and queuing operations used to present lower scoring topics. The features postings may also be impacted by user context, in other words, activities that the user performs before reaching the features postings section may impact the display of topics and/or the display of information opportunities.

In one example, contextually matching opportunities to user activity may also increase user receptivity to the opportunities presented. In some embodiments, some of the features discussed above are combined with contextual matching to further improve the willingness of a user to explore a given opportunity. In another embodiment, the ecosystem may also filter matched opportunities by a user's area of expertise, area of interest, years of practice, education, ethnicity, sex, and/or age, among other options. In another embodiment, a system not only contextually matches information opportunities, the system also provides for a display threshold for information opportunities, and/or their indicators. Setting a maximum for the number of displayed indicators and/or opportunities assist in not overwhelming a particular user. The threshold may be based on relevancy scoring, which may assure a user that only the most relevant opportunities are being presented, which in turn may increase user receptivity to the opportunities presented. The display threshold may be based on other options, including whether or not the opportunity has been displayed to this user before, not explored by a user, explored by the user, related to other opportunities explored by the user, commented on, not commented on, among other options. Where multiple matches occur with similar or the same score, queuing theory may be used to present the opportunities, for example round robin, first in first out, last in last out, among other queuing options. Various queuing algorithm can be used in conjunction with the various basis of determining the threshold.

In the example of the ecosystem comprised of a plurality of physicians, information opportunities are also presented in a separate section of the ecosystem. In this example, the user must take an affirmative act, navigate to the information opportunity section, to review the information opportunities therein.

FIG. 5, illustrates an implementation of an opportunities section of an ecosystem. The type 504 of opportunity is displayed in display 500 at 502 under the heading Opportunity, as well as the subject of the opportunity 506, the particular field 508 of practice associated with the opportunity, date posted, number of participants, number of comments, potential earnings for completing the opportunity, rating of the opportunity, and an availability status. One should realize that the information opportunity section may display any combination of these fields and should not be restricted to this particular implementation. For example the opportunities section may display different information associated with the opportunity, some of the fields displayed in FIG. 5, or different fields than displayed in FIG. 5. Other fields may display additional information, including a status of the opportunity. In one example the status may include active, expired, suspended, completed, among other options.

According to another aspect, provided are the management tools for a user (e.g. a client) to introduce information opportunities to an ecosystem. In particular, shown below in FIG. 6, in a management interface (600) for a client managing information opportunities introduced into an ecosystem comprising a plurality of physicians. In the embodiment shown in FIG. 6, the information opportunities comprises HotSpot advertisements, but one should appreciate that any type of information opportunity may be presented and managed through a similar interface.

Shown in FIG. 6, is one example of a management display of existing information opportunities for the particular client. The interface displays the Name of the HotSpot (602), its status (604), number of impressions (606), clicks (608), click rate (610), unique clicks (612), and Cost per click/cost per ad (614). One should appreciate that the management display may display any subset of the displays shown or may show different information, including click-throughs, conversions, average cost, number of displays, average relevancy score, user commentary, user rankings, average user ranking, among others.

As seen in FIG. 6, a client may manage the individual HotSpots to change their status at 616, and click on any individual HotSpot to make changes. A user may select pause 620 or resume 622 to change status. Additionally a user may delete an opportunity by selecting delete 624. Further a client may add additional HotSpots. In response to a client selecting add at 618, the client taken to a HotSpot generation window. The generation window can be a new window, an overlay display, a generation interface, and the invention should not be limited to any particular display of the generation interface. In another example, a user may reach a generation window by selecting edit at 626. In response to selecting edit 626, the generation window will be prefilled with all of the associated information for that particular information opportunity. One example of a generation interface, 1200, is shown in FIG. 12.

Figure 12:
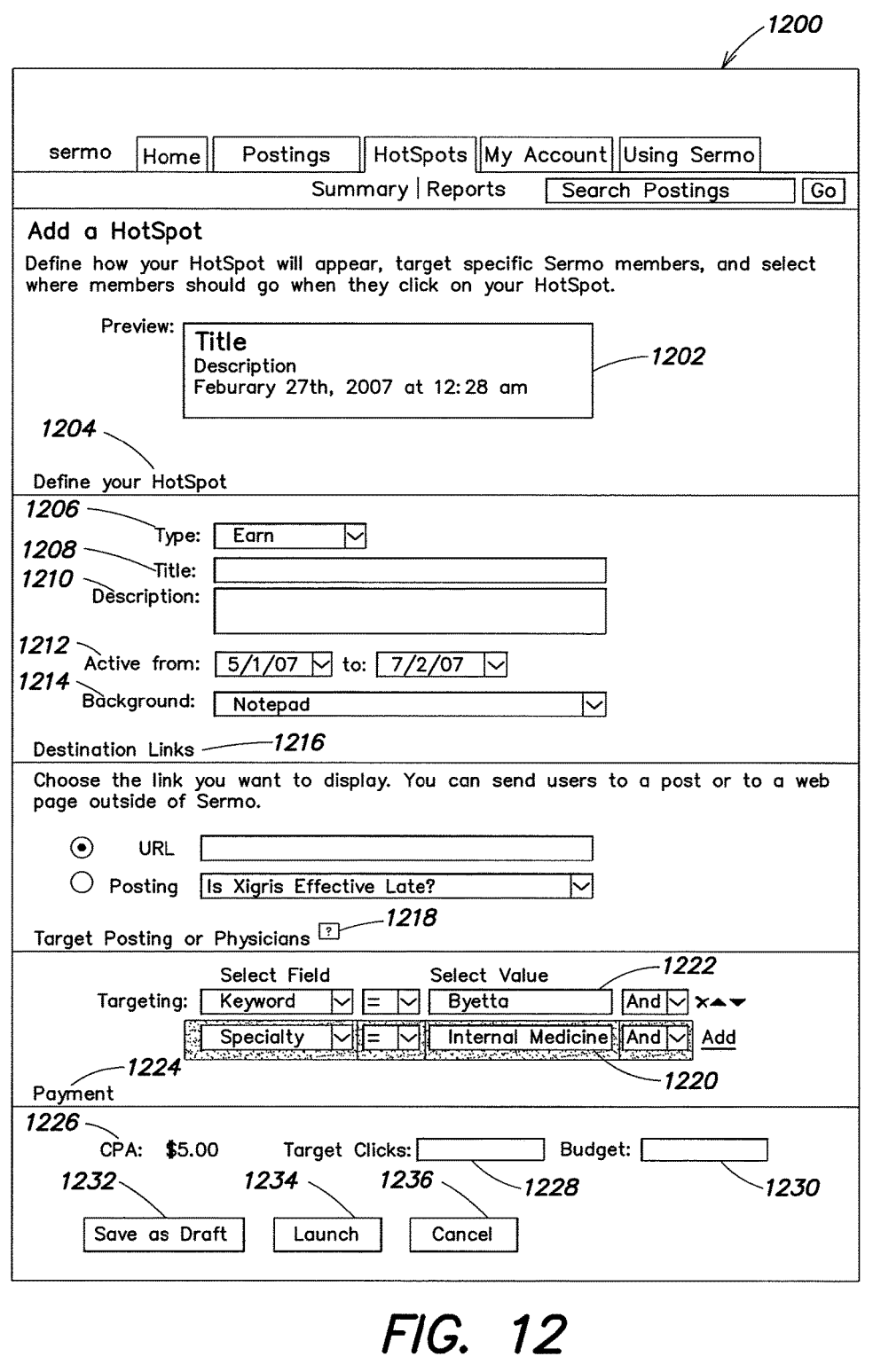

Shown in the example in FIG. 12, is a HotSpot generation interface, the interface includes a preview window (1202), a HotSpot definition section (1204) (type (1206), title (1208), description (1210), time period (1212), background (1214)) links (1216) (url and internal reference), target information (1218) (physician practice areas, specialty (1220), keyword target (1222)), and payment information (1224) (cost per ad (1226), target clicks (1228), and budget (1230)). The generation interface includes the ability to save HotSpots as drafts (1232), launch them into the ecosystem (1234), and to cancel the generation (1236).

In other implementations, different generation interfaces may present different options to a client. In particular, in one embodiment only Type and Title information is required to generate a HotSpot, the other options shown in FIG. 12, may be included as optional information. One should appreciate that the preview engine is not necessary to generate a HotSpot and serves to facilitate rather than operate as a requirement. In the example in FIG. 7, a client may choose not to complete all of the fields shown. In different embodiments, different fields may be required versus optional, and the interface may display a message indicating which fields are required to be completed.

In one embodiment, where the opportunity is an earn opportunity, a client defines criteria that must be completed to earn the compensation, as well as defining the amount a user is compensated for completing the criteria appropriately. Additional options may be included with respect to compensation, time periods may be indicated and associated to a payment rate, with later time periods earning more in one example, and less in another. Other options for compensation rate include a number of responses and an associated rate, and reduced compensation rate over the specified number of responses.

In one embodiment, in response to the client clicking launch, an indicator for the information opportunity is automatically created by the system for display within the ecosystem. The display may occur in response to contextually matching, or may occur in response to a user navigating to the opportunity section as discussed above. One should appreciate that FIG. 12 is shown by way of illustration, and the particular implementation of a HotSpot should not be interpreted as limiting the information opportunities to HotSpot ads. One should further appreciate that other information opportunities (external information sources) may be presented/generated by a client in a similar interface, and that the specific example of a HotSpot generation interface may be readily adapted to other information opportunities.

In another embodiment, additional management tools are provided to clients for managing information opportunities, and in particular, an example of reporting tools for HotSpot advertisements is shown in FIG. 13.

In the example shown in FIG. 13, a client receives reporting on the status (1304) of the HotSpot (1302), its rating (1306), comments (1308), performance (1310), as well as charts reflecting graphical performance according to selectable criteria (1324—Impressions and Clicks over time). Where discussion topics exist they are also displayed (1326). One should appreciate that this example of a reporting display may vary depending on the type of HotSpot, information that the client desires, and should not be interpreted as limiting. One should further understanding that this particular example can be adapted to report on any information opportunity and not just HotSpot advertisements. In one embodiment performance information (1310) includes impressions, 1312, clicks (1314), clicks rate (1316), uniques (1318), CPC/CPA (1320—cost per click/cost per ad), and cost (1322). Other information related to performance may also be displayed. In other examples, only subsets of the previously indentified information is display, in yet others additional information may be selected by the operator for display.

According to another embodiment, information opportunities may take the form of a HotSpot. In such an embodiment, HotSpots represent visual indicators within an information sharing environment that enable third parties to present opportunities for interactions with highly targeted and interested members of the environment. In one example, the information sharing environment is a online community. In another example, the online community is made up of physicians. In an alternative environment, the online community may be made up of all types of medical practitioners.

In an embodiment comprising physicians, HotSpots may be presented to physician participants based on criteria entered by an information provider (e.g. third party—one should appreciate that members of the community may also sponsor information opportunities, that is present information opportunities to the community). In one example, eligibility requirements may include specialty, drug, disease state, etc.). Information opportunities are further refined to present opportunities at a time and place where users are most engaged and interested in the information opportunity. For example, information opportunities may be contextually matched to activity being performed by a user. Contextual matching may be tied to searches being performed by the user, additionally navigation may provide context against which to match information opportunities. Contextual matching may also include matches made against a personal profile of a particular user, for example, a physician may received a particular information opportunity because s/her is a member of a particular specialty, area of practice, or other option.

According to one embodiment, information opportunities can be used to

Target only those users (e.g. physicians) who meet your criteria

Engage and inform select users (e.g. physicians) about your specific opportunity or challenge Distribute information, study results, and presentations Recruit specific users (e.g. physicians) for longer-term research, trials, testing, and advisory boards Various implementation of information opportunities may also include the following features: Unobtrusive—Information opportunities are not traditional banner ads, but more like engaging and relevant educational opportunities. This is reflected in how (and how often) they're displayed. Contextual—Contextually relevant opportunities are presented in response to a physician's search within the online community. Targeted-Learn and Earn opportunities are targeted to only those physicians who meet the criteria established by the subscriber. Customized—Learn and Earn opportunities can be as customized to an individual physician as you dictate.

According to another embodiment, information opportunities can be further broken down in certain types. For example, information opportunities can be classified into learn and earn opportunities. Some characteristics may include:

Learn Opportunities

Knowledge flows from client to a user (e.g. physician)

Provide eligible users (e.g. physicians) with information that is relevant to that user's practice (for example the user's medical practice), continuing education or other vocation-focused content.

While there is no financial compensation, these opportunities are intended to provide information that can help improve professional practice (for example patient care).

Earn Opportunities

Knowledge flows to client from to a user (e.g. physician). Designed to provide client insights that are derived from the user's (e.g. physician) knowledge.

Token remuneration for participation in a designated activity, which can be a survey within the ecosystem or participation in an off-site survey or other activity.

It is realized that the presentation of information opportunities impacts user's receptiveness. According to one embodiment, information opportunities are configured to appear in two places during the course of a user's interaction with the ecosystem. For example, they can seamlessly appear on the ecosystem's user interface as a survey to specialty physicians that they take once and it disappears (no archiving of survey or multiple presentations). Results obtain from the survey are archived a client dashboard, for the client who provided the information opportunity. They can also appear as links to any external URL or information source. Information opportunities are intended to be flexible and not limited to any particular opportunity.

In one embodiment targeting criteria may include the following options for a user community comprising physicians:

Medical Specialty—Specialties may be classified by tier and may include for example a Tier 1, 2 or 3 designation dependent on for example the size of a population in the specialty. Tiers may be defined in other manners, for example, by relatedness to a particular opportunity, among others.

In one example—the population of users within the community may influence tier breakdowns: Specialties representing >5,000 user; Specialties representing >2,000 users; and specialties representing >1,000 users. Although one should appreciate other ranges may be used or even additional or fewer tiers.

Specialties may include Allergy and Immunology, Anesthesiology, Cardiology, Critical Care, Dermatology, Emergency Medicine, Endocrinology, Family Medicine, Gastroenterology, Geriatrics, Gynecology, Hematology/Oncology, Infectious Diseases, Internal Medicine, Med/Peds, Nephrology, Neurology, Obstetrics, Ophthalmology, Orthopaedics, Osteopathy, Otolaryngology, Pain Medicine, Pathology, Pediatrics, Physiatry, Psychiatry, Pulmonology, Radiation Oncology, Radiology, Rheumatology, Surgery, Surgical Oncology, Urology, Women's Health, among others.

Geography (Zip or State)—other options may be incorporated using proximity to a zip code or state, and/or proximity to a particular location, facility, medical school, laboratory, for instance.

Contextual criteria
  Keyword (e.g. Chantix, smoking, smoking cessation)
  Navigation choice (topic, title, subject of link, meta data associated with navigation choices, etc.)
  Profile information (journal subscriptions, medical school, practice area, practice geographical area, etc.)

Other targeting criteria includes practice-type, hospital affiliation, client target lists (a high prescriber, for example, frequent user of specific testing (MRI, CAT scan, etc.), amongst others), affiliations, ethnicity, medical school, social groups, subscriptions, reading habits.

One should appreciate that variations in targeting criteria may be used, for example, targeting criteria may employ any subset of the forgoing criteria. Additional different criteria may be employed outside of the physician community context.

It is realized that the most successful opportunities should have certain characteristics in common to appeal to a user community. According to one embodiment, information opportunities should provide relevant & objective scientific information. In one example, this may represent information that the user community can not get anywhere else. Each information opportunity may be treated as if it were its own invention—and a goal may be to avoid using expected approaches. In an ecosystem comprising physicians provide information that physicians can take action on (new scientific data). Other examples, include providing anything that allows users to practice better medicine, and in some examples improve practice right away. Information opportunities should provide an opportunity to improve their practice (for example an MD's recommended books may provide invaluable time savings to another MD with similar interests) and/or help their patients (for example—the information opportunity may ask and answer—would you use this patient education material?). The information opportunity provides a vehicle to let the physicians community influence each other and promote teacher/student and expert/novice discussions within the community.

According to another embodiment, information opportunities provides users in the community access to information they would not normally have. Indeed third party sponsored information opportunities may provide access to that third parties private information, or even confidential information. For example, a drug manufacturer may wish to received feedback from an online physician community about the effectiveness of a particular drug, or for example, whether certain practitioners would even use a particular drug for a particular condition. In such an embodiment the information opportunity allows the community to learn of information previously unavailable (for example through third party's experts, through access to confidential research, or other vehicle), debate (using for example videocasts, or chats), educate (in other words provide data that allows the "teachers to teach"), and participate and demonstrate knowledge or expertise—even provide answers to diagnostic questions.

According to another embodiment, information opportunities should be designed to provide a clear description for the desired activity, this can include a descriptive title for example. A goal that may be achieved is to make the opportunity interesting and clear so that it provides a good indication of what the opportunity is all about. The information opportunity should contain relevant information here, and in one example, all relevant information should be provided up front before a user selects to participate. For example, in developing information opportunities breaking up long descriptions into paragraphs with white space in between is good practice, but not required.

According to one aspect, an import feature provided in certain embodiments is the community feedback mechanism. The community feedback mechanism presents the community with a filtering mechanism for any source of information introduced into the ecosystem. By providing a filtering mechanism the information ecosystem does not stagnate on old information but is exposed to interesting new concepts and at the same time isn't flooded with the irrelevant, annoying, and/or inappropriate material that often plagues online communities and the internet in general. In one example, each information opportunity is associated with a ranking. Users reviewing an information opportunity score the opportunity high for informative, relevant material, and low for irrelevant, untrustworthy information. In one example submitted scores are averaged from the reporting users, in another embodiment scores may be weighted by a reputational value associated with a particular user. Reputational value may be determined based on a particular user's credentials, or on other activity associated with participation in an ecosystem, for example, the weighting may include a reputational value determined as part of a member of an information brokering service.

In another example a default ranking may be assigned to any new information opportunity, alternatively the source of the information opportunity may have accumulated a ranking from previous postings, and in such a case, the previous posting average ranking may be used to establish an initial rank for the new posting. One should appreciate that an initial ranking is not required, and in some examples, a new opportunity may indicate that the opportunity is new. For indicators of "new" there may be an associated time frame after which the designation of "new" may expire and no longer be displayed. In one alternative, the "new" display may remain until a certain number of responses/comments/feedback are accumulated.

In another embodiment the community feedback mechanism includes commentary submitted on the information opportunity. Through user commentary a user reviewing an information opportunity can determined almost immediately if the opportunity is worth the time and/or effort to participate. In such a manner, the ecosystem's user can develop a sense of trust and reliance on the other members of the community. In one embodiment, the feedback mechanism becomes a vehicle for community policing of information within the ecosystem. The rating scores may be used to filter out information opportunities based on a system setting, or may be filtered out based on s user setting requiring a minimum score. Additionally, user comments may be instructive even where an opportunity meet a minimum threshold, allowing a user to quickly evaluate an information opportunity without requiring the user to visit the opportunity itself.

It is realized that in an example community, for instance a physician community, physicians operate in a rapidly changing business, that may make physicians feel "isolated" from their colleagues' thinking and knowledge. Information opportunities coupled with community feedback serve to alleviate these concerns. Information opportunities also take advantage of for example, training that "group think" helps to innovate, improve and solve problems, perceived time efficiencies, among others. Community feedback mechanism assist the community in filtering out the "trendy"—for example, MDs won't waste their time or reputations on what is flashy, but invest the effort and time in things that will improve their care, profession, or provide interesting insight. Community feedback fosters trust in an information ecosystem, and encourages building trust in the environment and colleagues. Other aspects of the environment may facilitate user's trust in the system for example, ranking—credentialling and authentication as part of the ecosystem, and "wisdom of the crowd" algorithms designed to generate reputational rankings of the participants in the ecosystem.

According to some embodiments, community feedback spurs a sense of user ownership, accountability and participation that is the ecosystem becomes a voice of the whole user community. In one embodiment, a users experience while participating in an ecosystem includes a number of interactions with information opportunities. In the course of browsing within the ecosystem, a user is presented information opportunities that are associated with the topics being reviewed. In one embodiment, the information opportunities are selected against a number of relevant opportunities, and optionally the number of opportunities presented is reduced by the system to meet a threshold. One example of a threshold, is a predetermined maximum number of opportunities to display per screen. In other examples, a dynamic threshold may be determined. One embodiment, can evaluate the footprint of information opportunity indicators on the screen displayed to a user, and determined if the foot print exceeds a desired amount. The desire amount may be adjusted dynamically to account for the presentation being viewed by a user. Another method of reducing displayed information opportunities is to provide only contextually matched opportunities. For example, if the user entered a search on smoking cessation, then an information opportunity regarding a self help stop smoking brochure would be matched. In the event of multiple contextual matches, the matches may be ranked based on relevancy, and presented in the order of relevancy. Other options may be used to present multiple opportunities, including establishing a queue of matched opportunities. In one embodiment, contextual matching includes matching select tags for a presented topic against information opportunities. For example, a tag related to a particular disease state may be matched against an information opportunity related to treatment of the particular disease state.

In one embodiment, indicators of an information opportunity may reflect the nature of the opportunity presented. In one example, an information opportunity display indicates an earn opportunity. The earn opportunity presents a user with an opportunity to earn remuneration in exchange for performing a particular activity associated with the information opportunity. The indicator may also indicate a learn opportunity. Generally speaking opportunities may be classified as learn or earn, but other classifications are possible.

Additional classifications may present additional detail to a user of what to expect when selection the particular information opportunity. In one example, a user who is a member of a physician community expects to be presented learning material that may improve skills by selecting a learn opportunity within a set of search results, additionally, information opportunities may be presented within discussion topics and be displayed in associated with particular tags, or in some embodiments the information opportunity indicator may be associates with particular statements within a display comment.

In another embodiment, the indicator of the information opportunity is adapted to present additional detail associated with the opportunity by simply rolling a pointer (e.g. mouse arrow) over the opportunity. In response to the roll over, an overlay display will be presented to the user that provides additional information on the information opportunity. In one example, the additional information may describe the option to download educational tools associated with the topic. In response to a user selecting the information opportunity indicator a new display will be presented to the user, the new display is still within the ecosystem, and typically includes a ranking of the opportunity obtained from user submission, as well as any commentary submitted by users who review the opportunity. In one example, the new window comprises an information opportunity summary display. Any user can evaluate whether the information opportunity is going to be worth the effort from reviewing the score, and any commentary. Within the summary screen a user may select to participate in the information opportunity, for example, by selecting start earning. The selection directs the user to the information opportunity, which may be an external source of information.

Figure 14:
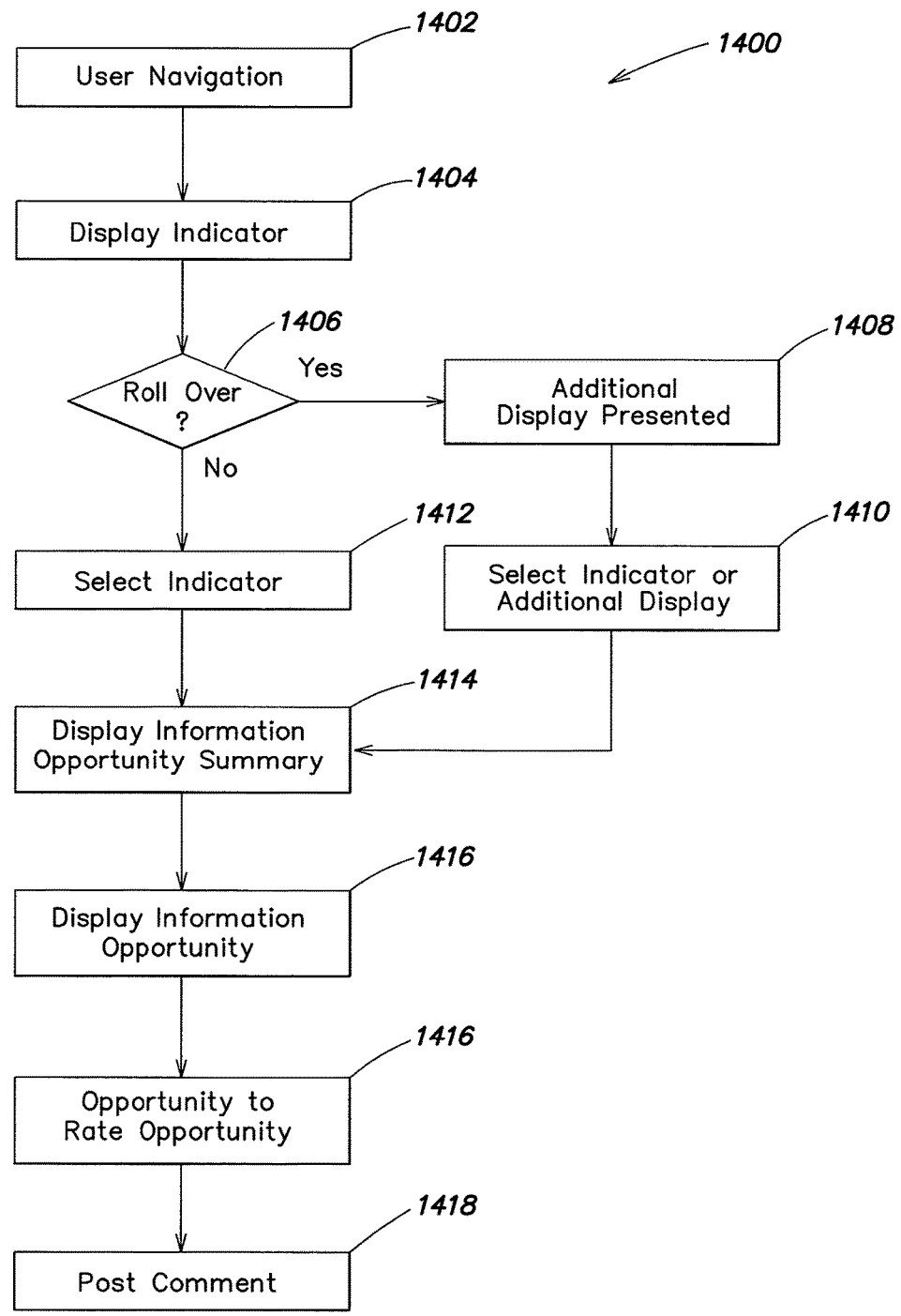
FIG. 14 is an example process for directing a member of an ecosystem to an information source/opportunity according to one embodiment of the present invention.

Shown in FIG. 14, is an example process 1400, for directing a member of an ecosystem to an information opportunity, the information opportunity may be external to the ecosystem. At step 1402 a user participating in an ecosystem navigates the ecosystem. In one embodiment, navigation may include performing searches, selecting links, clicking on topics, or any other activity that may be performed within the ecosystem (entering comments, reading articles, voting on tickets, etc.). At 1404, indicators of information opportunities are displayed in the ecosystem interface. Optionally the indicators of information opportunities are reflective of contextually matched opportunities. In other words, the system returns information opportunities and displays indicators to the user based on the user's activity. If for example, the user search on smoking, and kicking the habit, the system returns information opportunities most closely related to stopping smoking. At 1406 (YES), the user may optionally roll over the information opportunity indicator, if the user rolls over the indicator an additional display will appear in response to the roll over event at 1408, the additional display provides some detail on the information opportunity, for example the additional display may indicate a title for the information opportunity. In one example, the title indicates the nature of the opportunity stop smoking, and in another the title may include more information. In another example, displayed in the additional display is more information on the opportunity. For example, the additional display indicates download educational material on stopping smoking. One should appreciate that the additional information provided should provide the user with more detail as to the subject of the information opportunity but does not need to conform to a particular type of information, for example, it would not need to be a title, but rather provide more information on what to expect. At 1410, the user may select the additional display or the indicator. If the user does not roll over the opportunity 1406(NO) the user may still click on the indicator at 1412.

At 1414 in response to selecting the indicator at 1412 or the indicator or additional display at 1410, an information opportunity summary is displayed. The summary includes a ranking of the information opportunity determined from user feedback. Additionally, the summary display may include user commentary on the information opportunity. At 1415 the user is taken to the information opportunity in response to selecting the opportunity within the summary display. For example, a user may select start earning. In another example a user may select start learning. The user then reviews the information opportunity. In one example, the user may perform any required action indicated by the opportunity to earn. In another example, the user may be presented with information designed to educate the user. Once the user is done with the information opportunity, the user is given an opportunity to rate the information opportunity, at 1416. Optionally the user may close the information opportunity without rating it (not shown). At 1418 the user is also given the opportunity to submit commentary on the information opportunity.

Figure 15:
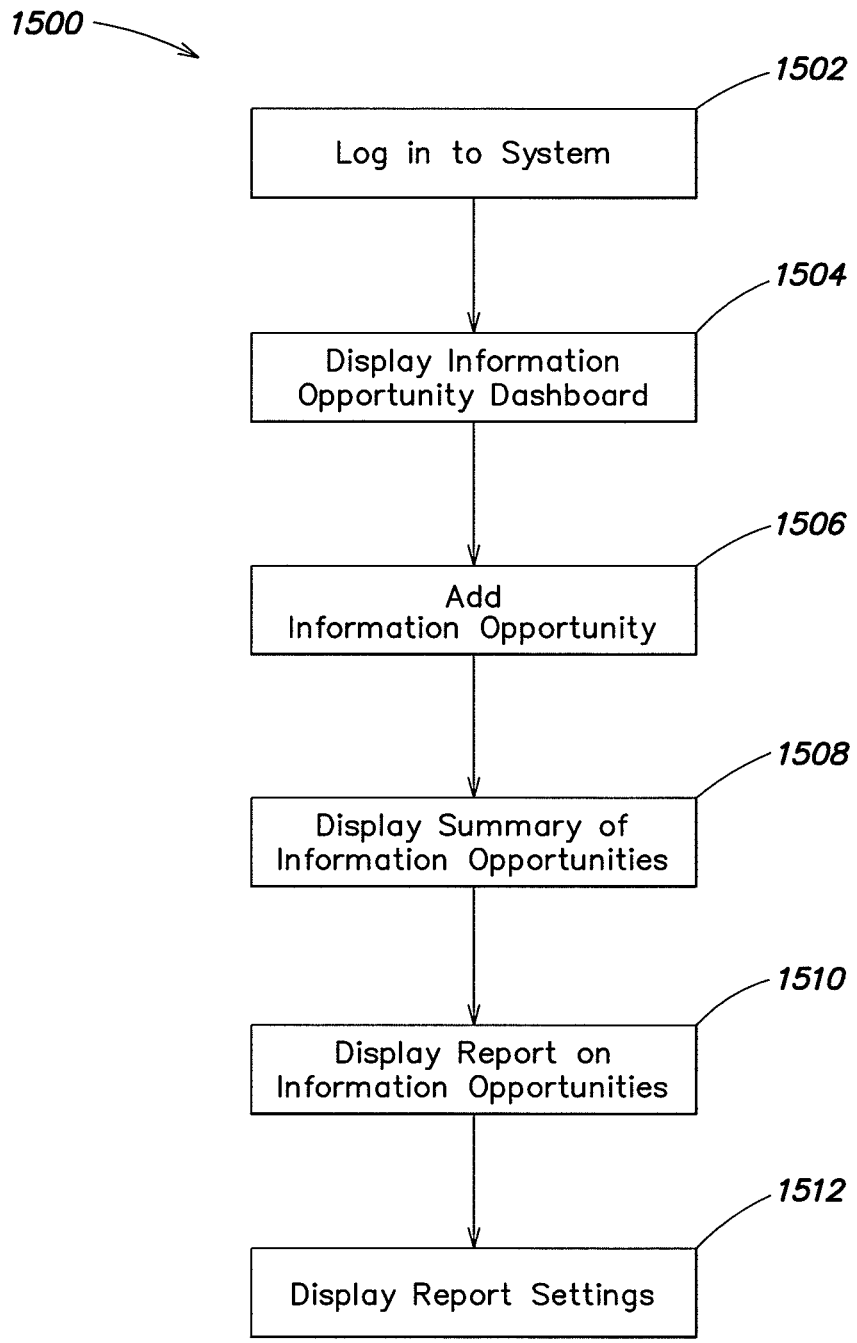
FIG. 15 is an example process for managing information sources/opportunities according to one embodiment of the present invention.

FIG. 15, shows an example of a process, 1500, for managing an information opportunity. At 1502, a client logs into the ecosystem. Optionally, client access to the ecosystem may be limited to management of information opportunities, and a client may not be given access to the content of the ecosystem beyond the management functions. At 1504, the system displays the information opportunities entered by the client in a management dashboard. The display may rank the information opportunities according to activity, use, visits, ending sooner, newly created, or use other methods. In one example, active information opportunities are shown in a dashboard display base on which information opportunities are most active. For example the top five may be displayed, or the top ten. The particular number of displayed opportunities is not important beyond, a desire not to clutter the display. A client may customize his/her own display to include a number of opportunities indentified by the client. The client may select add a information opportunity from the dashboard and at 1506 an interface for adding an information opportunity will be displayed. The interface may permit the client to preview any information opportunity as part of the generation, select a type of opportunity, create a title, description, date range, as well as the source of the information opportunity (which may be internal or external to the ecosystem). Optionally, a client may select a summary view from the dashboard and at 1508 a summary view of the information opportunities entered by the client will be displayed. The summary display will present the client with opportunity to select particular information opportunities, and perform actions on them (pause, resume, delete, edit, for example). The summary information may include status, impressions, clicks, click rate, unique clicks (uniques), and CPC/CPM/CPA, although other metrics may be displayed. Optionally a client may be able to select reports on the information opportunity either from the dashboard or from the summary information display, and at 1510 a report interface will be displayed. In one example, the report interface includes displays for actions that may be performed on the reported information opportunity (pause, resume, clone, delete, for example). The report interface may display detailed information associated with the information opportunity, for example, status, rating, comments (number of), and may also provide performance metrics. In one example, performance metrics include impressions, clicks, click rate, uniques, CPC/CPA, cost, among others. The report interface may also display information on what particular aspects have the greatest impact on the information opportunity. In one example, one particular keyword generated the majority of matches for the particular information opportunity, that keyword is displayed with a percentage of visits attributable to it. The report interface may also include graphical displays of performance information over time. Optionally, a client may be able to select report setting from the dashboard display or from the report interface, and at 1512 a report setting interface will be displayed. In one embodiment, the report setting interface includes selectable options for choosing to display performance information in the summary interface, and/or the report interface. In one example, a client may select impressions, clicks, click rate, uniques, CPC/CPA, cost, among others, as well as selecting keywords to display information on, and for example, information on the users who review a particular information opportunity, breaking down the reviewing population into specialty, practice area, among other options.

Figure 16:
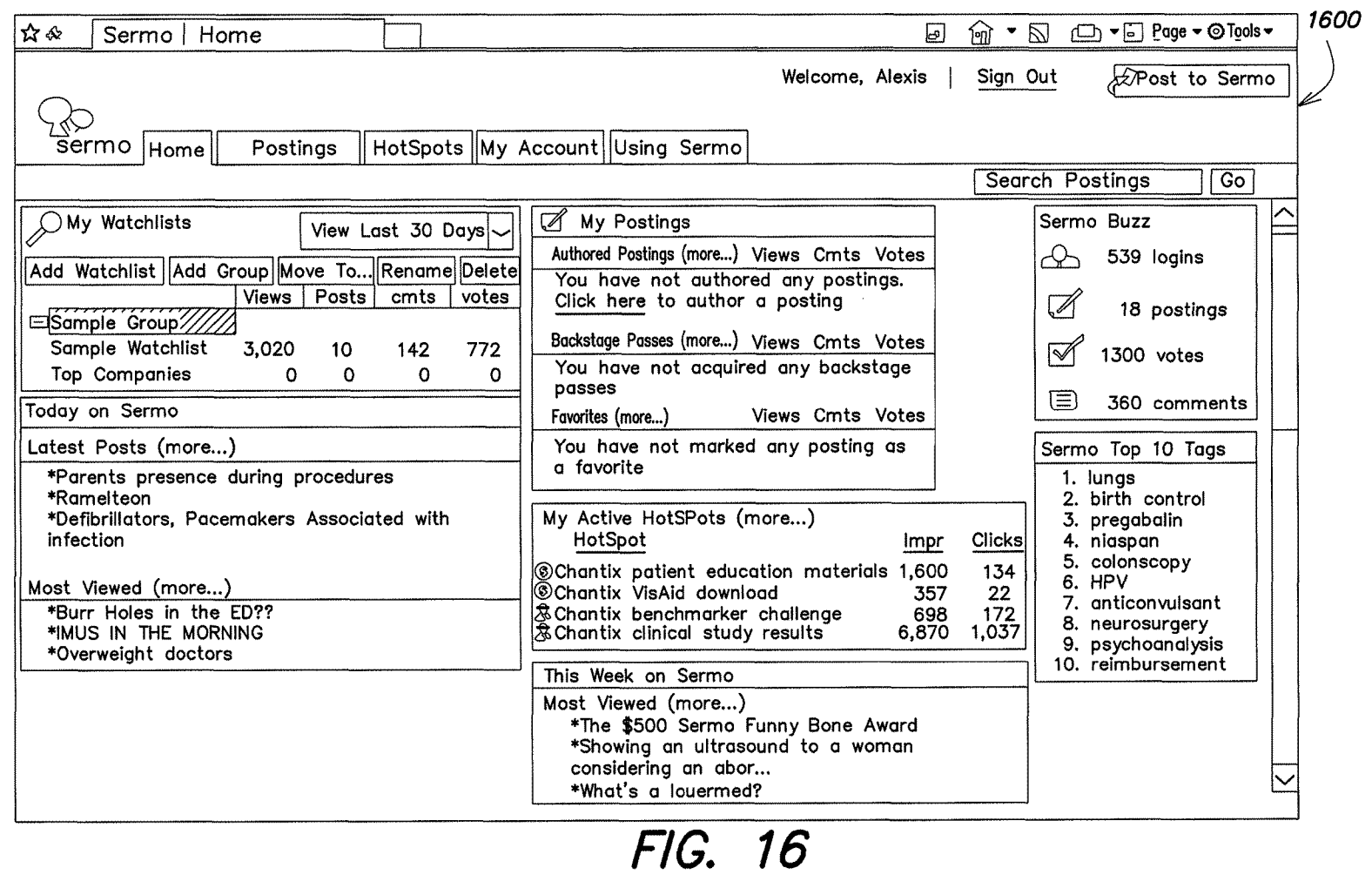
Figure 17:
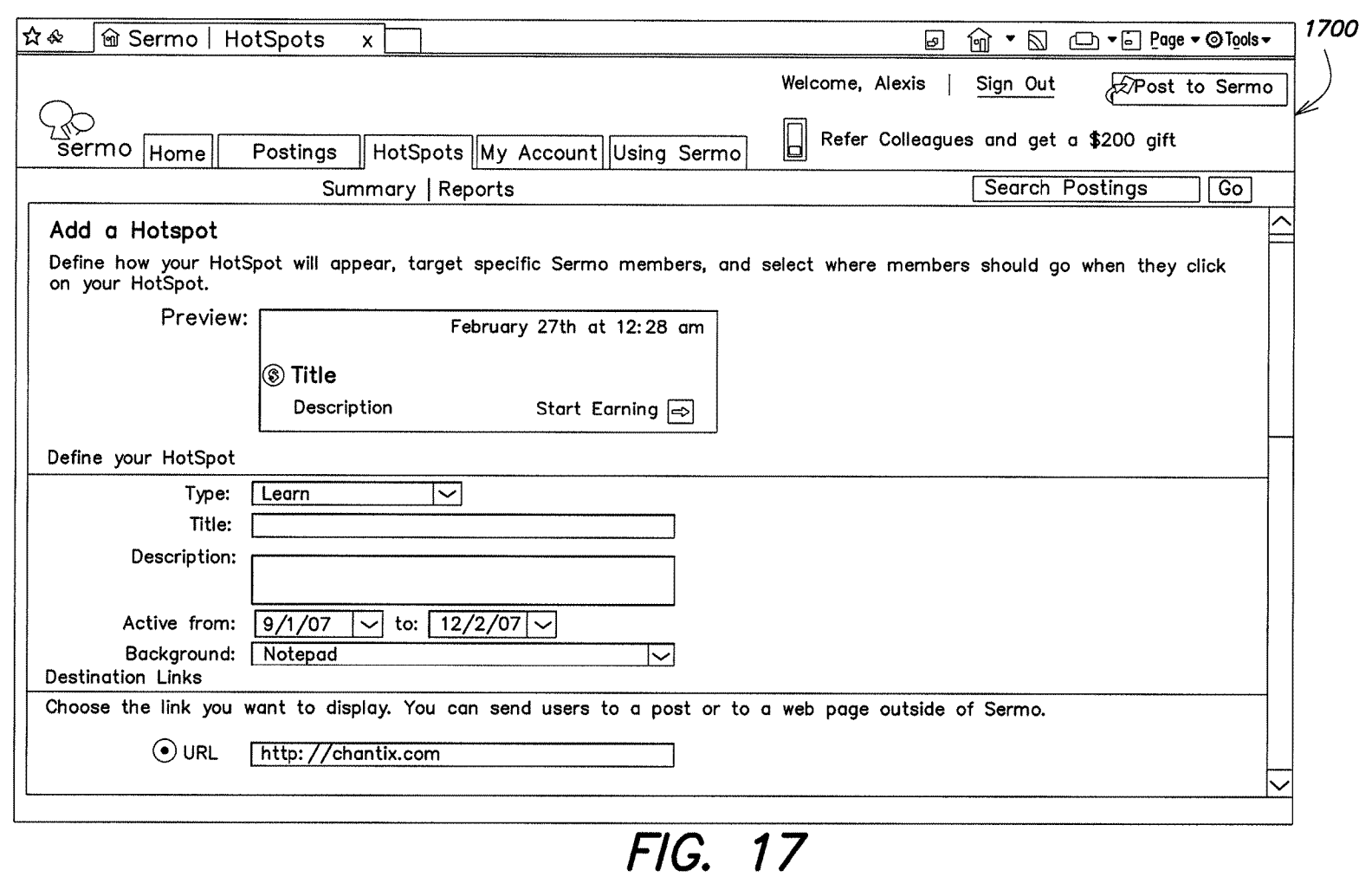
Figure 18:
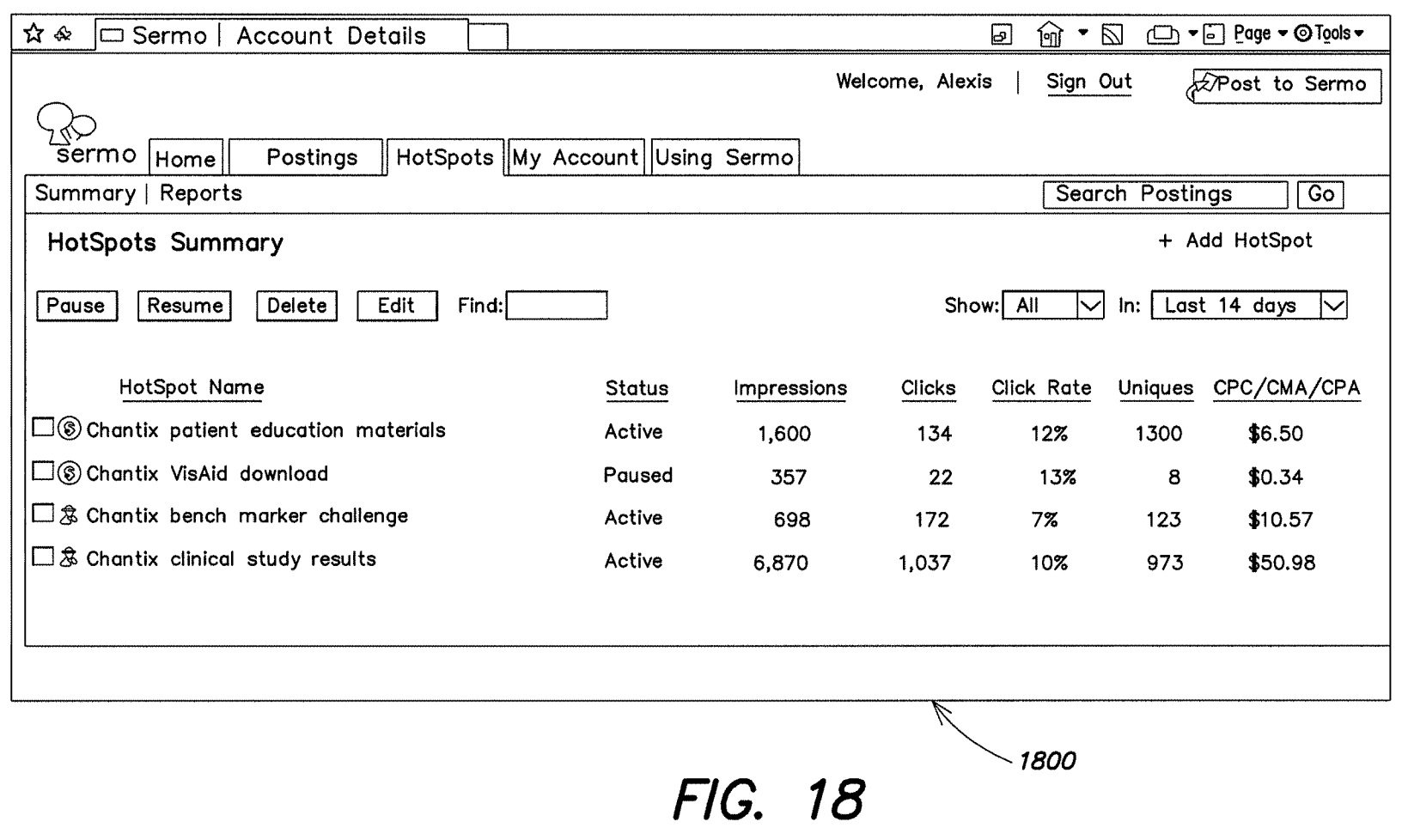
Figure 19:
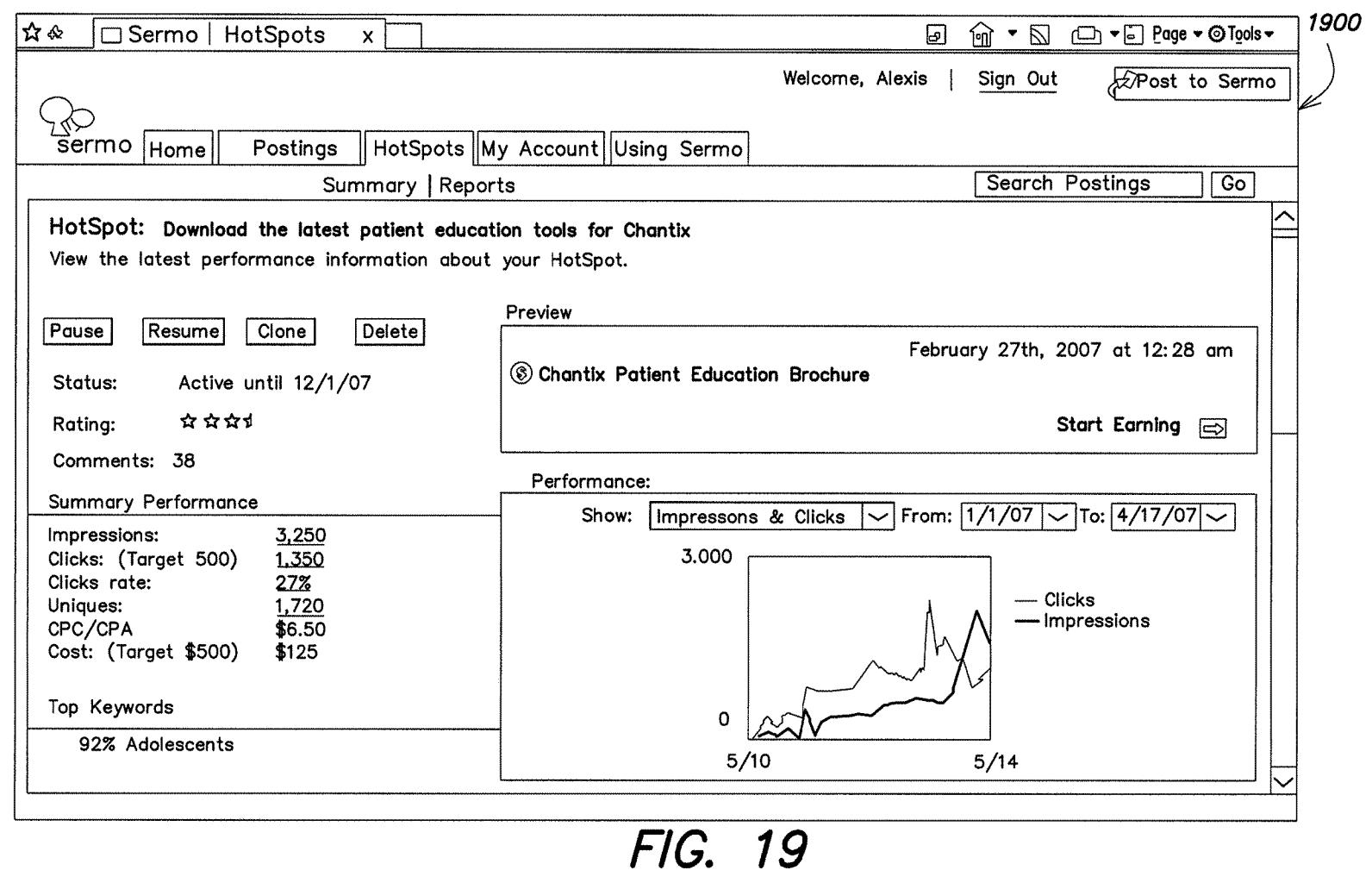
Figure 20:
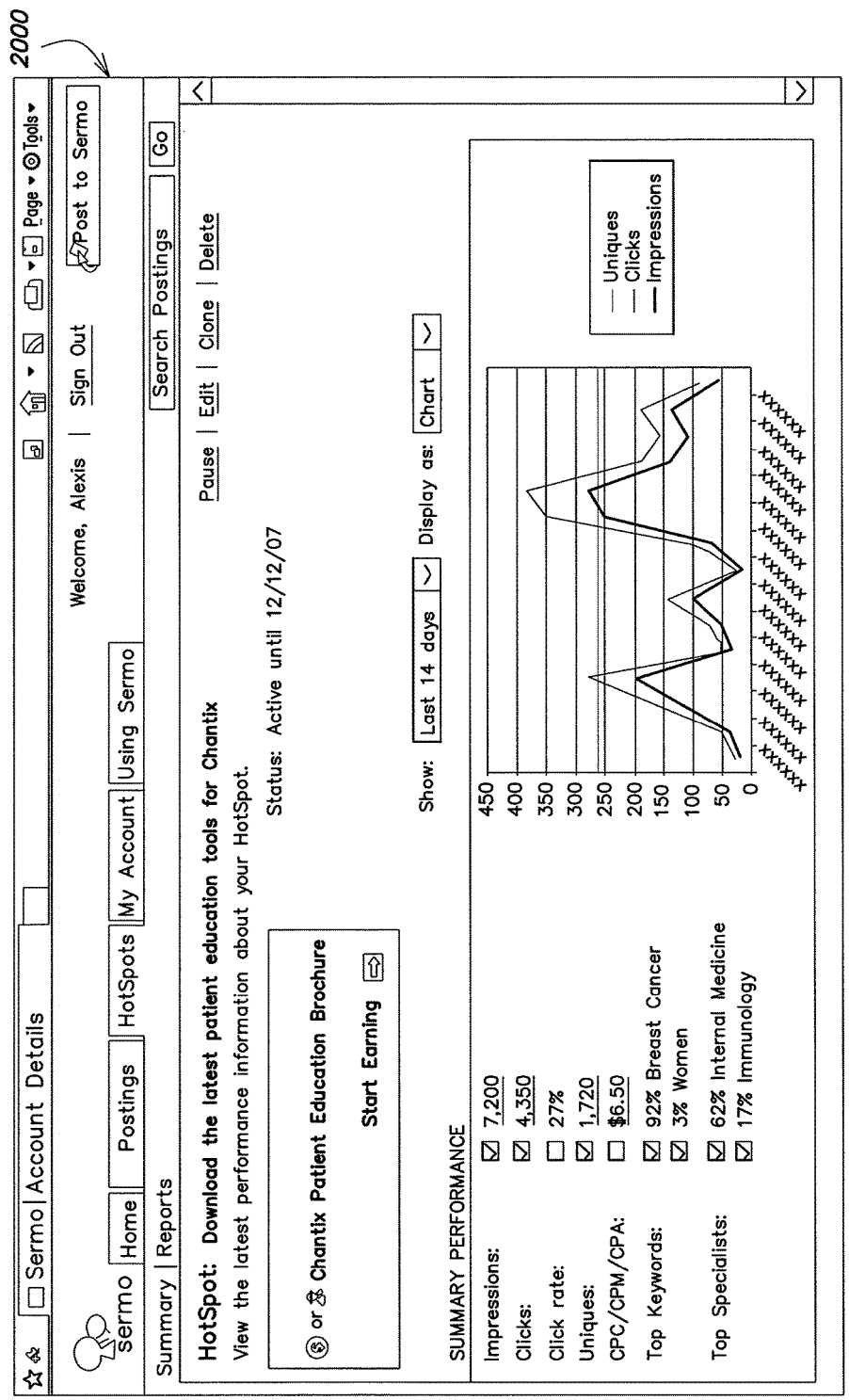
FIG. 20 shows an example of a report management interface according to one embodiment of the present invention.

FIG. 16 shows an example dashboard, 1600, that may be displayed as part of process for managing information opportunities. Dashboard 1600 may be displayed for example, as part of process 1500, at 1504. FIG. 17 shows an example of an interface, 1700, for adding an information opportunity wherein the information opportunity comprises a HotSpot. In one example, interface 1700 may be shown for example as part of process 1500, at 1506. FIG. 18 shows an example of a summary view, 1800, of information opportunities that may be displayed to a client. In one example, view, 1800, may be displayed as part of process 1500 at 1508. FIG. 19 shows an example of a report interface, 1900. Report interface 1900 may be shown as part of a process for managing information opportunities. In one example, report interface 1900 is shown as part of a process 1500 at 1510. FIG. 20 shown an example of a report settings interface 2000. Report settings interface may be displayed as part of a process for managing information opportunities. In one example, report settings interface 2000 is displayed as part of process 1500 at 1512.

According to one example, information opportunities can be used to benefit the ecosystem and the client presenting the information opportunity. Considering a learn opportunity, example, the client can provide access to the client's expertise (e.g. holding videocasts, Roundtables, webcasts, webinars, on line meetings, online discussion, among others), can distribute comprehensive product information (e.g. PIs, study results, journal articles, clinical trial data, e-details, etc.) to targeted users (e.g. physicians) at launch or post launch in order to expedite the acclimatization. The information opportunity can result in education of specific users on the clients products. For physicians this could include MOA, ethnography, educational videos, poster sessions, MD-authored slide presentations, etc. The client may also gain interest among users about its products, for example, through benchmarking challenges and other diagnostic challenges. In embodiments where physicians are targeted the client can engage CME materials to physicians, share clinical trial data, engage clinical site investigators, among other options. Continuing learning education credits may be applicable to other populations outside the medical, or in any profession where continuing education is required or even preferred.

According to some examples, information opportunities also present clients with the ability to recruit specific users, for example physicians for long-form market research/marketing surveys, clinical trials, focus groups, editorial boards, advisory boards, etc. Drive targeted physicians to a specific Pfizer products messaging or promotions (re-direct to desired online property). The client may engage MDs in concepting and development of patient educational materials and other creative in order maximize impact of the creative in market in a cost effective and efficient way. Other options include increasing the distribution of patient educational materials by promoting them to targeted physicians for download; recruiting physicians to help refine clinical trial protocol and feasibility; quickly creating an MD Advisory Board to gauge patient understanding of a client's products; recruiting for patient experience feedback programs; gauging early estimates of impacts of launch brands; testing visual aids, increasing relevance of a rep's (marketer) approach to MDs; and engaging physicians and patients in clinical trials, as some examples. Each of theses aspect can be leverage over time, an in a physician setting, could be used over a drugs life cycle to develop critical information early in the life cycle.

Clients can recognize success in the information opportunities at early stages through a number of means, for example, Spot served (# of HS impressions), Interactions/Interaction rate (# of roll-overs viewed), CTR (# of clicks on impressions), Completes (# of people who completed activity), Completion rate (Conversations/click thru #), Rating (# for each star rating), Average Star Rating, Top sources (postings), Physician Reviews, and other Value metrics.

According to another embodiment, information opportunities are presented in the form of HotSpots, a capability that enables the unobtrusive and highly targeted promotion of learn and earn opportunities from clients or producers to a user community. In an example, implementation where the user community is made up of physicians HotSpots are implemented using specific roles for identified types of users. For the physicians who make up the community, the physician users have the ability to view and launch (participate in an opportunity) a HotSpot. Clients are identified as information consumers, that is someone who is seeking information from the user community, or someone who is looking to capitalize on the power of the community to develop a consensus of opinion for particular issues. Co-pending application, offers implementation and examples of an Information Brokering Service for which information consumers interact with an ecosystem to develop consensus opinion, various implementations of information opportunities may be coupled to such an environment. A client will be able to create and manage HotSpots. In one example, clients will not be permitted actively participate in the ecosystem beyond creating and managing HotSpots.

Producers may form another category of user. They can be thought of as information consumers as well, but the information they require is often more targeted. For example, a producer may be a producer of a new drug and is looking to enlist physicians to assist in clinical trials, report on drug performance, and other information associated with the roll out of a new product. A producer will have similar responsibilities as a client, including the ability to create and manage HotSpots. In one example, a physician user has the ability to view HotSpots, view opportunity teasers, launch opportunities, can get paid for participation. In another example, a client or producer can create HotSpots and opportunity teasers, manage the HotSpots and opportunity teasers, accepts billings for complete activities, and manages payment.

According to one example, HotSpots must conform to certain rules For example, rules may include a limit on the number of HotSpots displayed on a page, requiring HotSpots match a combination of: a physician's ad profile (specialty and/or region, Rank, Demographic, Geographic and Volumetric), the context of the page being displayed (e.g. keywords, specialties, description, comments), a maximum of X HotSpots may be displayed per page, HotSpots must be unique per page displayed, the frequency by which HotSpots appear per number of page views can be dynamically tuned, in one example, approximately 3-4 per page.

Other rules may govern operation for instance, clicking on a HotSpot opens the teaser view for a single opportunity, HotSpots don't appear in teaser detail pages, physicians are able to opt-out of seeing a specific HotSpot again, if no targeted HotSpots available, a house HotSpot (equivalent to a house ad) may be shown, among other options.

Although specific examples have been shown with respect to an environment comprising a plurality of physicians, it should be understood that other ecosystem are within the scope of the present invention. Moreover, one should understand that the specific examples shown are adaptable to information opportunities generally rather than limited to HotSpots or the particular examples shown.

General Purpose Computer System

Various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor, including single, dual, and multicore processors. It should be appreciated that one or more of any type computer system may be used to facilitate an online ecosystem according to various embodiments of the invention. Further, the system may be located on a single computer or may be distributed among a plurality of computers attached by a communications network.

A general-purpose computer system according to one embodiment of the invention is configured to perform any of the described functions above, including but not limited to, creating, storing, and receiving information opportunities by clients, users, participants in the ecosystem, or sources of information external to the ecosystem. It should be appreciated that the system may perform other functions, including compensating users for participation in information opportunities, establishing rules governing information opportunities, controlling display of information opportunity indicators, displaying indicators, rendering information opportunity summaries, rendering teaser windows, displaying commentary from users, ranking information opportunities, accepting rankings from users, accepting commentary from users, displaying additional information on information opportunities within the ecosystem, directing users to locations external to the ecosystem, receiving payments from information consumers, providing indications to users and consumers, etc., and the invention is not limited to having any particular function or set of functions.

Figure 21:
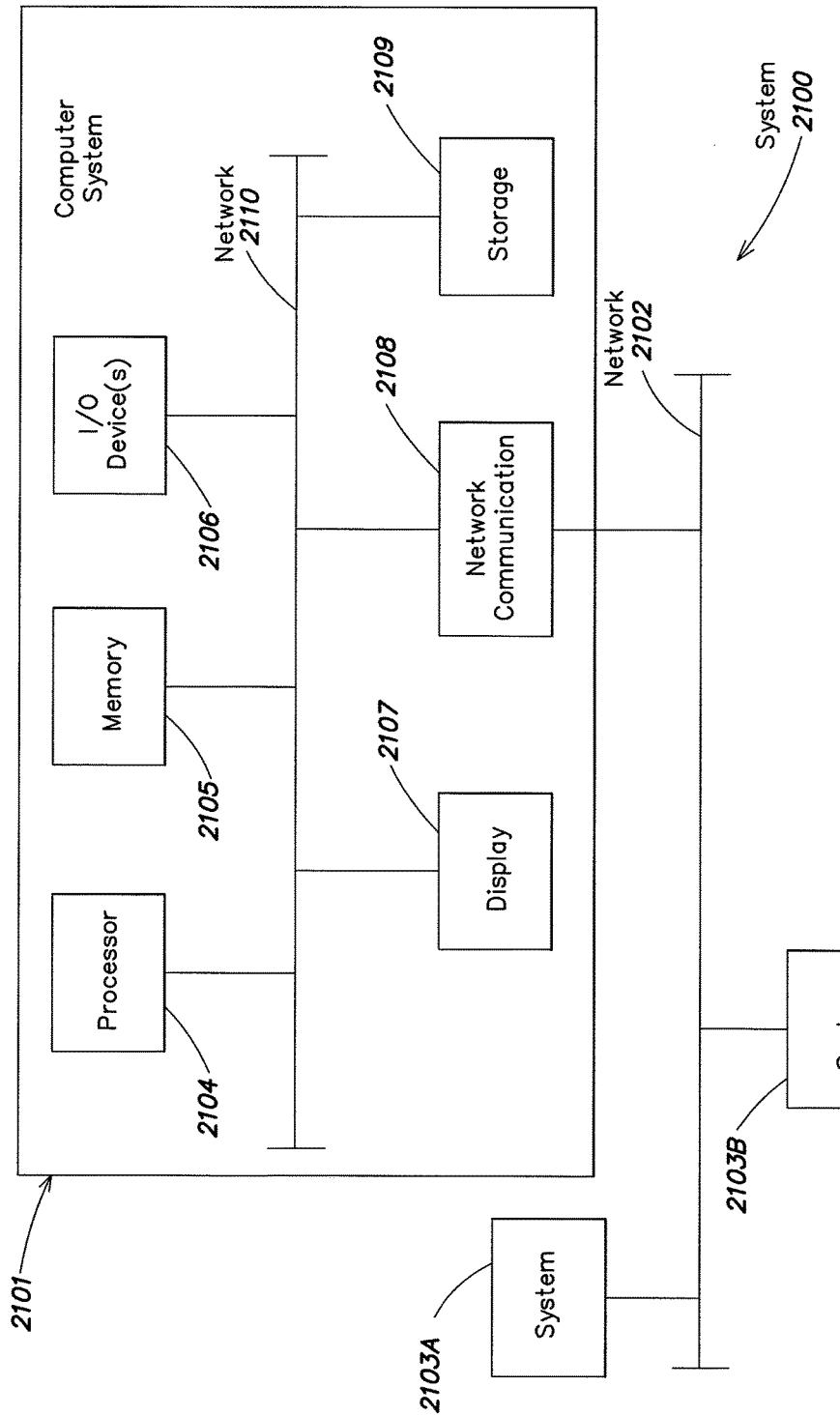
FIG. 21 is a block diagram of a general-purpose computer system upon which various embodiments of the present invention may be implemented.

FIG. 21 shows a block diagram of a general purpose computer and network system 2100 in which various aspects of the present invention may be practiced. For example, various aspects of the invention may be implemented as specialized software executing in one or more computer systems including general-purpose computer system 2101 shown in FIG. 21. Computer system 2101 may include a processor 2104 connected to one or more memory devices 2105, such as a disk drive, memory, or other device for storing data. Memory 2105 is typically used for storing programs and data during operation of the computer system 2101. Components of computer system 2101 may be coupled by an interconnection mechanism such as network 2110, which may include one or more busses (e.g., between components that are integrated within a same machine) and/or a network (e.g., between components that reside on separate discrete machines). The interconnection mechanism enables communications (e.g., data, instructions) to be exchanged between system components of system 2101.

Computer system 2101 also includes one or more input/output (I/O) devices 2106, for example, a keyboard, mouse, trackball, microphone, touch screen, a printing device, display screen, speaker, etc. In addition, computer system 2101 may contain one or more interfaces (e.g., network communication device 2108) that connect computer system 2101 to a communication network (in addition or as an alternative to the network 2110.

The storage system 2109, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 2109, as shown, or in memory system 2105. The processor 2104 generally manipulates the data within the memory 2105, and then copies the data to the medium associated with storage 2109 after processing is completed. A variety of mechanisms are known for managing data movement between the medium and integrated circuit memory element and the invention is not limited thereto. The invention is not limited to a particular memory system or storage system. In one example, information opportunities may be stored on computer readable medium, as well as graphical indicators for information opportunities, targeting criteria may be stored as well, among other options.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 2101 is shown by way of example as one type of computer system upon which various aspects of the invention may be practiced, it should be appreciated that aspects of the invention are not limited to being implemented on the computer system as shown in FIG. 21. Various aspects of the invention may be practiced on one or more computers having a different architectures or components that that shown in FIG. 21.

Computer system 2101 may be a general-purpose computer system that is programmable using a high-level computer programming language. Computer system 2101 may be also implemented using specially programmed, special purpose hardware. In computer system 2101, processor 2104 is typically a commercially available processor such as the well-known Pentium class processor available from the Intel Corporation. Many other processors are available. Such a processor usually executes an operating system which may be, for example, the Windows-based operating systems (e.g., Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within system 2100. For instance, the system may be a distributed system (e.g., client server, multi-tier system). In one example, the system includes software processes executing on a system associated with a user (e.g., a client system). These systems may permit the user/client to create, submit, manage, add, delete, pause, review information opportunities within an online ecosystem, among other options. Additionally, these system may permit a user/client to participate in information opportunities, provide search features for locating particular opportunities, submitting feedback, scoring information opportunities, among other options.

Example System Architecture

Figure 22:
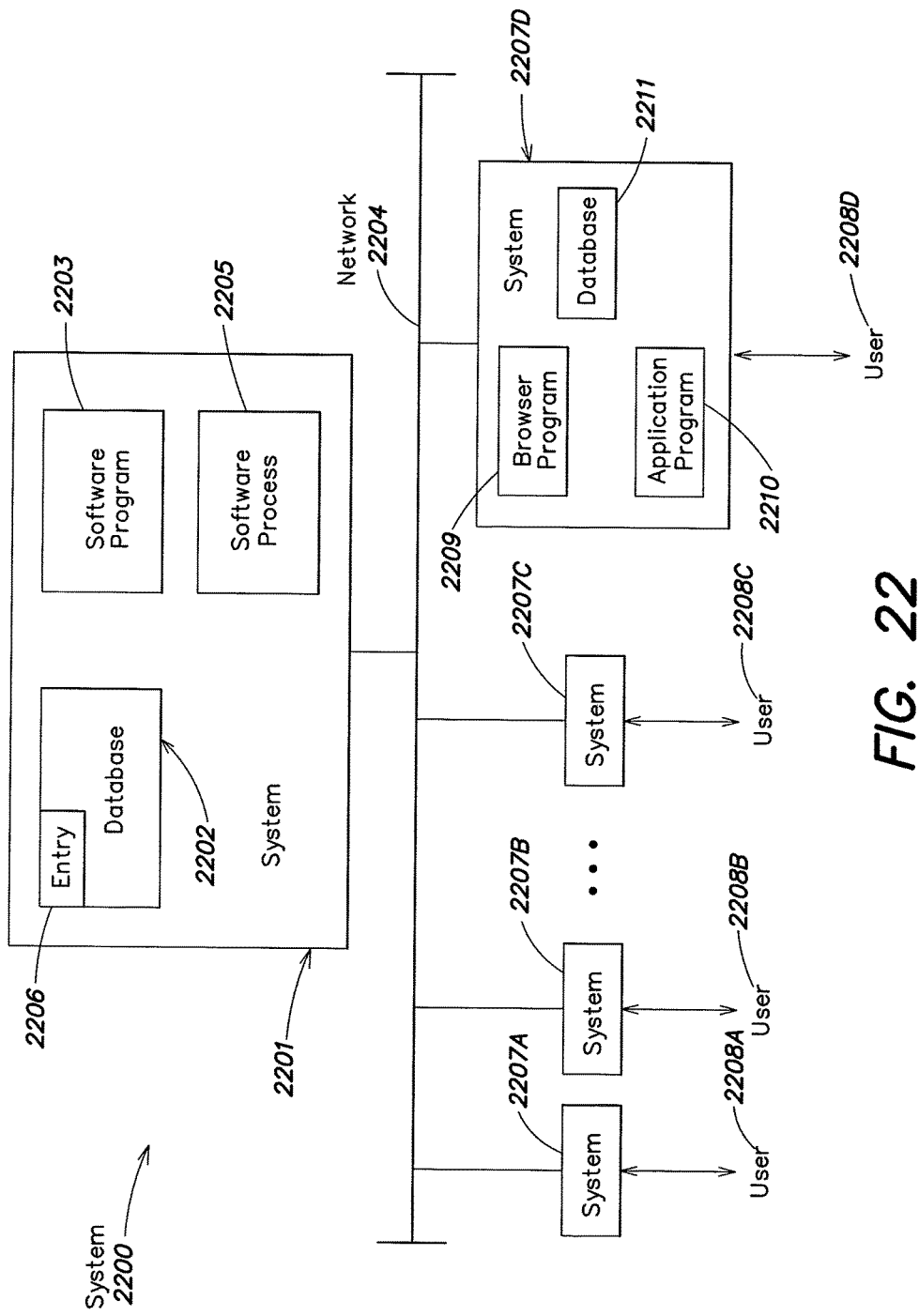
FIG. 22 is a block diagram of a computer system with which various embodiments of the present invention may be practiced.

FIG. 22 shows an architecture diagram of an example system according to one embodiment of the invention. It should be appreciated that FIG. 22 is used for illustration purposes only, and that other architectures may be used to facilitate one or more aspects of the present invention.

As shown in FIG. 22, a distributed system 2200 may be used to conduct functions of the ecosystem and to provide information opportunities within the ecosystem, including, but limited to, the creation of tickets, storing ticket information, determining and storing tag information associated with tickets, performing voting actions, conducting client bidding, storing user information, storing information opportunity information, maintaining an enforcing rules on displaying information opportunities, queuing information opportunities for presentation to the ecosystem, determined contextual matching between ecosystem activity and information opportunities, accepting feedback from the ecosystem community, ranking information opportunities based on feedback, displaying commentary on the information opportunity, storing graphical indicators of information opportunities, displaying indicators of information opportunities, among other options. System 2200 may include one or more computer systems (e.g., systems 2201, 2208A-D) coupled by a communication network 2204. Such computer systems may be, for example, general-purpose computer systems as discussed above with reference to FIG. 21.

In one embodiment of the present invention, system 2201 stores information opportunities in one or more databases (e.g., database 2202). Further, system 2201 performs associated functions with the information opportunities. Including performing contextual matching between user activity and information opportunities, accepting community feedback on the information opportunity, and altering priority of display of the information opportunity based at least in part on the community feedback.

System 2201 may include a server process (e.g., process 2205) that responds to requests from one or more client programs. Process 2205 may include, for example, an HTTP server or other server-based process (e.g., a database server process, XML server, peer-to-peer process) that interfaces to one or more client programs distributed among one or more client systems (e.g., systems 2207A-2207D).

According to one embodiment, client programs may be capable of permitting a user to create, submit, view, and search information opportunities, and permit clients to create, edit, initiate, pause, delete, clone information opportunities to present in the ecosystem. Client programs may be capable of performing statistical tracking of metrics associated with information opportunities, clicks, impressions, etc. Such client programs may include, for example, any type of operating system and/or application program capable of communicating with system 2201 through network 2204. In one particular instance, a client may include a browser program (e.g., browser program 2209) that communicates with server process 2205 using one or more communication protocols (e.g., HTTP over a TCP/IP-based network, XML requests using HTTP through an Ajax client process, distributed objects, etc.).

Although it is shown by way of example that a browser program may be used to access the ecosystem by users to perform ecosystem functions and in particular to view and participate in information opportunities, it should be appreciated that other program types may be used to interface a user to server process 2205. For instance, an application program that is specially-developed to manage information opportunities data may be provided to permit a client to perform ecosystem functions according to various embodiments of the present invention. The client program may be, for example, a thin client including an interface for managing ticket data. Alternatively, the client may be a scripted program, or any other type of program having the capability of transferring ticket data. According to one embodiment, such client programs may, for example, be downloaded and installed over the network. Further, these client programs may be stored and distributed by system 2201 in the form of one or more software programs 2203.

In one specific example, the client program may include an application program 2210 that permits the user to create, submit, view, search, and participate in information opportunities displayed within an online ecosystem. This program 2210, in one embodiment, may be integrated with browser program 2209 executing on system 2207D. For instance, the application program 2210 may include one or more controls that, when selected by the user, perform functions for manipulating information opportunities, their indicators, and summary displays. These controls may be written in a variety of programming languages, and the invention is not limited to any particular language. In one specific example, the control may be a link that, when selected, performs one or more programmed functions. Such functions may permit the user to create, submit, view, search, and participate in information opportunities within an online ecosystem, additionally they may permit the user to create, submit, view, search, and vote on tickets within an online ecosystem.

Information stored in the database 2202 may include, for example, ticket information including, but not limited to, a unique ticket identifier, a description of the observation associated with the ticket, user information such as personal information, user names, ranking, voting history, classification information associated with the ticket (e.g., tag information) and/or other information that can be used to facilitate the online ecosystem, including information opportunities, HotSpots, feedback ranking, commentary, etc.

This information may be collected from the user in an interface (e.g., as presented by program 2210) and stored in the database (e.g., database 2202). Additionally, client systems may store a local copy of a user's information and/or any information opportunity within a local database associated with the client system (e.g., database 2211 located on client system 2207D). However, it should be appreciated that the invention is not limited to storing information opportunities and/or user information in any particular location. A client system (e.g., clients 2207A-2207D) may include one or more interfaces through which information opportunities may be presented to the user. In one example, ticket information and status may be presented in an interface of a browser program (e.g., browser program 2209) executing on a client computer system (e.g., system 2207D).

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "containing", "characterized by" and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition $2^{nd}$ Revision, May 2004), Section 2111.03.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method for introducing information sources into an ecosystem, the method comprising the acts of:
   limiting access to an online ecosystem, hosted on a distributed computer system, wherein the online ecosystem comprises at least a plurality of registered users, wherein at least some of the plurality of registered users dynamically create content within the ecosystem through user submission of respective observations generated by respective users and user submission of respective opinions generated by respective users regarding the respective observations, wherein the dynamically created content includes tickets submitted by respective users;
   accepting, the submission of at least one external information source within the online ecosystem from at least one user of the online ecosystem in addition to the dynamically created content, the at least one external information source including digital content originating from an online source of digital content outside of the online ecosystem, wherein the act of accepting submission of the at least one external information source includes accepting definition, from the at least one user, of the at least one external information source in a user interface displayed to the at least one user of the online ecosystem, and wherein the definition of the at least one external information source includes a computer executable link to the at least one external information source and a user generated description of the content of the at least one external information source;
   storing, by the distributed computer system, the definition of the external information source and the user generated description of the content;
   registering, by the distributed computer system, the plurality of users, wherein the act of registering the plurality of users includes capturing profile information for the plurality of users;
   displaying a visual indicator for the at least one external information source to at least some of the plurality of registered users of the ecosystem, wherein the act of displaying the visual indicator includes an act of adding the visual indicator into a content display of at least some of the dynamic content available within the ecosystem, wherein the at least some of the dynamic content comprises at least the user generated observations and respective opinions on the user generated observations;
   providing for the at least some of the plurality of users to submit feedback on the digital content of the at least one external information source, wherein the act of providing for the at least some of the plurality of users to submit feedback on the digital content of the at least one external information source includes an act of providing access to a summary view of the external information source;
   displaying the summary view of the at least one external information source within the online community in response to selection of the visual indicator in the user interface, wherein the summary view includes the computer executable link to the at least one external information source and the user generated description of the content of the at least one external information source;
   displaying the feedback in the summary view of the external information source, wherein the feedback is further configured to permit evaluation of the digital content of the at least one external information source prior to selection of the computer executable link, and wherein selection of the computer executable link causes a transition from within the online community to the online source of the digital content outside of the online ecosystem; and
   matching contextually activity within the ecosystem to the at least one external information source, wherein the act of matching contextually activity within the online ecosystem includes:
   processing, by the distributed computer system, navigation operations performed by at least one user within the ecosystem,
   matching results returned from the dynamically generated content in response to the navigation operations by the distributed computer system to the at least one external information source, and
   wherein the act of displaying the visual indicator for the at least one external information source includes an act of integrating the visual indicator of the external information source into a display of the results returned in response to the navigation operations.

2. The method according to claim 1, further comprising an act of selecting, by the distributed computer system, the at least one external information source from a plurality of external information sources in response to the act of matching contextually.

3. The method according to claim 2, wherein the visual indicator conveys a type of the external information source available.

4. The method according to claim 3, further comprising an act of requiring an affirmative action by a user to display the external information source.

5. The method according to claim 4, wherein the affirmative action comprises at least one of moving a pointer over the visual indicator, clicking the visual indicator, and triggering the visual indicator.

6. The method according to claim 3, wherein the type of external information source comprises at least one of an earn opportunity, a learn opportunity, and a general opportunity.

7. The method according to claim 3, wherein the type of external information source is an earn opportunity, wherein the earn opportunity further comprises stated remuneration for participating in designated activity.

8. The method according to claim 7, wherein the designated activity comprises participation in at least one of a survey, poll, research task, professional opinion solicitation, professional practice, debate, seminar, and peer review.

9. The method according to claim 7, wherein the designated activity comprises participation in a drug related survey, epidemiology research, medical informatics, patient research, rendering medical opinion, medical diagnosis, laboratory analysis, medical peer review, medical journal submission, and medical practice.

10. The method according to claim 3, wherein the type of external information source is a learn opportunity, and wherein the learn opportunity comprises a presentation of at least one of medical practice information, continuing medical education, seminar information, medical collaboration, medical research information, and medical practice advancements.

11. The method according to claim 3, wherein the type of external information source is a learn opportunity, wherein the learn opportunity comprises at least one of a presentation of professional education opportunity, professional practice issues, peer generated information, leading professional theory, and advancement in professional practice.

12. The method according to claim 1, wherein the feedback comprises a rank associated with the at least one external information source.

13. The method according to claim 1, wherein the feedback comprises comments submitted by at least one user.

14. The method according to claim 1, further comprising an act of restricting display of the at least one indicator of an information source based on the feedback.

15. The method according to claim 1, further comprising an act of establishing a display threshold for the visual indicator.

16. The method according to claim 15, further comprising an act of determining the display threshold has not been exceeded.

17. The method according to claim 1, further comprising an act of filtering the at least one external information source based on demographic information.

18. The method according to claim 17, wherein the act of filtering the at least one information source based on demographic information includes filtering based on at least one of professional qualification, professional specialty, area of interest, ethnicity, sex, age, education, residence, and geographical location.

19. The method according to claim 1, wherein the summary view comprises at least one of a light box, a partially transparent browser window, a new browser window, and a display overlay.

20. The method according to claim 1, wherein the summary view further comprises a rank for the at least one external information source.

21. The method according to claim 20, wherein the rank is generated from user feedback.

22. The method according to claim 20, wherein the summary view further comprises a display indicating user review of the at least one external information source.

23. The method according to claim 22, wherein the indication of user review comprises comment by at least one user.

24. The method according to claim 23, wherein the summary view provides an indication of a reputation of the at least one user.

25. The method according to claim 24, wherein the indication of reputation includes at least one of a reputational ranking for at least one user, an indication of at least one user's credentials, and an indication of requirements for displayed commentary.

26. The method according to claim 1, further comprising an act of directing at least one user to an external source for the at least one information source in response to user selection in the summary view.

27. The method according to claim 26, further comprising an act of notifying the at least one user of the direction to an external source.

28. The method according to claim 1, wherein the act of matching, contextually, the at least one information source to activity within an ecosystem further comprises matching the at least one information source to user activity.

29. The method according to claim 28, wherein the user activity comprises at least one of searching within the environment, keyword identification, navigation, communication, and historical usage.

30. The method according to claim 1, further comprising an act of permitting a user to opt out of receiving the at least one indicator of an external information source.

31. The method according to claim 1, wherein the act of displaying the at least one indicator of an external information source to the plurality of users of the ecosystem occurs in response to user action.

32. The method according to claim 31, wherein user action comprises at least one of searches in the ecosystem and navigation to a section of the ecosystem organizing information sources.

33. A non-transitory computer-readable medium having computer-readable signals stored thereon that define instructions that, as a result of being executed by a computer, instruct the computer to perform a method for introducing information sources to an ecosystem, wherein the method comprises the acts of:

limiting access to an online ecosystem, hosted on a distributed computer system, wherein the online ecosystem comprises at least a plurality of registered users, wherein at least some of the plurality of registered users dynamically create content within the ecosystem through user submission of respective observations generated by respective users and user submission of respective opinions generated by respective users regarding the respective observations, wherein the dynamically created content includes tickets submitted by respective users;

accepting, the submission of at least one external information source within the online ecosystem from at least one user of the online ecosystem in addition to the dynamically created content, the at least one external information source including digital content originating from an online source of digital content outside of the online ecosystem, wherein the act of accepting submission of the at least one external information source includes accepting definition, from the at least one user, of the at least one external information source in a user interface displayed to the at least one user of the online ecosystem, and wherein the definition of the at least one external information source includes a computer executable link to the at least one external information source and a user generated description of the content of the at least one external information source;

storing, by the distributed computer system, the definition of the external information source and the user generated description of the content;

registering, by the distributed computer system, the plurality of users, wherein the act of registering the plurality of users includes capturing profile information for the plurality of users;

displaying a visual indicator for the at least one external information source to at least some of the plurality of registered users of the ecosystem, wherein the act displaying the visual indicator includes an act of adding the visual indicator into a content display of at least some of the dynamic content available within the ecosystem, wherein the at least some of the dynamic content comprises at least the user generated observations and respective opinions on the user generated observations;

providing for the at least some of the plurality of users to submit feedback on the digital content of the at least one external information source, wherein the act of providing for the at least some of the plurality of users to submit feedback on the digital content of the at least one external information source includes an act of providing access to a summary view of the external information source;

displaying the summary view of the at least one external information source within the online community in response to selection of the visual indicator in the user interface, wherein the summary view includes the computer executable link to the at least one external information source and the user generated description of the content of the at least one external information source;

displaying the feedback in the summary view of the external information source, wherein the feedback is further configured to permit evaluation of the digital content of the at least one external information source prior to selection of the computer executable link, and wherein selection of the computer executable link causes a transition from within the online community to the online source of the digital content outside of the online ecosystem; and matching contextually activity within the ecosystem to the at least one external information source, wherein the act of matching contextually activity within the online ecosystem includes:

processing, by the distributed computer system, navigation operations performed by at least one user within the ecosystem, matching results returned from the dynamically generated content in response to the navigation operations by the distributed computer system to the at least one external information source, and wherein the act of displaying the visual indicator for the at least one external information source includes an act of integrating the visual indicator of the external information source into a display of the results returned in response to the navigation operations.

34. A system, including at least one processor operatively connected to memory, for displaying indicators of information sources to an ecosystem comprising a plurality of users, the system comprising:

an access component configured to limit access to an online ecosystem wherein the online ecosystem comprises at least a plurality of registered users, wherein at least some of the plurality of registered users dynamically create content within the ecosystem through user submission of respective observations generated by respective users and user submission of respective opinions generated by respective users regarding the respective observations, wherein the dynamically created content includes tickets submitted by respective users;

a submission component adapted to accept submission of information associated with an external information source in addition to submission of the dynamically created content from at least one user of the online system, wherein the external information source includes digital content originating from an online source of digital content outside of the online ecosystem, wherein the information associated with the external information source includes a computer executable link to the external information source and a user generated description of the content of the external information source;

a storage component configured to store the received information associated with the external information source;

a registration component adapted to register a plurality of users, wherein the registration component is further adapted to capture profile information for the plurality of users;

a display component adapted to display at least one visual indicator associated with an external information source within a display for the ecosystem, wherein the display component is further adapted to add the visual indicator into a content display of at least some of the dynamic content available within the ecosystem, wherein the at least some of the dynamic content comprises at least the user generated observations and respective opinions on the user generated observations, and wherein the display component is further adapted to display a summary view of the external information source including the computer executable link in response to selection of the visual indicator and the user generated description of the content of the at least one external information source, and wherein the display component is further adapted to display feedback on the digital content of the at least one external information source within the summary view, wherein the feedback is further configured to permit evaluation of the digital content of the at least one external information source prior to selection of the computer executable link, and wherein selection of the computer executable link causes a transition from within the online community to the online source of the digital content outside of the online ecosystem;

a feedback interface adapted to accept feedback from at least one user of the ecosystem on the digital content of the external information source; and an analysis component adapted to match contextually activity within the ecosystem to the at least one external information source.

35. The system according to claim 34, further comprising an analysis component adapted to filter a plurality of received at least one external information sources according to feedback, wherein filtered external information sources are not displayed within the online ecosystem.

* * * * *